US012348997B2

(12) United States Patent
Ren et al.

(10) Patent No.: US 12,348,997 B2
(45) Date of Patent: Jul. 1, 2025

(54) CHANNEL MEASUREMENT METHOD AND COMMUNICATIONS APPARATUS

(71) Applicant: HUAWEI TECHNOLOGIES CO., LTD., Guangdong (CN)

(72) Inventors: Xiang Ren, Shanghai (CN); Huangping Jin, Shanghai (CN); Shibin Ge, Shanghai (CN); Xiaohan Wang, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

(21) Appl. No.: 17/706,385

(22) Filed: Mar. 28, 2022

(65) Prior Publication Data

US 2022/0217567 A1    Jul. 7, 2022

Related U.S. Application Data

(63) Continuation of application No. PCT/CN2020/115511, filed on Sep. 16, 2020.

(30) Foreign Application Priority Data

Sep. 30, 2019   (CN) .......................... 201910941640.5

(51) Int. Cl.
 *H04W 24/10*   (2009.01)
 *H04B 7/06*    (2006.01)
(52) U.S. Cl.
 CPC .......... *H04W 24/10* (2013.01); *H04B 7/0626* (2013.01)
(58) Field of Classification Search
 CPC ................................................... H04W 24/10
 See application file for complete search history.

(56) References Cited

U.S. PATENT DOCUMENTS

| 4,445,118 A * | 4/1984 | Taylor ..................... G01S 19/05 |
| | | 342/356 |
| 2009/0016425 A1* | 1/2009 | Hui ......................... H04L 1/003 |
| | | 375/240 |

(Continued)

FOREIGN PATENT DOCUMENTS

| CN | 101610527 A | 12/2009 |
| CN | 108282420 A | 7/2018 |

(Continued)

OTHER PUBLICATIONS

Intel Corporation, Samsung, InterDigital, "Correction of time varying Doppler definition," 3GPP TSG-RAN1 Meeting #86, R1-166571, Gothenburg, Sweden, Aug. 22-26, 2016, 2 pages.

(Continued)

*Primary Examiner* — Hsinchun Liao
(74) *Attorney, Agent, or Firm* — Fish & Richardson P.C.

(57) ABSTRACT

The disclosure provides channel measurement methods and communications apparatuses. One example method includes a terminal device that generates first indication information, and sends the first indication information to a network device. The first indication information indicates one or more component characteristics of a complete time-varying characteristic of a channel and a weighting coefficient of each component characteristic. The complete time-varying characteristic of the channel corresponds to a local time-varying characteristic of the channel. The local time-varying characteristic may be determined by the terminal device based on reference signals received for a plurality of times, and the complete time-varying characteristic may be determined based on the local time-varying characteristic.

20 Claims, 10 Drawing Sheets

(56) References Cited

U.S. PATENT DOCUMENTS

| 2009/0245333 | A1 | 10/2009 | Krishnamoorthi et al. |
| 2013/0223551 | A1 | 8/2013 | Boccardi et al. |
| 2016/0142117 | A1 | 5/2016 | Rahman et al. |
| 2017/0264347 | A1 | 9/2017 | Le-Ngoc |
| 2020/0014435 | A1* | 1/2020 | Jiang .................. H04B 7/065 |
| 2020/0259613 | A1* | 8/2020 | Hong .................. H04L 5/0094 |

FOREIGN PATENT DOCUMENTS

| CN | 108288983 | A | 7/2018 |
| CN | 108988917 | A | 12/2018 |
| CN | 110086732 | A | 8/2019 |
| EP | 3522388 | A1 | 8/2019 |
| WO | 2014190452 | A1 | 12/2014 |

OTHER PUBLICATIONS

PCT International Search Report and Written Opinion issued in International Application No. PCT/CN2020/115511 on Dec. 18, 2020, 13 pages (with English translation).

Extended European Search Report issued in European Application No. 20872479.9 on Sep. 30, 2022, 7 pages.

Huawei et al., "Encoding of Type I and Type II CSI Parameters," 3GPP TSG RAN WG1 Meeting AH NR#3, R1-1715593, Nagoya, Japan, Sep. 18-21, 2017, 7 pages.

Office Action in Chinese Appln. No. 201910941640.5, dated Nov. 16, 2022, 17 pages (with English translation).

\* cited by examiner

CONT.
FROM

N sample points      M-dimensional orthogonal codebook

TO

CONT.
FROM
FIG. 3(c)
∼
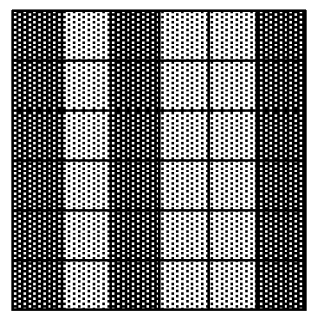 ×  =  c'
↓
TO
FIG. 3(e)
FIG. 3(d)
CONT.
FROM
FIG. 3(d)
∼
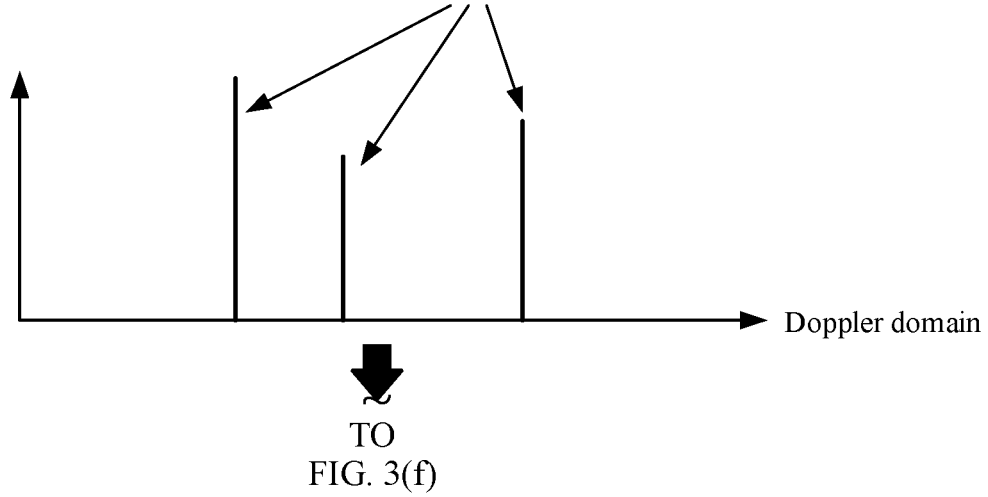
↓
TO
FIG. 3(f)
FIG. 3(e)

M-dimensional orthogonal codebook　　(N×M)-dimensional non-orthogonal codebook

CHANNEL MEASUREMENT METHOD AND COMMUNICATIONS APPARATUS

CROSS-REFERENCE TO RELATED APPLICATIONS

This application is a continuation of International Application No. PCT/CN2020/115511, filed on Sep. 16, 2020, which claims priority to Chinese Patent Application No. 201910941640.5, filed on Sep. 30, 2019. The disclosures of the aforementioned applications are hereby incorporated by reference in their entireties

TECHNICAL FIELD

Embodiments of this application relates to the wireless communication field, and more specifically, to a channel measurement method and a communications apparatus.

BACKGROUND

In a massive multiple-input multiple-output (Massive MIMO) technology, a network device can reduce interference between a plurality of users and interference between a plurality of signal flows of a same user by using a precoding technology. Therefore, signal quality is improved, spatial multiplexing is implemented, and spectrum utilization is improved.

Currently, a channel measurement and feedback method is known. A terminal device may perform channel measurement based on a received reference signal, determine a to-be-fed-back precoding vector, and represent, by using a weighted sum of one or more beam vectors, a to-be-fed-back precoding vector determined in each measurement, to feed back the beam vector and a weighting coefficient of each beam vector.

However, for a time-varying channel, through the foregoing feedback, a channel state cannot be fully fed back.

SUMMARY

This application provides a channel measurement method and a communications apparatus, to provide a more comprehensive feedback on a status of a channel based on a time-varying characteristic of the channel.

According to a first aspect, a channel measurement method is provided. The method may be performed by a terminal device, or by a component (for example, a chip or a chip system) configured in the terminal device. This is not limited in embodiments of this application.

The method includes: generating first indication information, where the first indication information is used to indicate one or more component characteristics of a complete time-varying characteristic of a channel and a weighting coefficient of each component characteristic, the one or more component characteristics and the weighting coefficient of each component characteristic are used to determine the complete time-varying characteristic, and the complete time-varying characteristic of the channel corresponds to a local time-varying characteristic of the channel; and sending the first indication information.

For example, the complete time-varying characteristic of the channel may be determined based on the local time-varying characteristic of the channel. To be specific, through extending in time domain that is performed based on the local time-varying characteristic of the channel, the complete time-varying characteristic of the channel can be predicted.

Based on the foregoing technical solution, a terminal device may quantize a time-varying characteristic of a channel by using one or more component characteristics and one or more weighting coefficients, and feed back quantization information of the component characteristics and the weighting coefficients to a network device. In this way, the network device can determine a change of the channel in time domain, and can more fully learn of a channel state, to make a more proper decision for downlink scheduling. In addition, the terminal device may feed back, to the network device, a complete time-varying characteristic corresponding to a local time-varying characteristic, so that the network device can predict a future channel based on a feedback from the terminal device, and further determine a precoding matrix adapted to the future channel. Therefore, this helps improve transmission performance of a system.

The complete time-varying characteristic may be used to represent a time-varying characteristic of the channel in one or more complete periods. The local time-varying characteristic may be used to represent a time-varying characteristic of the channel in a local time segment of one or more complete periods.

With reference to the first aspect, in some possible implementations of the first aspect, the method further includes: determining the local time-varying characteristic of the channel based on reference signals received for a plurality of times; and determining the one or more component characteristics and the weighting coefficient of each component characteristic based on the local time-varying characteristic of the channel.

In other words, the terminal device may perform channel measurement based on reference signals received for a plurality of times, to determine the local time-varying characteristic of the channel. The local time-varying characteristic may be used to determine the one or more component characteristics and the weighting coefficient of each component characteristic, that is, may be used to determine the complete time-varying characteristic of the channel.

With reference to the first aspect, in some possible implementations of the first aspect, dimension of the complete time-varying characteristic is M, dimension of the local time-varying characteristic is N, M≥N>1, and M and N are both integers.

That dimension of the local time-varying characteristic is N may be understood as that N sample points are obtained through measurement. The N sample points may correspond to N time points, and dimension of the N sample points may be N. M may represent a total quantity of time points included in a period in which the N sample points are located. Values of N and M may represent a relationship between the local time-varying characteristic and the complete time-varying characteristic.

With reference to the first aspect, in some possible implementations of the first aspect, the complete time-varying characteristic is represented by an M-dimensional vector.

For example, the complete time-varying characteristic may be represented by an (M×1)-dimensional vector or a (1×M)-dimensional vector. Each element in the M-dimensional vector may correspond to one time point.

Optionally, the local time-varying characteristic is represented by an N-dimensional vector.

For example, the local time-varying characteristic may be represented by an (N×1)-dimensional vector or a (1×N)-dimensional vector. The N-dimensional vector includes N elements obtained based on measurement, and each element may correspond to one time point.

Optionally, the local time-varying characteristic is represented by an M-dimensional vector.

For example, the local time-varying characteristic may be represented by an (M×1)-dimensional vector or a (1×M)-dimensional vector. The M-dimensional vector includes N elements obtained based on measurement, and each element may correspond to one time point. An element other than the N elements may be set to, for example, 0.

With reference to the first aspect, in some possible implementations of the first aspect, the one or more component characteristics are represented by one or more M-dimensional vectors.

It should be understood that the one or more component characteristics are one or more component characteristics that are used to determine the complete time-varying characteristic. Because the complete time-varying characteristic is M-dimensional, dimension of the component characteristic is also M.

With reference to the first aspect, in some possible implementations of the first aspect, an indication of the one or more component characteristics by the first indication information includes first information used to indicate the dimension of the component characteristic and second information used to indicate the one or more component characteristics.

Based on the first information, the network device can determine the dimension of the component characteristic, and further determine an orthogonal codebook from which the one or more component characteristics indicated in the second information can be found.

Optionally, the first information is used to indicate a value of M.

To be specific, the terminal device may directly report, to the network device, the value of M or information (for example, an index or identifier corresponding to the value of M) that may be used to indicate the value of M.

Optionally, the first information is used to indicate a value of N/M or a value of M/N.

To be specific, the terminal device may report, to the network device, the value of N/M or information (for example, an index or identifier) that may be used to indicate the value of N/M, or the value of M/N or information (for example, an index or identifier) that may be used to indicate the value of M/N. The network device may determine the value of M based on a ratio of the two.

With reference to the first aspect, in some possible implementations of the first aspect, the method further includes: receiving second indication information, where the second indication information is used to indicate one or more optional groups of candidate values, each group of candidate values includes one candidate value of M and one candidate value of L, L represents a quantity of the one or more component characteristics, and L is a positive integer.

To be specific, the network device may indicate a plurality of groups of candidate values of M and L to the terminal device by using signaling. In this implementation, M and L may be bound together. Different values of L may be used based on different values of M.

With reference to the first aspect, in some possible implementations of the first aspect, the method further includes: receiving third indication information, where the third indication information is used to indicate a maximum value $M_{max}$ of M, and $M_{max}$ is a positive integer.

To be specific, the network device does not limit a specific value of M but limits the maximum value of M. The terminal device may determine the value of M and report a determined value to the network device.

With reference to the first aspect, in some possible implementations of the first aspect, the method further includes: receiving fourth indication information, where the fourth indication information is used to indicate a value of L or a maximum value $L_{max}$ of L, L represents a quantity of the component characteristics indicated by the first indication information, and L and $L_{max}$ are both positive integers.

To be specific, the network device does not limit a specific value of L but limits the maximum value of L. The terminal device may use an appropriate value of L based on the value of M determined by the terminal device, and report the determined value to the network device.

With reference to the first aspect, in some possible implementations of the first aspect, the method further includes: receiving fifth indication information, where the fifth indication information is used to indicate a value of N.

To be specific, the network device may indicate the value of N to the terminal device by using signaling. N represents a quantity of sample points. If the terminal device determines the local time-varying characteristic of the channel in a dual-domain compression feedback manner, the terminal device may obtain the local time-varying characteristic of the channel by measuring a change or changes of a weighting coefficient or weighting coefficients of one or more spatial-frequency vector pairs in time domain. For a plurality of spatial-frequency vector pairs, their sample point quantities may be the same or different. When the sample point quantities of the spatial-frequency vector pairs are different, the fifth indication information may indicate a sample point quantity corresponding to each spatial-frequency vector pair.

It should be understood that merely for ease of description, the dual-domain compression feedback manner is used as an example herein to describe possible cases of the value of N indicated by the fifth indication information. However, this shall not constitute any limitation on this application. When another feedback manner is used, for example, a type II feedback manner in the TS 38214 version (R15), the fifth indication information may alternatively indicate a value or values of N corresponding to one or more beam vectors.

With reference to the first aspect, in some possible implementations of the first aspect, the component characteristic is a Doppler frequency, and the weighting coefficient of the component characteristic is a Doppler coefficient.

A radio channel is a time-varying channel. The change of the channel in time domain may be represented by a weighted sum of exponential functions of several slowly varying Doppler frequencies. Therefore, in an implementation, a component characteristic of a time-varying characteristic is a Doppler frequency, and a weighting coefficient of the component characteristic is a Doppler coefficient.

The Doppler frequency may correspond to a time domain vector. In embodiments of this application, different time domain vectors may represent a change rule of the channel in time domain caused by Doppler frequencies on different transmission paths. In other words, a mathematical expression of the Doppler frequency may be the time domain vector.

According to a second aspect, a channel measurement method is provided. The method may be performed by a network device, or by a component (for example, a chip or a chip system) configured in the network device. This is not limited in embodiments of this application.

The method includes: receiving first indication information, where the first indication information is used to indicate one or more component characteristics of a complete time-varying characteristic of a channel and a weighting coefficient of each component characteristic, the one or more component characteristics and the weighting coefficient of each component characteristic are used to determine the complete time-varying characteristic, and the complete time-varying characteristic of the channel corresponds to a local time-varying characteristic of the channel; and determining the one or more component characteristics and the weighting coefficient of each component characteristic according to the first indication information.

For example, the complete time-varying characteristic of the channel may be determined based on the local time-varying characteristic of the channel. To be specific, through extending in time domain that is performed based on the local time-varying characteristic of the channel, the complete time-varying characteristic of the channel can be predicted.

Based on the foregoing technical solution, a terminal device may quantize a time-varying characteristic of a channel by using one or more component characteristics and one or more weighting coefficients, and feed back quantization information of the component characteristics and the weighting coefficients to a network device. In this way, the network device can determine a change of the channel in time domain, and can more fully learn of a status of the channel, to make a more proper decision for downlink scheduling. In addition, the terminal device may feed back, to the network device, a complete time-varying characteristic corresponding to a local time-varying characteristic, so that the network device can predict a future channel based on a feedback from the terminal device, and further determine a precoding matrix adapted to the future channel. Therefore, this helps improve transmission performance of a system.

The complete time-varying characteristic may be used to represent a time-varying characteristic of the channel in one or more complete periods. The local time-varying characteristic may be used to represent a time-varying characteristic of the channel in a local time segment of one or more complete periods.

With reference to the second aspect, in some possible implementations of the second aspect, dimension of the complete time-varying characteristic is M, dimension of the local time-varying characteristic is N, M≥N>1, and M and N are both integers.

That dimension of the local time-varying characteristic is N may be understood as that N sample points are obtained through measurement. The N sample points may correspond to N time points, and dimension of the N sample points may be N. M may represent a total quantity of time points included in a period in which the N sample points are located. Values of N and M may represent a relationship between the local time-varying characteristic and the complete time-varying characteristic.

With reference to the second aspect, in some possible implementations of the second aspect, the complete time-varying characteristic is represented by an M-dimensional vector.

For example, the complete time-varying characteristic may be represented by an (M×1)-dimensional vector or a (1×M)-dimensional vector. Each element in the M-dimensional vector may correspond to one time point.

Optionally, the local time-varying characteristic is represented by an N-dimensional vector.

For example, the local time-varying characteristic may be represented by an (N×1)-dimensional vector or a (1×N)-dimensional vector. The N-dimensional vector includes N elements obtained based on measurement, and each element may correspond to one time point.

Optionally, the local time-varying characteristic is represented by an M-dimensional vector.

For example, the local time-varying characteristic may be represented by an (M×1)-dimensional vector or a (1×M)-dimensional vector. The M-dimensional vector includes N elements obtained based on measurement, and each element may correspond to one time point. An element other than the N elements may be set to, for example, 0.

With reference to the second aspect, in some possible implementations of the second aspect, the one or more component characteristics are represented by one or more M-dimensional vectors.

It should be understood that the one or more component characteristics are one or more component characteristics that are used to determine the complete time-varying characteristic. Because the complete time-varying characteristic is M-dimensional, dimension of the component characteristic is also M.

With reference to the second aspect, in some possible implementations of the second aspect, an indication of the one or more component characteristics by the first indication information includes first information used to indicate the dimension of the component characteristic and second information used to indicate the one or more component characteristics.

Based on the first information, the network device can determine the dimension of the component characteristic, and further determine an orthogonal codebook from which the one or more component characteristics indicated in the second information can be found.

Optionally, the first information is used to indicate a value of M.

To be specific, the terminal device may directly report, to the network device, the value of M or information (for example, an index or identifier corresponding to the value of M) that may be used to indicate the value of M.

Optionally, the first information is used to indicate a value of N/M or a value of M/N.

To be specific, the terminal device may report, to the network device, the value of N/M or information (for example, an index or identifier) that may be used to indicate the value of N/M, or the value of M/N or information (for example, an index or identifier) that may be used to indicate the value of M/N. The network device may determine the value of M based on a ratio of the two.

With reference to the second aspect, in some possible implementations of the second aspect, the method further includes: sending second indication information, where the second indication information is used to indicate one or more optional groups of candidate values, each group of candidate values includes one candidate value of M and one candidate value of L, L represents a quantity of the one or more component characteristics, and L is a positive integer.

To be specific, the network device may indicate a plurality of groups of candidate values of M and L to the terminal device by using signaling. In this implementation, M and L may be bound together. Different values of L may be used based on different values of M.

With reference to the second aspect, in some possible implementations of the second aspect, the method further includes: sending third indication information, where the third indication information is used to indicate a maximum value $M_{max}$ of M, and $M_{max}$ is a positive integer.

To be specific, the network device does not limit a specific value of M but limits the maximum value of M. The terminal device may determine the value of M and report a determined value to the network device.

With reference to the second aspect, in some possible implementations of the second aspect, the method further includes: sending fourth indication information, where the fourth indication information is used to indicate a value of L or a maximum value $L_{max}$ of L, L represents a quantity of the component characteristics indicated by the first indication information, and L and $L_{max}$ are both positive integers.

To be specific, the network device does not limit a specific value of L but limits the maximum value of L. The terminal device may use an appropriate value of L based on the value of M determined by the terminal device, and report the determined value to the network device.

With reference to the second aspect, in some possible implementations of the second aspect, the method further includes: sending fifth indication information, where the fifth indication information is used to indicate a value of N.

To be specific, the network device may indicate the value of N to the terminal device by using signaling. N represents a quantity of sample points. If the terminal device determines the local time-varying characteristic of the channel in a dual-domain compression feedback manner, the terminal device may obtain the local time-varying characteristic of the channel by measuring a change or changes of a weighting coefficient or weighting coefficients of one or more spatial-frequency vector pairs in time domain. For a plurality of spatial-frequency vector pairs, their sample point quantities may be the same or different. When the sample point quantities of the spatial-frequency vector pairs are different, the fifth indication information may indicate a sample point quantity corresponding to each spatial-frequency vector pair.

It should be understood that merely for ease of description, the dual-domain compression feedback manner is used as an example herein to describe possible cases of the value of N indicated by the fifth indication information. However, this shall not constitute any limitation on embodiments of this application. When another feedback manner is used, for example, a type II feedback manner in the TS 38214 version (R15), the fifth indication information may alternatively indicate a value or values of N corresponding to one or more beam vectors.

With reference to the second aspect, in some possible implementations of the second aspect, the one or more component characteristics and the weighting coefficient of each component characteristic are determined based on the local time-varying characteristic of the channel.

In other words, the local time-varying characteristic of the channel may be used to determine the complete time-varying characteristic of the channel. In an implementation, the terminal device may determine the local time-varying characteristic of the channel based on reference signals received for a plurality of times.

With reference to the second aspect, in some possible implementations of the second aspect, the component characteristic is a Doppler frequency, and the weighting coefficient of the component characteristic is a Doppler coefficient.

A radio channel is a time-varying channel. The change of the channel in time domain may be represented by a weighted sum of exponential functions of several slowly varying Doppler frequencies. Therefore, in an implementation, a component characteristic of a time-varying characteristic is a Doppler frequency, and a weighting coefficient of the component characteristic is a Doppler coefficient.

The Doppler frequency may correspond to a time domain vector. In embodiments of this application, different time domain vectors may represent a change rule of the channel in time domain caused by Doppler frequencies on different transmission paths. In other words, a mathematical expression of the Doppler frequency may be the time domain vector.

According to a third aspect, a communications apparatus is provided. The communications apparatus is configured to perform the channel measurement method provided in the first aspect. The communications apparatus may include a unit configured to perform the channel measurement method provided in the first aspect.

For example, the communications apparatus includes a processing unit and a transceiver unit.

The processing unit is configured to generate first indication information, where the first indication information is used to indicate one or more component characteristics of a complete time-varying characteristic of a channel and a weighting coefficient of each component characteristic, the one or more component characteristics and the weighting coefficient of each component characteristic are used to determine the complete time-varying characteristic, and the complete time-varying characteristic of the channel corresponds to a local time-varying characteristic of the channel. The transceiver unit is configured to send the first indication information.

Optionally, the transceiver unit is further configured to receive a reference signal; and the processing unit is further configured to: determine the local time-varying characteristic of the channel based on reference signals received for a plurality of times; and determine the one or more component characteristics and the weighting coefficient of each component characteristic based on the local time-varying characteristic of the channel.

Optionally, dimension of the complete time-varying characteristic is M, dimension of the local time-varying characteristic is N, M≥N>1, and M and N are both integers.

Optionally, the complete time-varying characteristic is represented by an M-dimensional vector.

Optionally, the one or more component characteristics are represented by one or more M-dimensional vectors.

Optionally, an indication of the one or more component characteristics by the first indication information includes first information used to indicate dimension of the component characteristic and second information used to indicate the one or more component characteristics.

Optionally, the first information is used to indicate a value of M.

Optionally, the first information is used to indicate a value of N/M or a value of MN.

Optionally, the transceiver unit is further configured to receive second indication information, where the second indication information is used to indicate one or more optional groups of candidate values, each group of candidate values includes one candidate value of M and one candidate value of L, L represents a quantity of the one or more component characteristics, and L is a positive integer.

Optionally, the transceiver unit is further configured to receive third indication information, where the third indication information is used to indicate a maximum value $M_{max}$ of M, and $M_{max}$ is a positive integer.

Optionally, the transceiver unit is further configured to receive fourth indication information, where the fourth indication information is used to indicate a value of L or a maximum value $L_{max}$ of L, L represents a quantity of the component characteristics indicated by the first indication information, and L and $L_{max}$ are both positive integers.

Optionally, the transceiver unit is further configured to receive fifth indication information, where the fifth indication information is used to indicate a value of N.

According to a fourth aspect, a communications apparatus is provided. The communications apparatus is configured to perform the channel measurement method provided in the second aspect. The communications apparatus may include a unit configured to perform the channel measurement method provided in the second aspect.

For example, the communications apparatus includes a processing unit and a transceiver unit.

The transceiver unit is configured to receive first indication information, where the first indication information is used to indicate one or more component characteristics of a complete time-varying characteristic of a channel and a weighting coefficient of each component characteristic, the one or more component characteristics and the weighting coefficient of each component characteristic are used to determine the complete time-varying characteristic, and the complete time-varying characteristic of the channel corresponds to a local time-varying characteristic of the channel. The processing unit is configured to determine the one or more component characteristics and the weighting coefficient of each component characteristic according to the first indication information.

Optionally, dimension of the complete time-varying characteristic is M, dimension of the local time-varying characteristic is N, M≥N>1, and M and N are both integers.

Optionally, the complete time-varying characteristic is represented by an M-dimensional vector.

Optionally, the one or more component characteristics are represented by one or more M-dimensional vectors.

Optionally, an indication of the one or more component characteristics by the first indication information includes first information used to indicate dimension of the component characteristic and second information used to indicate the one or more component characteristics.

Optionally, the first information is used to indicate a value of M.

Optionally, the first information is used to indicate a value of N/M or a value of M/N.

Optionally, the transceiver unit is further configured to send second indication information, where the second indication information is used to indicate one or more optional groups of candidate values, each group of candidate values includes one candidate value of M and one candidate value of L, L represents a quantity of the one or more component characteristics, and L is a positive integer.

Optionally, the transceiver unit is further configured to send third indication information, where the third indication information is used to indicate a maximum value $M_{max}$ of M, and $M_{max}$ is a positive integer.

Optionally, the transceiver unit is further configured to send fourth indication information, where the fourth indication information is used to indicate a value of L or a maximum value $L_{max}$ of L, L represents a quantity of the component characteristics indicated by the first indication information, and L and $L_{max}$ are both positive integers.

Optionally, the transceiver unit is further configured to send fifth indication information, where the fifth indication information is used to indicate a value of N.

Optionally, the one or more component characteristics and the weighting coefficient of each component characteristic are determined based on the local time-varying characteristic of the channel.

Optionally, the component characteristic is a Doppler frequency, and the weighting coefficient of the component characteristic is a Doppler coefficient.

According to a fifth aspect, a communications apparatus is provided, including a processor. The processor is coupled to a memory, and may be configured to execute instructions in the memory, to implement the channel measurement method in any one of the possible implementations of the first aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a terminal device. When the communications apparatus is the terminal device, the communications interface may be a transceiver or an input/output interface.

In another implementation, the communications apparatus is a chip or a chip system. When the communications apparatus is the chip or the chip system, the communications interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a terminal device.

Optionally, the transceiver may be a transceiver circuit. Optionally, the input/output interface may be an input/output circuit.

According to a sixth aspect, a communications apparatus is provided. The communications apparatus includes a processor. The processor is coupled to a memory, and may be configured to execute instructions in the memory, to implement the channel measurement method in any one of the possible implementations of the second aspect. Optionally, the communications apparatus further includes the memory. Optionally, the communications apparatus further includes a communications interface, the processor is coupled to the communications interface, and the communications interface is configured to input and/or output information. The information includes at least one of instructions and data.

In an implementation, the communications apparatus is a network device. When the communications apparatus is the network device, the communications interface may be a transceiver or an input/output interface.

In another implementation, the communications apparatus is a chip or a chip system. When the communications apparatus is the chip or the chip system, the communications interface may be an input/output interface, an interface circuit, an output circuit, an input circuit, a pin, a related circuit, or the like on the chip or the chip system. The processor may alternatively be embodied as a processing circuit or a logic circuit.

In another implementation, the communications apparatus is a chip or a chip system configured in a network device.

Optionally, the transceiver may be a transceiver circuit. Optionally, the input/output interface may be an input/output circuit.

According to a seventh aspect, a computer-readable storage medium is provided. A computer program is stored in the computer-readable storage medium. When the computer program is executed by a communications apparatus, the communications apparatus is enabled to implement the channel measurement method in any one of the possible implementations of the first aspect or the second aspect.

According to an eighth aspect, a computer program product including instructions is provided. When the instructions are executed by a computer, a communications apparatus is enabled to implement the channel measurement method in any one of the possible implementations of the first aspect or the second aspect.

According to a ninth aspect, a communications system is provided, and includes the foregoing network device and terminal device.

BRIEF DESCRIPTION OF DRAWINGS

FIG. 3(a) to FIG. 3(f) are schematic diagrams of a channel measurement method according to an embodiment of this application;

DESCRIPTION OF EMBODIMENTS

Figure 1:
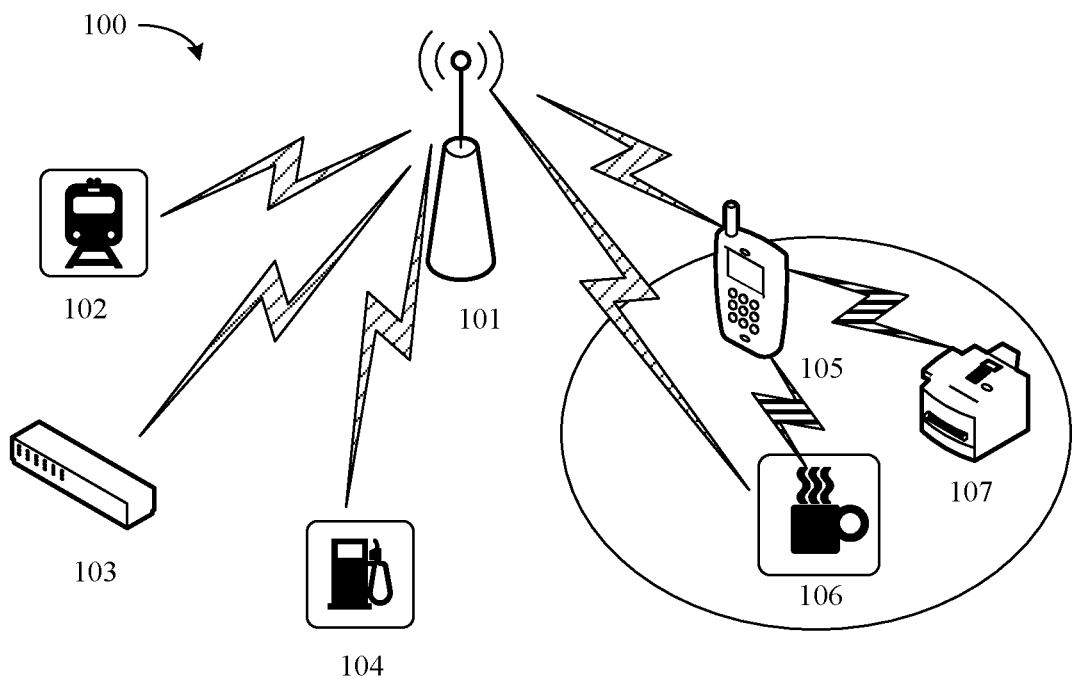
FIG. 1 is a schematic diagram of a communications system to which embodiments of this application are applicable.

The following describes the technical solutions in embodiments of this application with reference to the accompanying drawings.

The technical solutions in embodiments of this application may be applied to various communications systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) mobile communications system, or a new radio access technology (NR) system. The 5G mobile communications system may include non-standalone (NSA) and/or standalone (SA).

The technical solutions provided in embodiments of this application may be further applied to a machine type communication (MTC) network, a machine-to-machine communication long term evolution technology (LTE-M) network, a device-to-device (D2D) network, a machine to machine (machine to machine, M2M) network, an internet of things (IoT) network, or another network. The IoT network may include, for example, the internet of vehicles. Communication manners in an internet of vehicles system are collectively referred to as vehicle to X (V2X, where X may represent anything). For example, the V2X may include vehicle to vehicle (V2V) communication, vehicle to infrastructure (V2I) communication, vehicle to pedestrian (V2P) communication, vehicle to network (V2N) communication, or the like.

The technical solutions provided in embodiments of this application may be further applied to a future communications system, for example, a sixth generation mobile communications system. This is not limited in embodiments of this application.

In embodiments of this application, a network device may be any device having a wireless transceiver function, The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, a network device may be a gNB or a transmission point (TRP or TP) in a 5G system such as an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in embodiments of this application.

The network device provides a cell with a service, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus.

The terminal device may be a device that provides voice/data connectivity for a user, for example, a handheld device having a wireless connection function or a vehicle-mounted device. Currently, some examples of the terminal may be: a mobile phone, a tablet computer (pad), a computer with a wireless transceiving function (for example, a notebook computer or a palmtop computer), a mobile internet device (MID), a virtual reality (VR) device, an augmented reality (AR) device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or computing device with a wireless communication function, another processing device connected to a wireless modem, a vehicle-mounted device, a wearable device, a terminal device in a 5G network, a terminal device in a future evolved public land mobile communications network (PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn by a user or integrated into clothes or an accessory of the user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device may alternatively be a terminal device in an internet of things (IoT) system. The IoT is an important part in development of future information technologies. A main technical feature of the IoT is to connect an object to a network by using a communications technology, to implement an intelligent network for human-machine interconnection and thing-thing interconnection. The IoT technology can implement massive connections, intensive coverage, and power saving for terminals by using, for example, a narrow band NB technology.

The terminal device may alternatively include sensors such as an intelligent printer, a train detector, or a gas station, and main functions of the terminal device include: collecting data (which is a function of some terminal devices), receiving control information and downlink data of a network device, sending an electromagnetic wave, and transmitting uplink data to the network device.

For ease of understanding embodiments of this application, a communications system to which a method according to an embodiment of this application is applicable is first described in detail with reference to FIG. 1. FIG. 1 is a schematic diagram of a communications system 100 to which a method according to an embodiment of this application is applicable. As shown in the figure, the communications system 100 may include at least one network device, for example, a network device 101 in a 5G system shown in FIG. 1. The communications system 100 may further include at least one terminal device, for example, terminal devices 102 to 107 shown in FIG. 1. The terminal devices 102 to 107 may be mobile or stationary. The network device 101 and one or more of the terminal devices 102 to 107 may communicate through a radio link. Each network device may provide communication coverage for a particular geographic area and may communicate with a terminal device located in the coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 constitute a communications system.

Optionally, the terminal devices may directly communicate with each other. For example, direct communication between the terminal devices may be implemented by using a D2D technology or the like. As shown in the figure, the terminal devices 105 and 106 may directly communicate with each other by using the D2D technology, and the terminal devices 105 and 107 may directly communicate with each other by using the D2D technology. The terminal device 106 and the terminal device 107 may separately or simultaneously communicate with the terminal device 105.

The terminal devices 105 to 107 may alternatively communicate with the network device 101 separately. For example, the terminal devices 105 to 107 may directly communicate with the network device 101. For example, the terminal devices 105 and 106 in the figure may directly communicate with the network device 101. Alternatively, the terminal devices 105 to 107 may indirectly communicate with the network device 101. For example, the terminal device 107 in the figure communicates with the network device 101 through the terminal device 106.

It should be understood that FIG. 1 shows an example of one network device, a plurality of terminal devices, and communication links between the communications devices. Optionally, the communications system 100 may include a plurality of network devices, and in a coverage area of each network device, another quantity of terminal devices may be included, for example, more or fewer terminal devices. This is not limited in embodiments of this application.

A plurality of antennas may be configured for each of the foregoing communications devices, for example, the network device 101 and the terminal devices 102 to 107 in FIG. 1. The plurality of antennas may include at least one transmit antenna configured to send a signal and at least one receive antenna configured to receive a signal. In addition, the communications device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communications system 100 may further include another network entity such as a network controller or a mobility management entity. This is not limited in embodiments of this application.

For ease of understanding of embodiments of this application, the following briefly describes a process of processing a downlink signal at a physical layer before the downlink signal is sent. It should be understood that the process of processing the downlink signal described below may be performed by the network device, or may be performed by a chip disposed in the network device. For ease of description, the network device and the chip are collectively referred to as a network device below.

The network device may process a codeword on a physical channel. The codeword may be a coded bit obtained through coding (for example, including channel coding). The codeword is scrambled to generate a scrambling bit. Modulation mapping is performed on the scrambling bit, to obtain a modulation symbol. The modulation symbol is mapped to a plurality of layers through layer mapping. The layer is also referred to as a transport layer. A modulation symbol obtained through the layer mapping is precoded, to obtain a precoded signal. The precoded signal is mapped to a plurality of resource elements (REs) through RE mapping. These REs are then transmitted through an antenna port after orthogonal multiplexing (OFDM) modulation is performed on the REs.

It should be understood that the process of processing the downlink signal described above is merely an example for description, and shall not constitute any limitation on embodiments of this application. For a specific process of processing the downlink signal, refer to the conventional technology. For brevity, detailed descriptions of the specific process are omitted herein.

For ease of understanding embodiments of this application, the following briefly describes terms used in embodiments of this application.

1. Precoding technology: When a status of a channel is known, a network device may process a to-be-sent signal by using a precoding matrix that matches the status of the channel, so that a precoded to-be-sent signal adapts to the channel, to reduce complexity of eliminating inter-channel interference by a receive device. Therefore, after the to-be-sent signal is precoded, quality (for example, a signal to interference plus noise ratio (SINR)) of a received signal is improved. Therefore, transmission between a transmit device and a plurality of receive devices can be implemented on a same time-frequency resource by using the precoding technology. That is, multi-user multiple-input multiple-output (MU-MIMO) is implemented.

It should be understood that related descriptions of the precoding technology in this specification are merely examples for ease of understanding, and are not intended to limit the protection scope of embodiments of this application. In a specific implementation process, the transmit device may further perform precoding in another manner. For example, when channel information (for example, but not limited to, a channel matrix) cannot be obtained, precoding is performed by using a preset precoding matrix or in a weighting processing manner. For brevity, specific content thereof is not described in the specification.

2. Time domain vector: A time domain vector may be used to represent a change of a channel in time domain. Each time domain vector may represent a change rule of the channel with time. A radio channel is a time-varying channel, and suffers from attenuation losses from different paths. For example, a time-frequency dual selective fading channel, which is affected by both frequency selective fading caused by a multipath delay spread and time selective fading caused by a Doppler shift, is a typical time-varying channel.

The Doppler shift, which may also be referred to as a Doppler frequency, may be a frequency shift between a transmit frequency and a receive frequency caused by relative movement between a terminal device and a network device. A difference between the receive frequency and the transmit frequency is referred to as the Doppler shift or the Doppler frequency. Usually, the Doppler shift $f_d$ may be defined as $f_d = v \times f_c \times \cos\theta/c$, where v represents a moving speed of the terminal device, $f_c$ represents a carrier frequency, θ represents an angle of incidence of a multipath signal, and c represents a speed of light. During specific implementation, angles θ of incidence of different transmission paths may be considered. Because angles θ of incidence of a plurality of paths are different, different transmission paths correspond to different Doppler shifts, causing a Doppler spread. Generally, a value of the Doppler shift indicates impact of the moving speed on a speed of the change of the channel in time domain.

In embodiments of this application, each time domain vector may correspond to one Doppler shift or one Doppler frequency. Therefore, different time domain vectors may be used to represent a change rule of the channel in time domain caused by Doppler shifts on different transmission paths. Generally, for ease of describing the change of the channel in time domain, the time domain channel may be projected to a Doppler domain, and the change is represented by weighting exponential functions of several slowly varying Doppler shifts.

In a possible design, a correspondence between a Doppler shift (or a Doppler frequency) and a time domain vector may be expressed as follows:

$$e^{j2\pi \frac{n \times m}{M}},$$

which represents an $n^{th}$ (0≤n≤M−1, where n is an integer) element in a time domain vector indexed m (0≤n≤M−1, where m is an integer) in an M (M is a positive integer)-dimensional codebook. The M-dimensional codebook may be understood as that a maximum Doppler frequency is divided into M equal parts, and M time domain vectors in the M-dimensional codebook correspond to the M Doppler frequencies. Different values of m may represent different Doppler frequencies, or different values of m may correspond to different Doppler frequencies. For example, a ratio of a Doppler frequency corresponding to the $m^{th}$ vector in the M-dimensional codebook to the maximum Doppler frequency is m/M. Therefore, a Doppler shift corresponding to one time domain vector may be determined based on the time domain vector. In a time domain vector, time domain samples of a Doppler frequency at different moments may correspond to different elements in the time domain vector in a form of an exponential function. The maximum Doppler shift may be determined according to the calculation formula of the Doppler shift that is shown above: $f_d = v \times f_c \times \cos\theta/c$. Assuming that the moving speed v of the terminal device remains unchanged and the carrier frequency $f_c$ remains unchanged, the maximum Doppler shift may be that $f_d = v \times f_c/c$, that is, cos θ is 1. Alternatively, the maximum Doppler shift may be that $f_d = v \times f_c \times \cos\theta_0/c$, where $\theta_0$ is an angle of a direct path between a base station and the terminal device.

It should be understood that the correspondence between a time domain vector and a Doppler frequency is not limited to the foregoing exponential function form. A specific form of the correspondence between the two is not limited in embodiments of this application.

It should be further understood that the time domain vector is defined merely for ease of distinguishing from a spatial domain vector and a frequency domain vector described below, and this shall not constitute any limitation on embodiments of this application. This application does not exclude a possibility of defining another name for the time domain vector in a future protocol to represent a meaning the same as or similar to that of the time domain vector. For example, the time domain vector may also be referred to as a Doppler vector.

Optionally, the time domain vector is one or more of a discrete Fourier transform (DFT) vector, an oversampled DFT vector, a wavelet transform (WT) vector, or an oversampled WT vector. This is not limited in embodiments of this application.

The DFT vector may be a vector in a DFT matrix, and the WT vector may be a vector in a WT matrix.

Optionally, the time domain vector is a conjugate transpose vector of the DFT vector. The DFT conjugate transpose vector may be a column vector in a conjugate transpose matrix of the DFT matrix.

Optionally, the time domain vector is a conjugate transpose vector of the WT vector. The WT conjugate transpose vector may be a column vector in a conjugate transpose matrix of the WT matrix.

In the following embodiments, for ease of understanding and description, the DFT vector is used as an example of the time domain vector to describe the channel measurement methods provided in embodiments of this application. However, it should be understood that this shall not constitute any limitation on embodiments of this application. A specific form of the time domain vector is not limited in embodiments of this application.

3. Codebook: The codebook in embodiments of this application may be a set of time domain vectors. A plurality of time domain vectors in a same codebook may be vectors with a same dimension. For example, if time domain vectors in a same codebook are all M-dimensional vectors, the codebook is an M-dimensional codebook.

Optionally, time domain vectors in a same codebook are all DFT vectors. The codebook may include M time domain vectors, and every two of the M time domain vectors may be orthogonal to each other. In other words, the codebook is an orthogonal codebook. The M time domain vectors in the codebook may construct a DFT matrix. In other words, the time domain vector may be a vector obtained from a DFT matrix.

For example, the M time domain vectors in the M-dimensional codebook may be vectors obtained from an (M×M)-dimensional DFT matrix. For example, an $m^{th}$ (m=0, 1, ..., M−1) vector in the M-dimensional codebook may be as follows:

$$[e^{-j2\pi \times 0 \times m/M} e^{-j2\pi \times 1 \times m/M} \ldots e^{-j2\pi \times (N-1) \times m/M}]^T.$$

It should be understood that, the vector shown above is merely an example, and this shall not constitute any limitation on embodiments of this application. A specific form of the time domain vector is not limited in embodiments of this application.

Optionally, time domain vectors in a same codebook are all oversampled DFT vectors. The over-sampling DFT vector may be a vector in an over-sampling DFT matrix. For example, the orthogonal codebook including DFT vectors may be extended into a plurality of subsets by using an over-sampling factor $O_f$ ($O_f$ is a positive integer greater than 1). Each subset may include M time domain vectors, and every two of the M time domain vectors are orthogonal to each other. The time domain vectors in the plurality of subsets may construct an over-sampling DFT matrix. A sum (or a union set) of the plurality of subsets may be defined as a codebook. The time domain vector may be a vector obtained from the plurality of subsets, or may be a vector obtained from one of the plurality of subsets. This is not limited in embodiments of this application.

It should be understood that, when the orthogonal codebook including the DFT vectors is extended into a plurality of orthogonal subsets by using the oversampling factor, the plurality of orthogonal subsets may also be defined as a plurality of codebooks. This is not limited in embodiments of this application.

Optionally, time domain vectors in a same codebook are all WT vectors. The codebook may include M time domain vectors, and every two of the M time domain vectors are orthogonal to each other. In other words, the codebook is an orthogonal codebook. The M time domain vectors in the codebook may construct a WT matrix. In other words, the time domain vector may be a vector obtained from a WT matrix.

Optionally, time domain vectors in a same codebook are all oversampled WT vectors. The orthogonal codebook including the WT vectors may be extended into a plurality of subsets by using an oversampling factor. Each subset may include M time domain vectors, and every two of the M time domain vectors are orthogonal to each other. An oversampled WT matrix may be constructed by using a plurality of time domain vectors in the codebook. A sum (or a union set) of the plurality of subsets may be defined as a codebook. The time domain vector may be a vector obtained from the plurality of subsets, or may be a vector obtained from one of the plurality of subsets. This is not limited in embodiments of this application.

It should be understood that, when the orthogonal codebook including the WT vectors is extended into a plurality of orthogonal subsets by using the oversampling factor, the plurality of orthogonal subsets may also be defined as a plurality of codebooks. This is not limited in embodiments of this application.

A plurality of codebooks may form a codebook set. A plurality of codebooks in the codebook set may be codebooks with different dimensions. In other words, dimensions of time domain vectors obtained from different codebooks may be different.

4. Spatial domain vector: The spatial domain vector is also referred to as a beam vector, an angle domain vector, or the like. Each element in the spatial domain vector may represent a weight of each antenna port. Based on the weight of each antenna port that is represented by each element in the spatial domain vector, signals of the antenna ports are linearly superposed, to form an area with a relatively strong signal in a direction in space. A reference signal is precoded based on the spatial domain vector, so that the transmitted reference signal may have specific spatial directivity. Therefore, a process of precoding the reference signal based on the spatial domain vector may also be considered as a process of performing spatial domain (or spatial domain for short) precoding.

For ease of description below, it is assumed that the spatial domain vector is denoted as u. A length of the spatial domain vector u may be a quantity Ns of transmit antenna ports in one polarization direction, where Ns≥1 and is an integer. The spatial domain vector may be, for example, a column vector or a row vector whose length is $N_s$. This is not limited in embodiments of this application.

Optionally, the spatial domain vector is obtained from a DFT matrix. Each column vector in the DFT matrix may be referred to as a DFT vector. In other words, the spatial domain vector may be a DFT vector. The spatial domain vector may alternatively be, for example, a 2-dimensional (2D)-discrete Fourier transform (DFT) vector or an oversampling 2D-DFT vector defined in a type II codebook in the NR protocol of TS 38.214 R15. For brevity, details are not described herein.

5. Frequency domain vector: The frequency domain vector is also referred to as a delay domain vector or the like. The frequency domain vector is a vector that may be used to represent a change rule of the channel in frequency domain. Each frequency domain vector may represent a change rule. When a signal is transmitted over a radio channel, the signal may arrive at a receive antenna from a transmit antenna through a plurality of paths. Frequency selective fading caused by multipath delay is a change in a frequency domain channel. Therefore, different frequency domain vectors may be used to represent a change rule of the channel in frequency domain caused by delays on different transmission paths. However, because a phase change of the channel in each frequency domain unit is related to a delay, it can be learned from the Fourier transform that a time delay of a signal in time domain may be equivalent to a phase gradient in frequency domain. Therefore, the frequency domain vector may also be referred to as a delay domain vector. In other words, the frequency domain vector may also be used to represent a delay feature of the channel.

That a reference signal is precoded based on the frequency domain vector may essentially mean that phase rotation is performed on each frequency domain unit in frequency domain based on an element in the frequency domain vector, to pre-compensate, by using a precoded reference signal, a frequency selective feature caused by a multipath delay. Therefore, a process of precoding the reference signal based on the frequency domain vector may be considered as a process of performing frequency domain precoding.

In embodiments of this application, the frequency domain vector and the spatial domain vector may be used to construct a plurality of combinations of spatial domain vectors and frequency domain vectors, which are also referred to as spatial-frequency vector pairs for short, to construct a precoding vector.

For ease of description below, it is assumed that the frequency domain vector is denoted as v. A length of the frequency domain vector may be denoted as N3, where N3≥1, and is an integer.

6. Spatial-frequency vector pair: One spatial-frequency vector pair may be obtained by combining one spatial domain vector and one frequency domain vector. One spatial-frequency vector pair may include one spatial domain vector and one frequency domain vector. One spatial-frequency component matrix may be obtained by using a spatial domain vector and a frequency-domain vector in one spatial-frequency vector pair. For example, one spatial-frequency component matrix may be obtained by multiplying one spatial-frequency vector by a conjugate transpose of one frequency-domain vector.

In embodiments of this application, spatial domain vectors and/or frequency domain vectors included in any two spatial-frequency vector pairs are different. In other words, spatial-frequency component matrices constructed by any two spatial-frequency vector pairs are also different.

7. Spatial-frequency domain matrix: The spatial-frequency domain matrix may be understood as an intermediate quantity used to determine a precoding matrix corresponding to each frequency domain unit. For the terminal device, the spatial-frequency domain matrix may be determined based on the precoding matrix or a channel matrix corresponding to each frequency domain unit. For a network device, the space-frequency matrix may be obtained by using a weighted sum of a plurality of space-frequency component matrices, to recover a downlink channel or a precoding matrix.

For example, the spatial-frequency domain matrix may be denoted as H, where H=[$w_0$ $w_1$ ... $w_{N_3-1}$]. $w_0$ to $w_{N_3-1}$ are $N_3$ column vectors corresponding to $N_3$ frequency domain units, each column vector may be a precoding matrix corresponding to each frequency domain unit, and a length of each column vector may be $N_s$. The $N_3$ column vectors correspond to precoding vectors of the $N_3$ frequency domain units. That is, the spatial-frequency domain matrix may be considered as a joint matrix formed by combining the precoding vectors corresponding to the $N_3$ frequency domain units.

In addition, the spatial-frequency domain matrix may correspond to a transport layer. A precoding vector of each frequency domain unit on a same transport layer may be used to construct a spatial-frequency domain matrix corresponding to the transport layer. For example, a precoding vector of each frequency domain unit on a $z^{th}$ (where 1≤z≤Z, and z is a positive integer) transport layer may be used to construct a spatial-frequency domain matrix corresponding to the $z^{th}$ transport layer. Z represents a quantity of transport layers, and Z is a positive integer.

It should be understood that the space-frequency matrix is merely a representation form used to determine an intermediate quantity of the precoding matrix, and should not constitute any limitation on embodiments of this application. For example, the column vectors in the spatial-frequency domain matrix are sequentially arranged in a head-to-tail manner from left to right, or arranged according to another predefined rule, to obtain a vector of an $N_s×N_3$ length. The vector may be referred to as a spatial-frequency vector.

It should be further understood that the dimensions of the space-frequency matrix and the space-frequency vector shown above are merely examples, and should not constitute any limitation on embodiments of this application. For example, the spatial-frequency domain matrix may alternatively be an ($N_3×N_s$)-dimensional matrix. Each row vector may correspond to one frequency domain unit, to determine a precoding vector of the corresponding frequency domain unit.

In addition, when a transmit antenna is configured with a plurality of polarization directions, the dimension of the space-frequency domain matrix may be further extended. For example, for a transmit antenna with two polarization directions, dimension of the spatial-frequency domain matrix may be $2N_s×N_3$ or $N_3×2N_s$. It should be understood that a quantity of polarization directions of a transmit antenna is not limited in embodiments of this application.

8. Dual-domain compression: Dual-domain compression may include compression of two dimensions: spatial domain compression and frequency domain compression. Spatial domain compression may mean that one or more spatial domain vectors are selected from a spatial domain vector set, as a vector used to construct a precoding vector. Frequency domain compression may mean that one or more frequency domain vectors are selected from a frequency domain vector set, as a vector used to construct a precoding vector. As described above, for example, a matrix constructed by using one spatial domain vector and one frequency domain vector may be referred to as a spatial-frequency component matrix. The one or more selected spatial domain vectors and the one or more selected frequency domain vectors may be used to construct one or more spatial-frequency component matrices. A weighted sum of the one or more space-frequency component matrices may be used to construct a space-frequency domain matrix corresponding to one transmission layer. In other words, the spatial-frequency domain matrix may approximate to the weighted sum of the spatial-frequency component matrix that is constructed by using the one or more selected spatial domain vectors and the one or more selected frequency domain vectors. Based on a spatial-frequency domain matrix corresponding to one transport layer, a precoding vector corresponding to each frequency domain unit on the transport layer may be further determined.

The one or more selected spatial domain vectors may be used to construct a matrix $W_1$, where each column vector in $W_1$ corresponds to one selected spatial domain vector. The one or more selected frequency domain vectors may be used to construct a matrix $W_3$, where each column vector in $W_3$ corresponds to one selected frequency domain vector. The spatial-frequency domain matrix H may be represented as a result $H=W_1 C W_3^H$ of linear combination of the one or more selected spatial domain vectors and the one or more selected frequency domain vectors.

Using one transport layer as an example, a spatial-frequency domain matrix corresponding to the transport layer is $H=W_1 C W_3^H$.

If an antenna with two polarization directions is used, I spatial domain vectors may be selected for each polarization direction, and dimension of $W_1$ may be $2N_s \times 2I$. In a possible implementation, the two polarization directions may use same I spatial domain vectors $\{b_s^0, b_s^1, \ldots, b_s^{I-1}\}$, where $b_s^0, b_s^1, \ldots, b_s^{I-1}$ may be, for example, I spatial domain vectors selected from the foregoing spatial domain vector set. In this case, $W_1$ may be expressed as $$\begin{bmatrix} b_s^0 & b_s^1 & \ldots & b_s^{I-1} & 0 & 0 & 0 & 0 \\ 0 & 0 & 0 & 0 & b_s^0 & b_s^1 & \ldots & b_s^{I-1} \end{bmatrix}$$

where $b_s^i$ represents an $i^{th}$ spatial domain vector of the selected I spatial domain vectors, and $i=0, 1, \ldots, I-1$.

If J frequency domain vectors are selected, dimension of $W_3^H$ may be $J \times N_3$. Each column vector in $W_3$ may be one frequency domain vector. In this case, each spatial domain vector in $W_1$ and each frequency domain vector in $W_3$ may constitute one spatial-frequency vector pair. Each spatial-frequency vector pair may correspond to one weighting coefficient. Therefore, there are $2I \times J$ spatial-frequency vector pairs that are constituted by 2I spatial domain vectors and J frequency domain vectors and that may be in a one-to-one correspondence with $2I \times J$ weighting coefficients.

C represents a coefficient matrix constructed by the $2I \times J$ weighting coefficients, and dimension of C may be $2I \times J$. An $i^{th}$ row in the coefficient matrix C may correspond to an $i^{th}$ spatial domain vector in a first polarization direction of the 2I spatial domain vectors, and an $(I+i)^{th}$ row in the coefficient matrix C may correspond to an $i^{th}$ spatial domain vector in a second polarization direction of the 2I spatial domain vectors. A $j^{th}$ column in the coefficient matrix C may correspond to a $j^{th}$ frequency domain vector of the J frequency domain vectors.

It should be understood that, the relationship among the spatial-frequency domain matrix H, $W_1$, and $W_3$ shown above is merely an example, and this shall not constitute any limitation on embodiments of this application. A person skilled in the art may perform mathematical transformation on the foregoing relationship based on a same concept, to obtain another calculation formula used to represent the relationship among the spatial-frequency domain matrix H, $W_1$, and $W_3$. For example, the spatial-frequency domain matrix H may alternatively be expressed as $H=W_1 C W_3$; in this case, each row vector in $W_3$ corresponds to one selected frequency domain vector.

In dual-domain compression, compression is performed in both spatial domain and frequency domain. When providing a feedback, the terminal device may feed back the one or more selected spatial domain vectors and the one or more selected frequency domain vectors to the network device, and does not need to feed back, based on each frequency domain unit (for example, a subband), a weighting coefficient (for example, including an amplitude and a phase) of the subband. Therefore, feedback overheads can be greatly reduced. In addition, because a frequency domain vector can represent a change rule of a channel in frequency domain, one or more frequency domain vectors are linearly superposed to simulate a change of the channel in frequency domain. In this way, relatively high feedback precision can still be kept, so that a precoding matrix that is restored by the network device based on the feedback of the terminal device can still well adapt to the channel.

It should be understood that, for ease of understanding of dual-domain compression, terms such as the spatial-frequency domain matrix and the spatial-frequency vector pair are separately defined above. However, this shall not constitute any limitation on embodiments of this application. A specific process in which the terminal device determines a precoding matrix indicator (PMI) is internal implementation behavior of the terminal device. The specific process in which the terminal device determines the PMI is not limited in embodiments of this application. A specific process in which the network device determines a precoding matrix based on the PMI is internal implementation behavior of the network device. The specific process in which the network device determines the precoding matrix based on the PMI is not limited in embodiments of this application either. The terminal device and the network device may separately generate the PMI and restore the precoding matrix by using different algorithms.

9. Weighting coefficient: In embodiments of this application, two types of weighting coefficients are mainly involved.

One type of weighting coefficient is a weighting coefficient determined based on a feedback manner for dual-domain compression. The weighting coefficient may also be referred to as a spatial-frequency combination coefficient, a spatial-frequency coefficient, or the like. Each weighting coefficient may correspond to one spatial domain vector and one frequency domain vector that are selected to construct a precoding vector, in other words, correspond to one spatial-frequency component matrix, or correspond to one spatial-frequency vector pair. Each weighting coefficient may be used to represent a weight of a spatial-frequency component matrix constructed by one spatial domain vector and one frequency domain vector that construct a precoding vector.

The other type of weighting coefficients includes weighting coefficients corresponding to component characteristics of a time-varying characteristic. Because the component characteristics of the time-varying characteristic may be represented by time domain vectors in embodiments of this application, the weighting coefficients may also be referred to as weighting coefficients corresponding to time domain vectors. Therefore, the category of weighting coefficients may also be referred to as time domain coefficients. Each weighting coefficient may correspond to one component characteristic, or one time domain vector, or one Doppler shift, and may be used to represent a weight of each component characteristic (or a time domain vector, or a Doppler shift) that builds a channel. As described above, the time domain vector may also be referred to as a Doppler vector. Correspondingly, the weighting coefficient may also be referred to as a Doppler coefficient.

For ease of distinguishing and understanding below, a weighting coefficient corresponding to a spatial-frequency vector pair is denoted as a spatial-frequency coefficient, and a weighting coefficient corresponding to a time domain vector is denoted as a time domain coefficient.

It should be understood that, the foregoing listed names are merely defined for ease of distinguishing, and this shall not constitute any limitation on embodiments of this application. A specific name of the coefficient is not limited in embodiments of this application.

10. Sampling window: In embodiments of this application, a terminal device may perform channel measurement in a specific time segment according to an indication of a network device. The time segment may be referred to as a sampling window. A time length of the time segment may be referred to as a window length or measurement duration of the sampling window. The window length is indicated by the network device by using signaling, for example, higher layer signaling (for example, a radio resource control (RRC) message). The measurement duration may alternatively be predefined, for example, defined in a protocol. This is not limited in embodiments of this application.

The network device may notify, by using signaling, the terminal device to start to perform channel measurement. For example, the network device may notify the terminal device of a start time and/or duration of the sampling window by using signaling, or the network device may trigger, by using signaling, the terminal device to start channel measurement. The terminal device may receive, for a plurality of times within the measurement duration, reference signals used for channel measurement, and may perform channel measurement based on the reference signals received for a plurality of times, to feed back a time-varying characteristic of a channel to the network device.

It should be understood that, that the network device notifies, by using signaling, the terminal device to start to perform channel measurement does not mean that the terminal device keeps performing channel measurement at the start time or trigger time indicated by the network device. The network device only notifies, by using signaling, the terminal device that channel measurement can be performed, and the terminal device may perform channel measurement based on the received reference signal within a time segment after the start time or the trigger time. The time segment is the foregoing sampling window.

It should be further understood that the network device does not necessarily always send reference signals in the sampling window, and the terminal device does not necessarily always receive reference signals and perform channel measurement in the sampling window. Duration corresponding to a plurality of sample points may be, for example, partial duration of the sampling window, or may be entire duration of the sampling window. A relationship between the two is not limited in embodiments of this application.

It should be further understood that, the feedback herein refers to a feedback of the time-varying characteristic of the channel by the terminal device, but it does not mean that the terminal device does not provide another feedback. For example, the terminal device may provide a feedback within the time segment based on the feedback manner for dual-domain compression, or may provide a feedback within the time segment based on a type II codebook feedback manner. For brevity, examples are not listed one by one herein. It should be noted that another feedback provided by the terminal device within this time segment is an independent process from the feedback of the time-varying characteristic of the channel described in embodiments of this application.

The terminal device may receive reference signals for a plurality of times within the measurement duration. A quantity of times that the terminal device receives reference signals within the measurement duration may be a product of a ratio of the measurement duration to the foregoing time unit and a pilot time-domain density.

11. Quantity of pilot transmissions: In embodiments of this application, the quantity of pilot transmissions may be a total quantity of times that the network device sends reference signals used for channel measurement, or a total quantity of times that the terminal device receives reference signals used for channel measurement. The quantity of pilot transmissions may be a total quantity of pilot transmissions within a period of time. When the quantity of pilot transmissions is greater than 1, the plurality of pilot transmissions may be a plurality of transmissions within the period of time. In other words, the plurality of pilot transmissions are transmissions at a plurality of moments.

The quantity of pilot transmissions may be indicated by the network device by using signaling, for example, higher layer signaling (for example, an RRC message). Alternatively, the quantity of pilot transmissions may be predefined, for example, defined in a protocol. This is not limited in embodiments of this application.

12. Time-varying characteristic: Being a time-varying channel, a radio channel encounters attenuation and loss from different paths. For example, a time-frequency dual selective fading channel, which is affected by both frequency selective fading caused by a multipath delay spread and time selective fading caused by a Doppler shift, is a typical time-varying channel.

Figure 2:
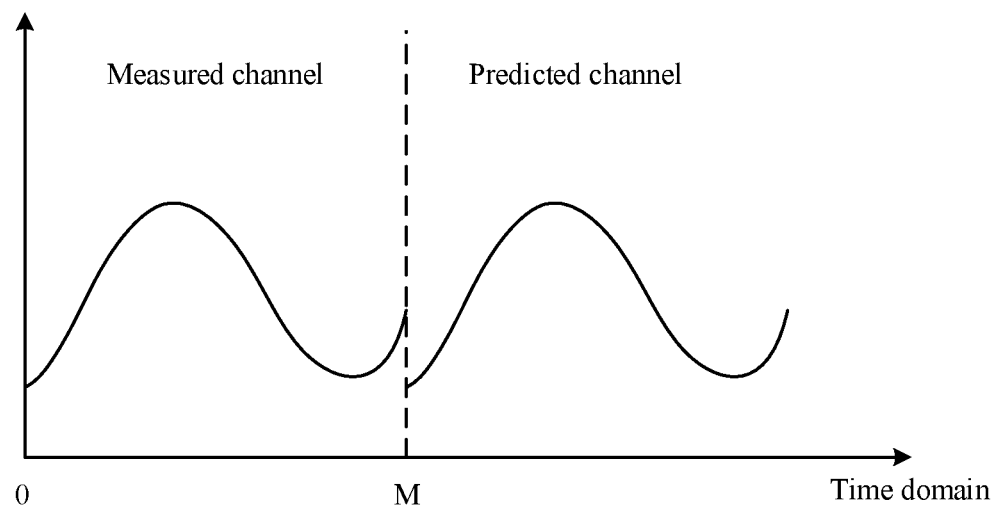
FIG. 2 is a schematic diagram of restoring and predicting a channel by using an M-dimensional orthogonal codebook.

If an orthogonal codebook is used to restore and predict a channel, the channel periodically repeats itself in time domain. FIG. 2 is a schematic diagram of restoring and predicting a channel by using an M-dimensional orthogonal codebook. As shown in the figure, if a channel is restored and predicted by using the M-dimensional orthogonal codebook, a channel at an $M^{th}$ time point is a duplicate of a channel at a $0^{th}$ time point. The time point may be, for example, a unit that may be used to represent time, such as a slot or millisecond. It can be learned that, if a sampling window of a measured channel is not one complete period or an integer multiple of one complete period, a change of the channel in time domain is truncated. As shown in FIG. 2, a curve is truncated at the $M^{th}$ time point. In this case, a predicted channel may be inaccurate, consequently affecting determining of a precoding matrix that is used for downlink data transmission and affecting transmission performance of a system.

A reason for the problem is as follows: When a signal is projected to a space corresponding to an orthogonal codebook (for example, a DFT codebook), it is usually assumed that the projected signal is a signal of one complete period or a signal of an integer multiple of one complete period in a sampling window. In other words, when a time domain signal is projected to the DFT codebook, it is assumed that the projected time domain signal is a signal of one complete period or a signal of an integer multiple of one complete period. Therefore, when direct time domain extrapolation is performed by using the orthogonal codebook, for example, when a signal at any time point after M time points that start from the $0^{th}$ time point and end at an $(M-1)^{th}$ time point is predicted, the projected signal is caused to periodically repeat itself in terms of time. Simply put, the DFT codebook is constituted by orthogonal DFT vectors with m being 0 to m being M−1, and expands into a complete space. Therefore, when an M×1 vector is extended based on m=M, m=M+1, and the like, periodic repeats occur, for example, periodic repeats such as a value at an m=M point being equal to a value at an m=0 point and a value at an m=M+1 point being equal to a value at an m=1 point, where the values are values of the curve on a longitudinal axis, as shown in FIG. 2. The longitudinal axis may represent, for example, an amplitude, a phase, a real part, an imaginary part, or the like. In other words, when the M×1 vector is extended based on m=M+d (d is an integer greater than or equal to 0), a periodic repeat with a value equal to a value at an m=d point occurs.

However, actually, a channel measured by a terminal device is usually less than one period in time domain. For example, the channel measured by the terminal device is ½, ¼, or the like of one complete period in time domain. In other words, it is difficult for a network device to ensure that a signal clipped by the terminal device in a sampling window is a signal of an integer multiple of one complete period. Therefore, if channel feeding-back and channel prediction are performed based on the orthogonal codebook, there is a high probability that a predicted channel is inaccurate, affecting transmission performance of the system.

In view of this, embodiments of this application provides a channel measurement method. A terminal device feeds back a time-varying characteristic of a channel in a complete period, so that a channel predicted by a network device complies with a real change of the channel in time domain. This helps the network device obtain an accurate channel prediction result, so that the network device can determine a precoding matrix that matches the channel and that is used for downlink data transmission. Therefore, this helps improve transmission performance of a system.

For ease of understanding of embodiments of this application, the following descriptions are first provided before embodiments of this application are described.

First, for ease of understanding and description, main parameters used in embodiments of this application are described as follows:

N: N represents dimension of a local time-varying characteristic of a channel, where N≥1 and is an integer.

M: M represents dimension of a complete time-varying characteristic of a channel, where M≥N, and M is an integer. A value of m may be any integer value from 0 to M−1. The value of m corresponds to the foregoing Doppler frequency. Different values of m correspond to different Doppler frequencies.

L: L represents a quantity of component characteristics fed back by a terminal device, where L≥1 and is an integer.

When the terminal device performs channel measurement based on a dual-domain compression codebook feedback manner, if the terminal device determines one or more time domain vectors based on one spatial-frequency vector pair, or the terminal device determines one or more common time domain vectors based on a plurality of spatial-frequency vector pairs, component characteristics fed back by the terminal device may be time domain vectors, and a quantity of the component characteristics is L. The L time domain vectors are different from each other.

If the terminal device determines one or more time domain vectors based on each of a plurality of spatial-frequency vector pairs, and time domain vectors determined based on at least two spatial-frequency vector pairs are different, component characteristics fed back by the terminal device may be determined based on time domain vectors respectively corresponding to the plurality of spatial-frequency vector pairs. A quantity L of the component characteristics may meet:

$$L = \sum_{k=0}^{K-1} L_k,$$

where $L_k$ represents a quantity of component characteristics fed back based on a $k^{th}$ spatial-frequency vector pair, and $L_k \geq 1$ and is an integer.

It should be understood that the foregoing defining of L as a quantity of component characteristics fed back by a terminal device is merely a possible manner of defining. For example, L may alternatively be defined as a quantity of component characteristics fed back based on one transport layer, a quantity of component characteristics fed back based on one receive antenna, or the like. This is not limited in embodiments of this application.

K: K represents a total quantity of spatial-frequency vector pairs used for determining a time-varying characteristic of a channel, where K≥1 and is an integer.

k: k may be any value from 0 to K−1, and k is an integer. The $k^{th}$ spatial-frequency vector pair may be one of the K spatial-frequency vector pairs.

K': K' is a quantity of spatial-frequency vector pairs used to construct a precoding matrix in dual-domain compression, K'≥K, and K' is an integer.

I: I represents a quantity of spatial domain vectors (or angle domain vectors). When the I spatial domain vectors (or angle domain vectors) are combined with the following J frequency domain vectors (delay domain vectors), K spatial-frequency vector pairs may be obtained, where I≥1 and is an integer.

J: J represents a quantity of frequency domain vectors (or delay domain vectors). When the J frequency domain vectors (or delay domain vectors) are combined with the foregoing I spatial domain vectors (or angle domain vectors), K spatial-frequency vector pairs may be obtained, where J≥1 and is an integer.

Second, in embodiments of this application, for ease of description, when numbering is involved, numbers may be consecutive and start from 1. For example, L time domain vectors include a first time domain vector to an $L^{th}$ time domain vector. By analogy, examples are not described one by one herein. Certainly, specific implementation is not limited thereto. For example, numbers may alternatively be consecutive and start from 0. It should be understood that the foregoing descriptions are all provided for ease of describing the technical solutions provided in embodiments of this application, but are not intended to limit the scope of embodiments of this application.

Third, in embodiments of this application, transformation of a matrix and a vector is involved in many places. For ease of understanding, a unified description is provided herein. A superscript T indicates a transpose. For example, $A^T$ indicates a transpose of a matrix (or vector) A. A superscript H indicates a conjugate transpose. For example, $A^H$ indicates a conjugate transpose of a matrix (or vector) A. For brevity, descriptions of a same or similar case are omitted below.

Fourth, in embodiments of this application, a weighted sum of one or more component characteristics, a weighted sum of one or more time domain vectors, a weighted sum of an exponential function of one or more Doppler shifts, and the like are mentioned in many places.

The component characteristic is used as an example. When there is only one component characteristic, the "weighted sum of one or more component characteristics" herein may refer to only one component characteristic. When there are a plurality of component characteristics, the "weighted sum of one or more component characteristics" herein may represent a result obtained by weighting the plurality of component characteristics based on a weight (or a weighting coefficient) of each component characteristic. For brevity, descriptions of a same or similar case are omitted below.

Fifth, in embodiments of this application, the network device may determine a precoding matrix based on a feedback of the terminal device. When the precoding matrix corresponds to one transport layer or one polarization direction, the precoding matrix may alternatively be in a form of a vector, for example, a precoding vector. A specific form of the precoding matrix is not limited in embodiments of this application. For example, the precoding matrix may be a matrix, or may be a vector.

Sixth, in embodiments of this application, "being used to indicate" may include "being used to directly indicate" and "being used to indirectly indicate". For example, that the indication information is described as being used to indicate information I may include a direct indication I or an indirect indication I of the indication information, but it does not mean that the indication information necessarily carries I.

The information indicated by the indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected according to a specific requirement. The selected indication manner is not limited in embodiments of this application. In this way, the indication manner in embodiments of this application should be understood as covering various methods that can enable a to-be-indicated party to learn of the to-be-indicated information.

In addition, the to-be-indicated information may have another equivalent form. For example, a row vector may be represented as a column vector; a matrix may be represented by using a transpose matrix of the matrix, or a matrix may be represented in a form such as a vector or an array, where the vector or the array may be formed by connecting row vectors or column vectors in the matrix to each other; and a Kronecker product of two vectors may be represented in a form such as a product of a transpose vector of one vector and a transpose vector of another vector. The technical solutions provided in embodiments of this application should be understood as covering various forms. For example, some or all features in embodiments of this application should be understood as covering various representations of the features.

The to-be-indicated information may be sent as a whole, or may be divided into a plurality of pieces of sub-information for separate sending. In addition, sending periods and/or sending occasions of the sub-information may be the same or may be different. A specific sending method is not limited in embodiments of this application. The sending periods and/or the sending occasions of the sub-information may be predefined, for example, predefined according to a protocol, or may be configured by a transmit end device by sending configuration information to a receive end device. The configuration information may include, for example, but is not limited to, one or a combination of at least two of radio resource control signaling such as RRC signaling, MAC layer signaling such as MAC control element (MAC-CE) signaling, and physical layer signaling such as downlink control information (DCI).

Seventh, the terms "first", "second", and various numbers in the following embodiments are merely used for distinguishing for ease of description, and are not intended to limit the scope of embodiments of this application. For example, the terms are used to distinguish between different indication information.

Eighth, "predefinition" or "preconfiguration" may be implemented by pre-storing corresponding code or a corresponding table in a device (for example, including a terminal device or a network device) or in another manner that can be used to indicate related information. A specific implementation of "predefinition" or "preconfiguration" is not limited in embodiments of this application. "Storage" may be storage in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. A type of the memory may be a storage medium in any form, and this is not limited in embodiments of this application.

Ninth, a "protocol" in embodiments of this application may be a standard protocol in the communications field, for example, may include an LTE protocol, an NR protocol, and a related protocol applied to a future communications system. This is not limited in embodiments of this application.

Tenth, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c each may be singular or plural.

Eleventh, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation, and do not mean any other limitation.

Twelfth, in embodiments of this application, when it is expressed that a plurality of time domain vectors are different, it may mean that the time domain vectors are partially different, or may mean that the time domain vectors are completely different; and when it is expressed that a plurality of time domain coefficients are different, it may mean that the time domain coefficients are partially different, or may mean that the time domain coefficients are completely different. This is not limited in embodiments of this application.

The following describes in detail the channel measurement method provided in embodiments of this application with reference to the accompanying drawings.

The method provided in embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using the multi-antenna technology.

It should be understood that, the method provided in embodiments of this application is not limited to communication between the network device and the terminal device, and may be further applied to communication between terminal devices. A scenario to which the method is applied is not limited in embodiments of this application. In embodiments shown below, for ease of understanding and description, interaction between the network device and the terminal device is used as an example to describe in detail the method provided in embodiments of this application.

It should be further understood that, a specific structure of an entity for performing the method provided in embodiments of this application is not particularly limited in the following embodiments, provided that the entity can run a program that records code of the method provided in embodiments of this application to perform communication according to the method provided in embodiments of this application. For example, the entity for performing the method provided in embodiments of this application may be a terminal device, a network device, or a function module that is in a terminal device or a network device and that can invoke and execute the program.

It should be further understood that, for ease of understanding, the method provided in embodiments of this application is described in detail below by using the feedback manner for dual-domain compression as an example. However, this shall not constitute any limitation on the scenario to which the method provided in embodiments of this application is applicable. The method provided in embodiments of this application may be applied to another feedback manner in which a precoding matrix is indicated by feeding back a beam vector and a weighting coefficient, for example, a type II codebook feedback manner.

The following describes in detail the channel measurement method provided in embodiments of this application with reference to the accompanying drawings.

In embodiments of this application, a terminal device may represent a time-varying characteristic of a channel in one complete period by using a weighted sum of one or more component characteristics. The time-varying characteristic in one complete period may be referred to as a complete time-varying characteristic for short. Correspondingly, a time-varying characteristic in some time segments of the complete period may be referred to as a local time-varying characteristic for short. In the method provided in embodiments of this application, the terminal device measures a local time-varying characteristic of a channel and feeds back a complete time-varying characteristic corresponding to the local time-varying characteristic of the channel, so that a network device restores and predicts a time-varying regularity of the channel, and further obtains a precoding vector matching the channel.

It should be understood that the complete time-varying characteristic and the local time-varying characteristic described above are relative. The complete time-varying characteristic does not necessarily indicate one complete period, for example, may alternatively indicate an integer multiple of one complete period. The local time-varying characteristic does not necessarily indicate less than one complete period. The local time-varying characteristic merely does not constitute one complete period or an integer multiple of one complete period.

For example, in the following description provided with reference to FIG. 3(a) to FIG. 3(f), N sample points used by a terminal device may be sample points in one complete period or sample points in a plurality of complete periods. In other words, duration corresponding to the N sample points used by the terminal device may be shorter or longer than one complete period. This is not limited in embodiments of this application. This is because the terminal device cannot learn of duration of one complete time-varying period of a channel in advance, and consequently, cannot predict a relationship between the duration corresponding to the N sample points used and one complete period. However, the terminal device is capable of performing channel measurement based on a received reference signal, to determine a proportion of the duration corresponding to the N sample points in an integer multiple of one complete period that is closest to the duration. For example, assuming that the duration corresponding to the N sample points is 1.6 periods, the terminal device can determine a proportion of the N sample points in two periods. Based on the foregoing description, the local time-varying characteristic described below may be understood as a local time-varying characteristic relative to one complete period or an integer multiple of one complete period, and the complete time-varying characteristic corresponding to the local time-varying characteristic may be understood as one complete period or an integer multiple of one complete period.

FIG. 3(a) to FIG. 3(f) are schematic diagrams of a channel measurement method according to an embodiment of this application. FIG. 3(a) to FIG. 3(d) show a general idea of the channel measurement method provided in this embodiment of this application.

Figure 3A:
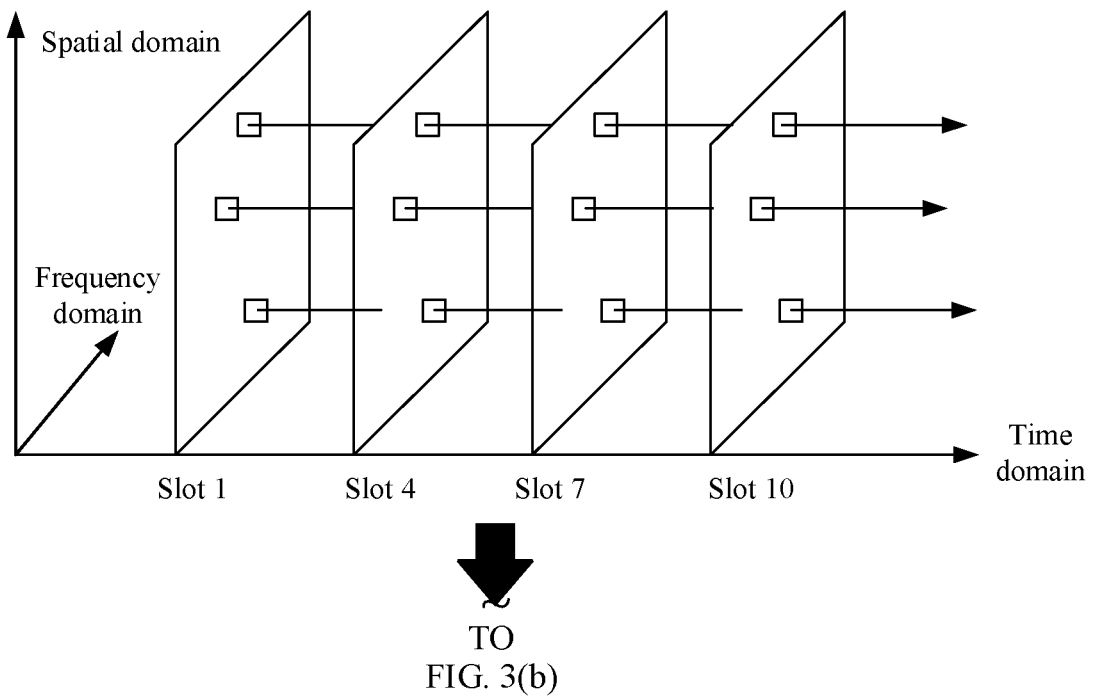

In FIG. 3(a), a terminal device may determine a plurality of spatial-frequency vector pairs in a plane formed by spatial domain and frequency domain. Three spatial-frequency vector pairs are shown in the figure (that is, three small squares shown in a spatial-frequency domain matrix corresponding to a slot in the figure). The terminal device may determine spatial-frequency coefficients of the three spatial-frequency vector pairs in different slots based on reference signals that the terminal device receives in a plurality of slots. As shown in the figure, the terminal device determines values of the spatial-frequency coefficients of the three spatial-frequency vector pairs in a slot 1, a slot 4, a slot 7, and a slot 10 based on reference signals received in the four slots.

It should be understood that the slot shown in FIG. 3(a) is merely a manner used for measuring time, and shall not constitute any limitation on embodiments of this application. The plurality of spatial-frequency coefficients shown in the figure may alternatively be spatial-frequency coefficients determined based on reference signals received in a plurality of different milliseconds or different seconds. For brevity, cases are not described herein one by one.

Figure 3B:
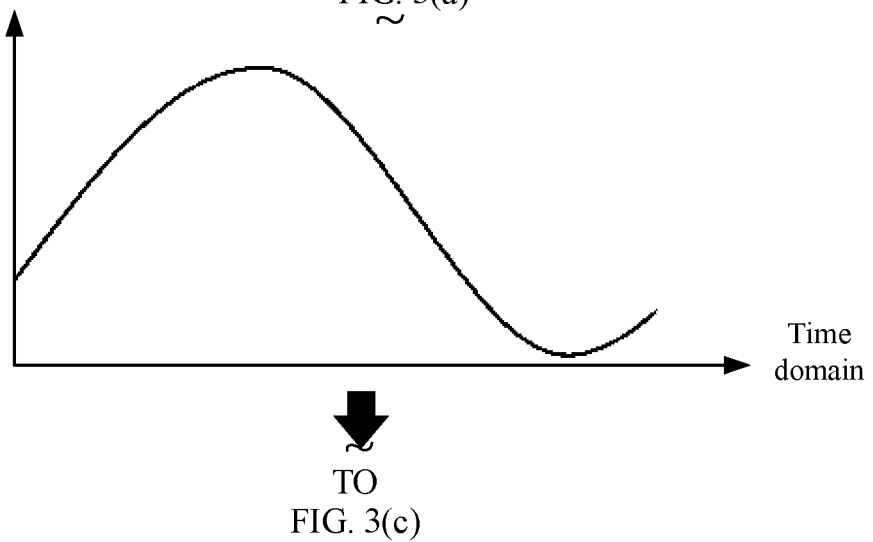

A change of a spatial-frequency coefficient of each spatial-frequency vector pair with time may be described as a function of a spatial-frequency coefficient of a spatial-frequency vector pair relative to time. A curve shown in FIG. 3(b) is a change of a spatial-frequency coefficient (for example, an amplitude, a phase, a real part, or an imaginary part) of a spatial-frequency vector pair with time, that is, a change of a channel with time. A vertical coordinate in FIG. 3(b) may be, for example, an amplitude, a phase, a real part, or an imaginary part of the spatial-frequency coefficient. However, it may be understood that the change of the channel with time shown by the curve does not necessarily represent a change of the channel in one complete period. In other words, the curve shown in FIG. 3(b) does not necessarily show a complete time-varying characteristic of the channel. The channel measurement method provided in this embodiment of this application is to determine a complete time-varying characteristic based on a local time-varying characteristic of a channel obtained through measurement, so that a network device predicts a future channel. To be specific, the network device wants to be capable of accurately predicting a change of the channel in FIG. 3(b) with time in one or more complete periods.

In an implementation, the terminal device may attempt to determine, by using a plurality of orthogonal codebooks of different dimension, a relationship between a complete period of a channel and duration corresponding to sample points measured by the terminal device, or to determine a relationship between a complete time-varying characteristic of a channel and a local time-varying characteristic of the channel. For example, for N sample points, the terminal device may attempt to use different values for orthogonal codebook dimension, so that in an M-dimensional vector obtained by calculating a weighted sum of one or more time domain vectors (that is, an example of a component characteristic, or a form of a component characteristic) in a selected orthogonal codebook and corresponding time domain coefficients, first N spatial-frequency coefficients are closest to values of the N sample points, for example, having a minimum mean square error (MSE) or being most correlated.

Figures 3B, 3C, 3D:

FIG. 3(c) and FIG. 3(d) show a relationship between N and M. FIG. 3(c) is a schematic diagram of a terminal device indicating L component characteristics and their time domain coefficients based on a local time-varying characteristic of a channel. FIG. 3(d) is a schematic diagram of a network device determining a complete time-varying characteristic of a channel based on L component characteristics and their time domain coefficients.

A rectangle constituted by four dark squares in FIG. 3(c) represents N (that is, N=4) sample points in a sampling window. The N sample points may construct an (N×1)-dimensional vector c. N elements in the vector c may represent spatial-frequency coefficients that are obtained through measurement performed at the N different sample points based on one spatial-frequency vector pair.

A square constituted by 6×6 squares in FIG. 3(c) may represent an M (that is, M=6)-dimensional orthogonal codebook. The M-dimensional orthogonal codebook may be obtained, for example, through calculation by using $$e^{j\frac{2\pi nm}{M}}.$$

When n and m separately traverse values in a range from 0 to M−1, M (M×1)-dimensional vectors of the orthogonal codebook can be obtained, where n and m are both integers.

The M-dimensional orthogonal codebook may be understood as that a complete period of a channel is divided into M points in time domain. The terminal device wants to be capable of determining a proportion of the N sample points in the M points based on the N sample points in the sampling window (for ease of understanding, first four rows of the 6×6 squares are shown as shaded squares in the figure), that is, determining a proportion of the local time-varying characteristic in the complete time-varying characteristic, so that the network device can predict a future channel based on the M-dimensional orthogonal codebook.

Rectangles constituted by light shaded squares in FIG. 3(c) represent three vectors, namely, $d_0$, $d_1$, and $d_2$ shown in the figure, that are in the M-dimensional codebook and that are selected to obtain a weighted sum to represent the local time-varying characteristic of the channel, that is, show an example of a case in which L=3. The three vectors may be (N×1)-dimensional vectors selected from an (N×M)-dimensional non-orthogonal codebook or (M×1)-dimensional vectors selected from an M-dimensional orthogonal codebook. This is not limited in embodiments of this application. The figure shows an example of a case in which the three vectors are (N×1)-dimensional vectors. Weighting coefficients corresponding to the three vectors are shown by three light shaded squares in an (M×1)-dimensional vector in FIG. 3(c), where the three light shaded squares correspond to $b_{d_0}$, $b_{d_1}$, and $b_{d_2}$ shown in the figure, respectively. It should be understood that positions of the three vectors $d_0$, $d_1$, and $d_2$ in the codebook (for example, the (N×M)-dimensional non-orthogonal codebook or the M-dimensional orthogonal codebook) correspond to positions of the weighting coefficients $b_{d_0}$, $b_{d_1}$, and $b_{d_2}$ corresponding to the three vectors in the (M×1)-dimensional vector.

Three rectangles constituted by light shaded squares in FIG. 3(d) represent three component characteristics corresponding to the three vectors in FIG. 3(c). It can be learned that the three component characteristics correspond to the three vectors in FIG. 3(c). Indexes of the three component characteristics in the M-dimensional codebook shown in FIG. 3(d) may be the same as indexes of the three vectors shown in FIG. 3(c) in the (N×M)-dimensional non-orthogonal codebook.

After a weighted sum of the three component characteristics is calculated, an (M×1)-dimensional vector c' shown in FIG. 3(d) can be obtained. M elements in the vector c' may represent spatial-frequency coefficients that are of the foregoing spatial-frequency vector pairs at M different time points and that are determined by the network device. Of the M elements, first four (or first N) elements represent spatial-frequency coefficients that are at the N sample points and that are restored based on a feedback from the terminal device, and last two (or last (M–N)) elements represent spatial-frequency coefficients that are at last (M–N) time points and that are predicted based on the feedback from the terminal device. For ease of distinguishing, different shaded squares are used in the figure to distinguish between and illustrate the elements. The elements illustrated by ■ may correspond to a channel change in a sampling window in FIG. 3(f), and the elements illustrated by ▨ may correspond to a predicted channel change in a dashed line box in FIG. 3(f).

As described above, a change of a channel in time domain may be represented by a weighted sum of time domain vectors corresponding to several slowly varying Doppler shifts. Therefore, when a change of the channel in a complete period (that is, the foregoing complete time-varying characteristic of the channel) is transformed into Doppler domain, several fixed Doppler shifts can be obtained, as shown in FIG. 3(e).

Figure 3F:
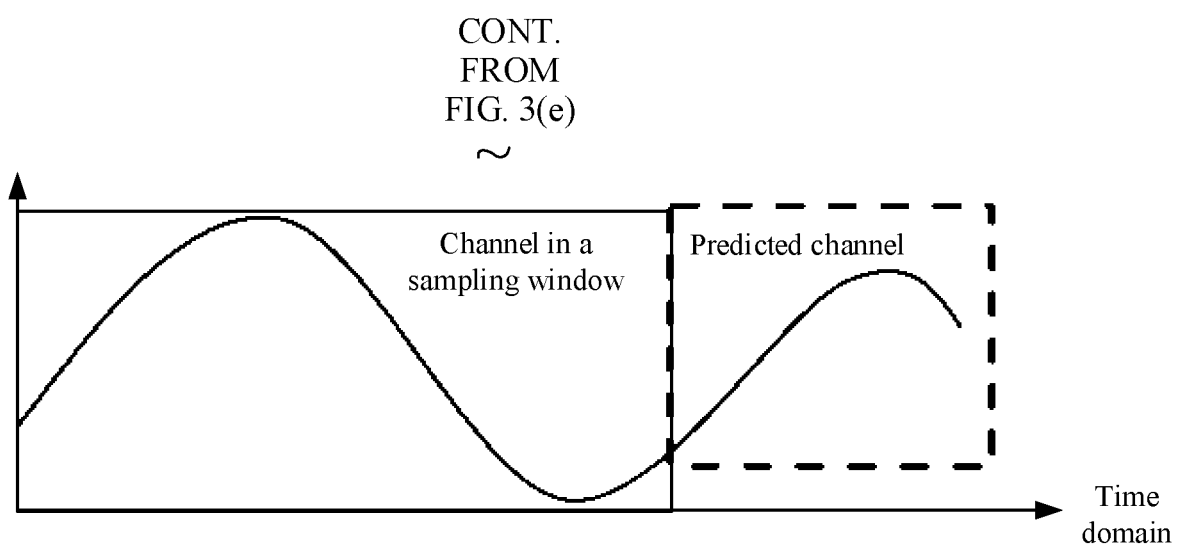

FIG. 3(e) shows three Doppler shifts (or Doppler frequencies). Coordinates of the three Doppler shifts on a lateral axis correspond to positions of the three Doppler shifts, and coordinates of the three Doppler frequencies on a longitudinal axis correspond to amplitudes (or may alternatively be phases, real parts, or imaginary parts) of the three Doppler shifts. If the complete time-varying characteristic of the channel is represented by a weighted sum of time domain vectors corresponding to the three Doppler shifts, it may be understood as that the change of the channel in a complete period is compressed in time domain (or is compressed in Doppler domain). Based on the foregoing complete time-varying characteristic of the channel, the network device can restore the channel previously measured by the terminal device, and can further predict a change of the channel at future moments, as shown in FIG. 3(f). A curve in the dashed line box in FIG. 3(f) is a prediction of the channel at future moments.

Based on the foregoing concept, the channel measurement method provided in this embodiment of this application is described in more detail below with reference to FIG. 4.

It should be understood that merely for ease of understanding, the foregoing uses a change of a spatial-frequency coefficient of one spatial-frequency vector pair in time domain as an example to describe the concept of the channel measurement method provided in this embodiment of this application. However, this shall not constitute any limitation on embodiments of this application. The terminal device may perform measurement and provide a feedback based on a change of a spatial-frequency coefficient of each of one or more spatial-frequency vector pairs in time domain. The network device may also restore and predict a channel based on the one or more spatial-frequency vector pairs. When there are a plurality of spatial-frequency vector pairs, the vectors and the matrix dimension shown in the figure may change. For example, the N sample points may be extended to N groups of sample points, and each group of sample points may include a plurality of spatial-frequency coefficients respectively corresponding to the plurality of spatial-frequency vector pairs. It should be understood that when there are a plurality of spatial-frequency vector pairs, changes of the foregoing vectors, matrices, and the like are all mathematical transformations or equivalent replacements made based on a same concept as the concept described above, and shall all fall within the protection scope of embodiments of this application. The vectors and the matrix dimension shown in the figure shall not constitute any limitation on embodiments of this application. For ease of understanding, more possible vectors and matrix forms are also listed below with reference to specific embodiments, and details are not described herein.

Figure 4:
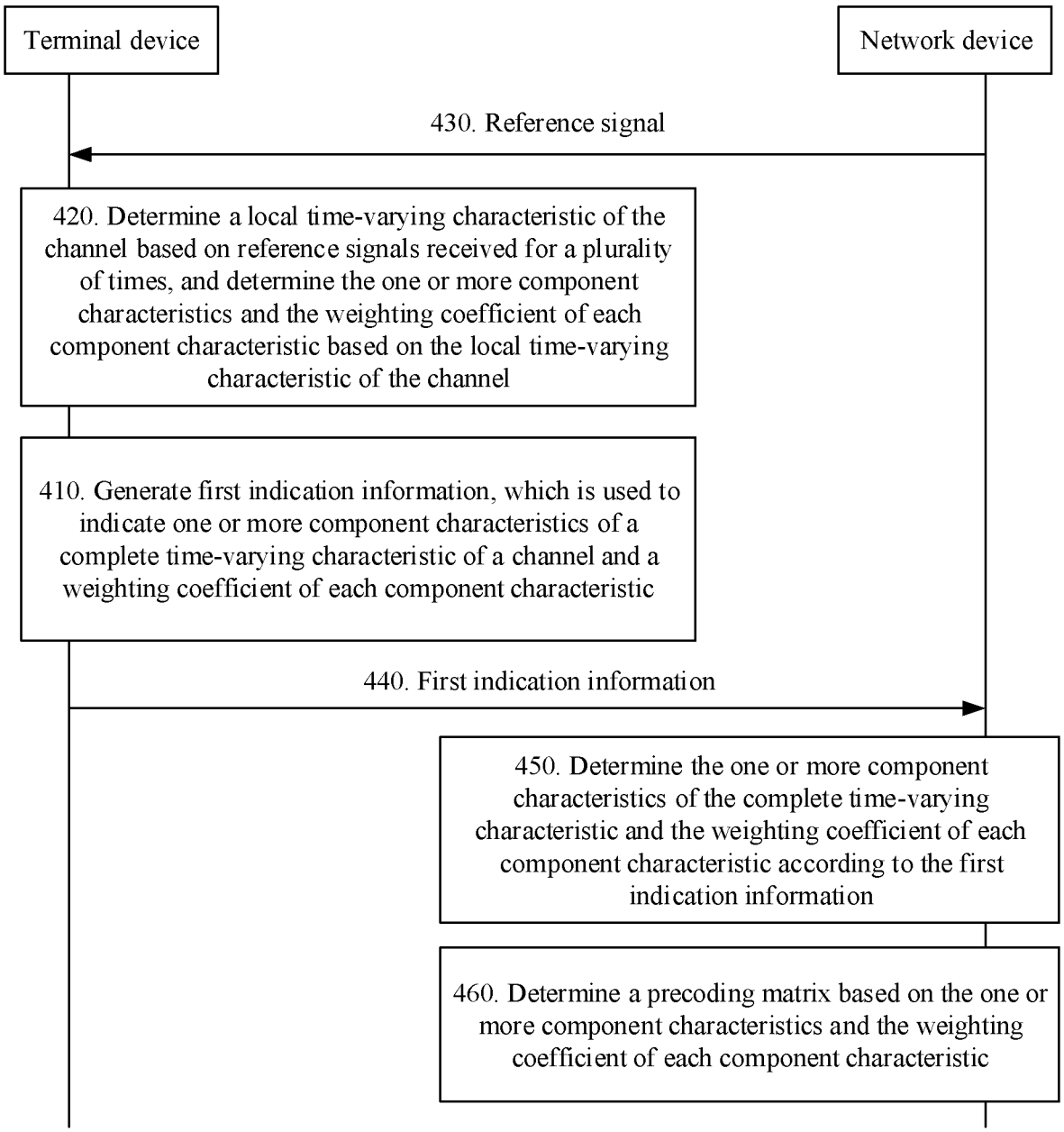
FIG. 4 is a schematic flowchart of a channel measurement method according to an embodiment of this application.

FIG. 4 is a schematic flowchart of a channel measurement method 400 according to an embodiment of this application, where the method is shown from a perspective of device interaction.

For ease of understanding, in the embodiment shown below, a specific process of the channel measurement method provided in this embodiment of this application is described in detail by using one transport layer of one or more transport layers and one polarization direction of one or more polarization directions corresponding to the transport layer as an example. It should be understood that a quantity of transport layers and a quantity of polarization directions of a transmit antenna are not limited in embodiments of this application. In the following example, one transport layer may be any one of the one or more transport layers, and one polarization direction may be any one of the one or more polarization directions.

As shown in FIG. 4, the method 400 may include operation 410 to operation 460. The following describes the operations in the method 400 in detail.

In operation 410, a terminal device generates first indication information. The first indication information is used to indicate one or more component characteristics of a complete time-varying characteristic of a channel and a weighting coefficient of each component characteristic.

The complete time-varying characteristic of the channel may be represented by a weighted sum of one or more component characteristics. That is, the time-varying characteristic of the channel may be represented by using one component characteristic, or may be represented by using a weighted sum of a plurality of component characteristics. The component characteristic may be represented, for example, in a form of a vector or matrix.

Dual-domain compression is used as an example. From the foregoing description provided with reference to FIG. 3(a) to FIG. 3(f), it is learned that a change of a spatial-frequency coefficient corresponding to each spatial-frequency vector pair with time may be approximately represented by a weighted sum of one or more time domain vectors. In other words, a weighted sum of one or more time domain vectors may be used to represent a changing trend of a channel or a time-varying characteristic of a channel.

In dual-domain compression, there may be one or more spatial-frequency vector pairs that may be used to construct a precoding matrix. A quantity of the one or more spatial-frequency vector pairs may be denoted as, for example, K', where K' is a positive integer. Therefore, one or more component characteristics that may be used to represent a complete time-varying characteristic of a channel include one or more component characteristics that may be used to approximately represent changes, with time, of spatial-frequency coefficients corresponding to at least some (for example, denoted as K, where 1≤K≤K', and K is a positive integer) of the K' spatial-frequency vector pairs.

It is assumed that one or more time domain vectors used to represent a change of a spatial-frequency coefficient of a $k^{th}$ spatial-frequency vector pair of the K spatial-frequency vector pairs with time are, for example, $L_k$ time domain vectors, where $L_k$ is a positive integer, and k may be any integer value from 0 to K−1.

For the K spatial-frequency vector pairs, the determined time domain vectors may be determined, for example, based on a same codebook, or may be determined based on different codebooks. In other words, the time domain vectors respectively corresponding to the K spatial-frequency vector pairs may be vectors of same dimension or vectors of different dimension. Even if the time domain vectors are vectors of same dimension, the time domain vectors may alternatively be different vectors. This is not limited in embodiments of this application.

In a possible implementation, the component characteristic is a time domain vector. In other words, for any value of K, the component characteristic may be a time domain vector.

Optionally, one or more component characteristics used to represent a change of a spatial-frequency coefficient of each of the K spatial-frequency vector pairs with time may be common L time domain vectors, where L is a positive integer. To be specific, for any value of k, $L_k$ is L; and for any two different values of k, corresponding L time domain vectors are the same. In this case, the L time domain vectors may be determined based on a same codebook, for example, an M-dimensional orthogonal codebook. The component characteristic may be represented by, for example, an (M×1)-dimensional time domain vector. The one or more component characteristics whose weighted sum may be used to approximately represent the change of the spatial-frequency coefficient of each of the K spatial-frequency vector pairs with time may be, for example, one or more time domain vectors selected from a codebook.

In this case, a weighted sum of the L time domain vectors may be used to determine the complete time-varying channel characteristics. The weighted sum of the L time domain vectors may be an (M×1)-dimensional vector. M elements in the vector may be spatial-frequency coefficients corresponding to M time points. The M spatial-frequency coefficients may be shared by the K spatial-frequency vector pairs, and may be used to determine a spatial-frequency domain matrix that is at any time point, that is, may be used to determine a channel that is at any time point. Optionally, time domain vectors corresponding to at least two of the K spatial-frequency vector pairs are different. To be specific, for different values of k, values of $L_k$ may be the same or different, and the $L_k$ time domain vectors may alternatively be different. For example, the $L_k$ time domain vectors may be determined based on different codebooks or based on a same codebook.

The change of the spatial-frequency coefficient of each spatial-frequency vector pair with time may be approximately represented by a weighted sum of the $L_k$ time domain vectors. In the K spatial-frequency vector pairs, each spatial-frequency vector pair may correspond to one or more time domain vectors. If each time domain vector is defined as a component characteristic, a weighted sum of one or more time domain vectors (or component characteristics) corresponding to a spatial-frequency vector pair may be used to approximately represent a change of a spatial-frequency coefficient of the spatial-frequency vector pair with time. Based on respective changes of spatial-frequency coefficients of the K spatial-frequency vector pairs with time, spatial-frequency matrices at different time points can be constructed based on the K spatial-frequency vector pairs. To be specific, changes, with time, of the spatial-frequency matrices constructed based on the K spatial-frequency vector pairs can be determined, that is, a change of a channel with time can be determined. In other words, the complete time-varying characteristic of the channel can be determined based on one or more component characteristics corresponding to each of the K spatial-frequency vector pairs and a weighting coefficient of each component characteristic.

It should be understood that defining a time domain vector as a component characteristic is merely a possible implementation. In another implementation, a component characteristic may alternatively be determined based on a plurality of time domain vectors. A specific form of the component characteristic is not limited in embodiments of this application. It may be understood that corresponding to component characteristics that are in different forms, there are corresponding changes in a channel determining process. However, these changes can all be obtained based on a same concept. A person skilled in the art may make corresponding changes based on the method provided in this embodiment of this application, to determine a change of a channel based on one or more component characteristics.

For example, it is assumed that the terminal device determines, based on same-dimension codebooks, for example, M-dimensional orthogonal codebooks, a time domain vector corresponding to each spatial-frequency vector pair.

When any two spatial-frequency vector pairs correspond to a same quantity of time domain vectors, that is, a value of $L_k$ does not change for different values of k, each component characteristic may alternatively be an (M×K)-dimensional matrix corresponding to the K spatial-frequency vector pairs, and each column may be one (M×1)-dimensional time domain vector and may correspond to one spatial-frequency vector pair; or each component characteristic may alternatively be an [(M×K)×1]-dimensional vector corresponding to the K spatial-frequency vector pairs, and every M elements may be obtained from one (M×1)-dimensional time domain vector and may correspond to one spatial-frequency vector pair.

For another example, it is assumed that the terminal device determines, based on different codebooks, time domain vectors corresponding to different spatial-frequency vector pairs, each component characteristic may include one time domain vector corresponding to at least one of the K spatial-frequency vector pairs, or time domain vectors corresponding to at least two spatial-frequency vector pairs are different.

It should be understood that the foregoing different codebooks may be codebooks of different dimension or codebooks of same dimension. The different codebooks may be, for example, orthogonal codebooks that are of same dimension but are determined based on different over-sampling coefficients.

It should be further understood that a correspondence between a component characteristic and a spatial-frequency vector pair is not limited in embodiments of this application. A specific form of the component characteristic is not limited either in embodiments of this application. For ease of understanding and description, the method provided in this embodiment of this application is described below in detail by using an example in which the component characteristic is a time domain vector, and cases in which the component characteristic is in other forms are briefly described.

In this embodiment of this application, the complete time-varying characteristic of the channel may correspond to a local time-varying channel characteristic. The local time-varying characteristic may be determined by, for example, the terminal device performing channel measurement based on reference signals received for a plurality of times. As described above, the M-dimensional orthogonal codebook may be obtained, for example, through calculation by using $$e^{j\frac{2\pi nm}{M}},$$

where n may correspond to a row (which may be understood as a time point in an implementation), and m may correspond to a column (which may be understood as a Doppler frequency, that is, an index of a time domain vector, in an implementation). When n and m separately traverse values in a range from 0 to M−1, the following M (M×1)-dimensional vectors can be obtained:

$$\begin{bmatrix} 1 \\ 1 \\ \vdots \\ 1 \end{bmatrix}, \begin{bmatrix} 1 \\ e^{j\frac{2\pi}{M}} \\ \vdots \\ e^{j\frac{2\pi(M1)}{M}} \end{bmatrix}, \begin{bmatrix} 1 \\ e^{j\frac{4\pi}{M}} \\ \vdots \\ e^{j\frac{4\pi(M1)}{M}} \end{bmatrix}, \ldots, \text{ and } \begin{bmatrix} 1 \\ e^{j\frac{2\pi(M1)}{M}} \\ \vdots \\ e^{j\frac{2\pi(M1)(M1)}{M}} \end{bmatrix}.$$

The M (M×1)-dimensional vectors may constitute, for example, an M-dimensional orthogonal codebook. However, it should be understood that the M (M×1)-dimensional vectors listed above are merely a possible form of the M-dimensional orthogonal codebook. The M-dimensional orthogonal codebook is not limited to the foregoing form.

When the complete time-varying characteristic of the channel may be represented by a weighted sum of L component characteristics, the local time-varying characteristic of the channel may be represented by a weighted sum of vectors each of which is constituted by N elements in each of the L component characteristics. In other words, the local time-varying characteristic of the channel may be represented by a weighted sum of L (N×1)-dimensional vectors, and the complete time-varying characteristic of the channel may be represented by a weighted sum of L (M×1)-dimensional vectors. The L (M×1)-dimensional vectors may be determined based on the M-dimensional orthogonal codebook, for example, determined based on the M (M×1)-dimensional vectors listed above. The L (N×1)-dimensional vectors may be determined based on an (N×M)-dimensional non-orthogonal codebook. The following describes a relationship between the (N×M)-dimensional non-orthogonal codebook and the M-dimensional orthogonal codebook in detail with reference to FIG. 5(a) to FIG. 5(c).

The L (N×1)-dimensional vectors may correspond to the L (M×1)-dimensional vectors. As described above, indexes of the L (N×1)-dimensional vectors in the non-orthogonal codebook are the same as indexes of the L (M×1)-dimensional vectors in the orthogonal codebook. Actually, indexes of the L (N×1)-dimensional vectors in the non-orthogonal codebook are the same as indexes of the L (M×1)-dimensional vectors in the orthogonal codebook. In other words, the L (N×1)-dimensional vectors and the L (M×1)-dimensional vectors can be both obtained through calculation by using a same formula, for example, $$e^{j\frac{2\pi nm}{M}}$$

shown above, and differ in that values of n are different in a vector generation process. For the former, values of n include only N values. For example, n may traverse values from 0 to N−1. For the latter, n may traverse values from 0 to M−1, and M values in total are included.

Figure 5A:
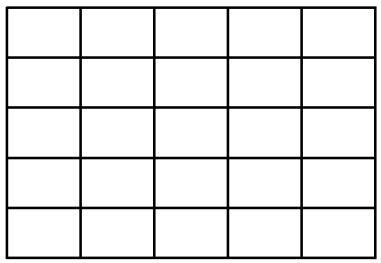
FIG. 5(a) to FIG. 5(c) show a relationship between an (N×M)-dimensional non-orthogonal codebook and an M-dimensional orthogonal codebook.
Figure 5A:
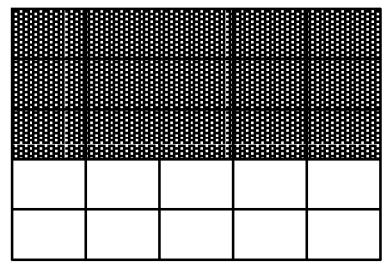
Figure 5B:
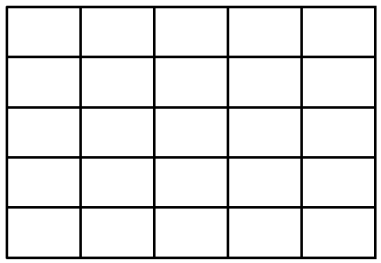
Figure 5B:
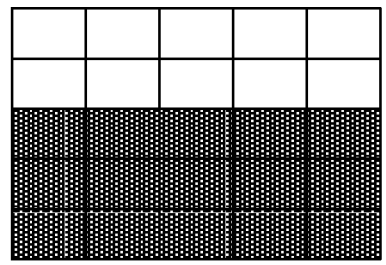
Figure 5C:
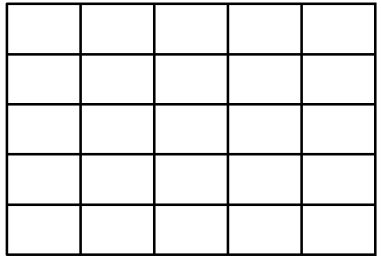
Figure 5C:
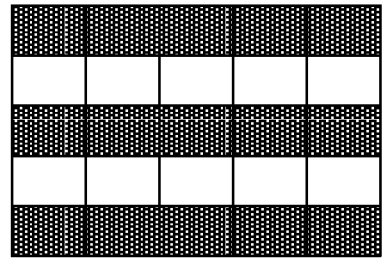

FIG. 5(a) to FIG. 5(c) show a relationship between an (N×M)-dimensional non-orthogonal codebook and an M-dimensional orthogonal codebook. FIG. 5(a) to FIG. 5(c) show three possible forms of the relationship between the (N×M)-dimensional non-orthogonal codebook and the M-dimensional orthogonal codebook. FIG. 5(a) to FIG. 5(c) show (M×M)-dimensional matrices constructed by the M-dimensional orthogonal codebook and (N×M)-dimensional matrices constructed by the (N×M)-dimensional non-orthogonal codebook. Each small square in the figures represents one element in the matrices. The (N×M)-dimensional matrix shown in FIG. 5(a) is constituted by first N rows of the (M×M)-dimensional matrix. The (N×M)-dimensional matrix shown in FIG. 5(b) is constituted by last N rows of the (M×M)-dimensional matrix. The (N×M)-dimensional matrix shown in FIG. 5(c) is constituted by N discontinuous rows of the (M×M)-dimensional matrix.

It should be understood that merely for ease of understanding, FIG. 5(a) to FIG. 5(c) show the three possible forms of the relationship between the (N×M)-dimensional non-orthogonal codebook and the M-dimensional orthogonal codebook. However, this shall not constitute any limitation on embodiments of this application. A specific form of the relationship between the (N×M)-dimensional non-orthogonal codebook and the M-dimensional orthogonal codebook is not limited in embodiments of this application.

It can be learned from the foregoing description that any column vector in the (N×M)-dimensional non-orthogonal codebook may correspond to one column vector in the M-dimensional orthogonal codebook, and the two column vectors have a same index or can be obtained through calculation by using a same formula. Therefore, in this embodiment of this application, the complete time-varying characteristic of the channel may correspond to the local time-varying characteristic, and the complete time-varying characteristic can be determined based on the local time-varying characteristic.

The relationship between the non-orthogonal codebook and the orthogonal codebook may be predefined in a protocol, or may be preconfigured by the network device by using signaling. This is not limited in embodiments of this application.

For example, a rule may be predefined in the protocol, to stipulate correspondences between rows in the (N×M)-dimensional non-orthogonal codebook and rows in the M-dimensional orthogonal codebook, or to stipulate positions of N rows of the (N×M)-dimensional non-orthogonal codebook in the M-dimensional orthogonal codebook, where the terminal device determines time domain vectors based on the (N×M)-dimensional non-orthogonal codebook and the M-dimensional orthogonal codebook. According to the rule, the terminal device can determine the (N×M)-dimensional non-orthogonal codebook based on the M-dimensional orthogonal codebook. It may be understood that the relationship between the (N×M)-dimensional non-orthogonal codebook and the M-dimensional orthogonal codebook may indicate a relative position of a sampling window in a complete period.

Optionally, the method further includes: The terminal device receives seventh indication information. The seventh indication information is used to indicate the positions of the N rows of the (N×M)-dimensional non-orthogonal codebook in the M-dimensional orthogonal codebook. Correspondingly, the network device sends the seventh indication information. Alternatively, the seventh indication information is used to indicate the relative position of the sampling window in a complete period.

The seventh indication information may be carried in, for example, higher layer signaling, for example, carried in an RRC message. This is not limited in embodiments of this application.

Based on the foregoing description, it can be learned that the complete time-varying characteristic of the channel can be determined (or predicted) after the following information is determined: the local time-varying characteristic of the channel, a proportion of the local time-varying characteristic in the complete time-varying characteristic, and a positional relationship or a correspondence between N rows in the non-orthogonal codebook and M rows in the orthogonal codebook.

Therefore, in this embodiment of this application, the terminal device may measure and feed back only the local time-varying characteristic of the channel, and in this case, the network device can predict the complete time-varying characteristic of the channel. The terminal device may implement measurement of the local time-varying characteristic of the channel by, for example, performing channel measurement based on reference signals received for a plurality of times.

Optionally, before operation 410, the method 400 further includes operation 420. In operation 420, the terminal device determines the local time-varying characteristic of the channel based on reference signals received for a plurality of times, and determines the one or more component characteristics and the weighting coefficient of each component characteristic based on the local time-varying characteristic of the channel.

Because of the time-varying characteristic of the channel, the terminal device may perform channel measurement based on reference signals received at a plurality of different time points. In other words, the time-varying characteristic is determined by the terminal device based on reference signals received at a plurality of different time points. In other words, the time-varying characteristic is determined by the terminal device based on reference signals received for a plurality of times.

Optionally, before operation 420, the method 400 further includes operation 430. In operation 430, the terminal device receives the reference signals. Correspondingly, in operation 430, the network device sends the reference signals.

In an implementation, the network device may send the reference signals for a plurality of times in a sampling window, and the terminal device may receive the reference signals for a plurality of times in the sampling window.

It should be understood that the sampling window may also be understood as measurement duration. The sampling window may be set to be relatively short, for example, may be defined in a unit of slot or millisecond (ms). For example, the sampling window is 20 slots, 5 ms, 10 ms, 20 ms, or the like. Alternatively, the sampling window may be set to be relatively long, for example, may be defined in a unit of second. For example, the sampling window is 10 seconds.

The sampling window may be predefined, for example, defined in a protocol. Alternatively, the sampling window may be preconfigured by the network device. For example, the network device indicates a position and a length of the sampling window by using signaling. This is not limited in embodiments of this application.

In another implementation, the network device may send the reference signals for a plurality of times based on a quantity of pilot transmissions, and the terminal device may receive the reference signals for a plurality of times based on the quantity of pilot transmissions.

The quantity of pilot transmissions may be predefined, for example, defined in a protocol. Alternatively, the quantity of pilot transmissions may be preconfigured by the network device. For example, the network device indicates the quantity of pilot transmissions by using signaling. This is not limited in embodiments of this application.

Because the sampling window and the quantity of pilot transmissions have been described above in detail, details are not described herein again for brevity.

The terminal device may perform channel measurement based on the reference signals received for the plurality of times, to determine the local time-varying characteristic of the channel. For example, the terminal device may perform one channel measurement based on a reference signal received each time, or perform one channel measurement based on the reference signals received for the plurality of times. A process in which the terminal device performs channel measurement based on the reference signals received for the plurality of times is internal implementation of the terminal device. A quantity of channel measurements performed by the terminal device is not limited in embodiments of this application.

It may be understood that, regardless of whether the terminal device performs channel measurement based on the reference signals received in the sampling window or based on the reference signals received based on the quantity of pilot transmissions, the terminal device can perform channel measurement based on the reference signals received for the plurality of times, to determine the local time-varying characteristic of the channel.

For ease of description, it is assumed below that the terminal device determines the one or more component characteristics and their corresponding time domain coefficients based on N groups of sample points, and further generates the first indication information. Each group of sample points may include values of the spatial-frequency coefficients of the K spatial-frequency vector pairs at a time point. The N groups of sample points may be, for example, results of channel measurement performed based on reference signals received for N times, or may be obtained through up-sampling or down-sampling performed on results of channel measurement performed based on reference signals received for a plurality of times. For example, the N groups of sample points may be obtained through up-sampling performed on results of channel measurement performed based on reference signals received for N/2 times, or obtained through down-sampling performed on results of channel measurement performed based on reference signals received for 2N times. A relationship between a value of N and a quantity of times the reference signals are received is not limited in embodiments of this application. The two may be equal or unequal.

Optionally, the method further includes: The terminal device receives fifth indication information. The fifth indication information is used to indicate the value of N. Correspondingly, the network device sends the fifth indication information.

To be specific, the network device may notify the terminal device of the value of N by using signaling.

If K is 1, the value of N indicated by the fifth indication information may be a sample point quantity corresponding to one spatial-frequency vector pair.

If K is greater than 1, the value of N indicated by the fifth indication information may be one or more values.

For example, each of the K spatial-frequency vector pairs corresponds to a same sample point quantity. In this case, the fifth indication information may be used to indicate one value of N.

The terminal device may determine the N groups of sample points based on the value of N indicated by the network device. If the terminal device generates an (N×1)-dimensional vector shown in FIG. 3(c) based on N sample points that are in the N groups of sample points and that correspond to one of the K spatial-frequency vector pairs, it may be considered that the network device notifies the terminal device of dimension of the vector by using signaling.

As described above, the N groups of sample points may be results of channel measurement performed based on reference signals received for N times. The quantity of times the terminal device receives the reference signals may be determined based on, for example, the quantity of pilot transmissions, and the quantity of pilot transmissions may be, for example, notified to the terminal device by the network device in advance by using signaling. In this case, the fifth indication information and the signaling used to notify of the quantity of pilot transmissions may be same signaling. Certainly, the two may alternatively be different signaling. This is not limited in embodiments of this application.

For another example, a corresponding value of N may be separately indicated for each of the K spatial-frequency vector pairs. For example, for a $k^{th}$ spatial-frequency vector pair of the K spatial-frequency vector pairs, a corresponding value of N may be indicated, for example, denoted as $N_k$, where $N_k$ is a positive integer. It may be understood that $N_k$ is one of a plurality of values of N. The fifth indication information may be used to indicate K values of N corresponding to the K spatial-frequency vector pairs.

The terminal device may determine K groups of sample points based on the value of N indicated by the network device. A $k^{th}$ group of sample points of the K groups of sample points may include $N_k$ sample points, and correspond to the $k^{th}$ spatial-frequency vector pair of the K spatial-frequency vector pairs.

It can be learned that one group of sample points is defined differently in the foregoing two examples. In the latter manner, one group of sample points corresponds to one spatial-frequency vector pair, and the groups of sample points may include a same quantity of sample points or different quantities of sample points, that is, the spatial-frequency vector pairs may correspond to a same quantity of sample points or different quantities of sample points. In the former manner, one group of sample points corresponds to one time point, and in this case, each spatial-frequency vector pair corresponds to a same quantity N of sample points.

Certainly, the value of N is also not necessarily indicated explicitly by using signaling. Alternatively, the network device may implicitly indicate the value of N by using the fifth indication information. For example, the fifth indication information may be used to indicate a proportional relationship between a sample point quantity and a quantity of times the reference signals are received in the sampling window, or the fifth indication information may be used to indicate a proportional relationship between a sample point quantity and a quantity of pilot transmissions. The proportional relationship may be, for example, ½ or 2. For brevity, examples are not listed one by one herein.

It should be understood that the fifth indication information and the foregoing seventh indication information may be combined into a same piece of information, and the fifth indication information and the seventh indication information may alternatively be different pieces of information. This is not limited in embodiments of this application.

It should be further understood that the value of N does not necessarily need to be indicated by using signaling. For example, the proportional relationship between a sample point quantity and a quantity of times the reference signals are received in the sampling window, or the proportional relationship between a sample point quantity and a quantity of pilot transmissions, or the like may be predefined in a protocol, or pre-agreed on by the network device and the terminal device.

After determining the local time-varying characteristic, the terminal device may determine, based on the local time-varying characteristic, the one or more component characteristics and their corresponding time domain coefficients that may be used to represent the complete time-varying characteristic.

For ease of understanding and description, the following uses dual-domain compression as an example to describe in detail a specific process in which the terminal device determines, based on the local time-varying characteristic, the one or more component characteristics and their weighting coefficients that may be used to represent the complete time-varying characteristic.

For ease of description, it is assumed that N groups of sample points are results of channel measurement performed by the terminal device based on reference signals received for N times. In this case, the terminal device may determine the local time-varying characteristic of the channel based on the reference signal received for each of the N times.

For example, the terminal device performs channel measurement based on a reference signal received for an $n^{th}$ (0≤n≤N−1, and n is an integer) time of the N times, and can obtain a spatial-frequency domain matrix $H_n$. The spatial-frequency domain matrix may be understood as a manner of representing the channel. A spatial-frequency domain matrix obtained during each channel measurement may be approximately represented by using a weighted sum of a plurality of spatial-frequency vector pairs. Generally, within specific duration, when a plurality of spatial-frequency vector pairs used to construct a precoding matrix remain unchanged, based on a change of spatial-frequency coefficients of the plurality of spatial-frequency vector pairs with time, the change of the channel with time may be approximately represented by using the weighted sum of the one or more time domain vectors.

The plurality of spatial-frequency vector pairs used to approximately represent the spatial-frequency domain matrix may be determined by the terminal device based on a feedback manner for dual-domain compression. The plurality of spatial-frequency vector pairs and their corresponding spatial-frequency coefficients may be used to construct a precoding matrix. In this embodiment of this application, spatial-frequency vector pairs used for determining the N groups of sample points may be, for example, some or all of the plurality of spatial-frequency vector pairs determined based on the dual-domain compression feedback manner. To be specific, as previously described, there are K' spatial-frequency vector pairs that are determined based on the dual-domain compression feedback manner and that may be used to construct a precoding matrix. Of K of the K' spatial-frequency vector pairs, values of a spatial-frequency coefficient of each spatial-frequency vector pair at N time points constitute N sample points, where K'≥K, and K' is a positive integer.

The K spatial-frequency vector pairs may be determined, for example, at a first measurement of a plurality of measurements, or may be determined at a last measurement of a plurality of measurements, or may be determined at any measurement of a plurality of measurements, or may be determined based on all of a plurality of measurements, for example, selecting K spatial-frequency vector pairs with largest average energy. This is not limited in embodiments of this application. In other words, the terminal device may perform channel measurement after receiving the reference signals N times, or may perform channel measurement each time a reference signal is received. It should be understood that, channel measurement is internal implementation behavior of the terminal device. This is not limited in embodiments of this application.

The terminal device may determine, based on the N groups of sample points corresponding to the K spatial-frequency vector pairs, one or more component characteristics and a time domain coefficient of each component characteristic that may be used to calculate a weighted sum, to approximately represent a time-varying characteristic of the channel by using the weighted sum of the one or more component characteristics. A quantity of the component characteristics determined by the terminal device may be denoted as, for example, L, where L is a positive integer.

As previously described, the L component characteristics may be component characteristics common to the K spatial-frequency vector pairs. Alternatively, the L component characteristics may be a sum of $L_k$ component characteristics corresponding to a $k^{th}$ spatial-frequency vector pair of the K spatial-frequency vector pairs that are obtained after k traverses values, that is, $$L = \sum_{k=0}^{K-1} L_k.$$

A correspondence between a spatial-frequency vector pair and a component characteristic may be predefined in a protocol.

The following lists processes in which the terminal device determines the L component characteristics and their corresponding time domain coefficients based on the N groups of sample points corresponding to the K spatial-frequency vector pairs.

In an embodiment, the terminal device determines the L component characteristics and their corresponding L time domain coefficients based on the N groups of sample points corresponding to the K spatial-frequency vector pairs. The L component characteristics may be component characteristics shared by the K spatial-frequency vector pairs, and the L time domain coefficients may be time domain coefficients shared by the K spatial-frequency vector pairs. Therefore, a weighted sum of the L component characteristics may be used to approximately represent a change of a spatial-frequency coefficient of each of the K spatial-frequency vector pairs with time.

In other words, for any two of the K spatial-frequency vector pairs, the corresponding L component characteristics may be the same, and the corresponding L time domain coefficients may also be the same. When the network device constructs a precoding matrix based on the K spatial-frequency vector pairs and their spatial-frequency coefficients in the following operation 460, the L component characteristics and their corresponding L time domain coefficients may be shared by the K spatial-frequency vector pairs. In other words, when the K spatial-frequency vector pairs are used to construct the precoding matrix, spatial-frequency coefficients corresponding to any two spatial-frequency vector pairs are the same.

Because the K spatial-frequency vector pairs have been described above, details are not described herein again for brevity. In this embodiment, the K spatial-frequency vector pairs may be used to jointly determine the L component characteristics and the L time domain coefficients. For example, the terminal device may determine the L component characteristics and the L time domain coefficients based on one of the K spatial-frequency vector pairs, for example, a strongest spatial-frequency vector pair of the K spatial-frequency vector pairs; or the terminal device may determine the L component characteristics and the L time domain coefficients based on the K spatial-frequency vector pairs, for example, a weighted average of the K spatial-frequency vector pairs; or the terminal device may determine the L component characteristics and the L time domain coefficients based on some of the K spatial-frequency vector pairs. This is not limited in embodiments of this application.

However, it should be understood that this does not mean that the terminal device selects only one spatial-frequency vector pair or selects only the K spatial-frequency vector pairs to construct the precoding matrix when feeding back a PMI based on dual-domain compression. When feeding back the PMI based on dual-domain compression, the terminal device may report more spatial-frequency vector pairs, for example, the foregoing K' spatial-frequency vector pairs, to help the network device construct a precoding matrix.

In this embodiment, the first indication information may be used to indicate the L component characteristics and the L time domain coefficients.

Because any two spatial-frequency vector pairs correspond to the same L component characteristics and the same L time domain coefficients, the terminal device may indicate the L component characteristics and the L time domain coefficients by using the first indication information. Alternatively, the terminal device indicates the L component characteristics and their corresponding time domain coefficients only once. Alternatively, the terminal device may indicate, by using a same field, the L component characteristics fed back for each of the K spatial-frequency vector pairs, and may also indicate, by using a same field, the L time domain coefficients fed back for each of the K spatial-frequency vector pairs. In other words, an indication field used to indicate the L component characteristics is common to the K spatial-frequency vector pairs, and an indication field used to indicate the L time domain coefficients is also common to the K spatial-frequency vector pairs.

It should be understood that, the same field herein means that indication fields of the time domain vectors are not repeated for the K spatial-frequency vector pairs, and indication fields of the time domain coefficients of the time domain vectors are not repeated for the K spatial-frequency vector pairs, and is not intended to limit a quantity of fields used to indicate the time domain vectors and a quantity of fields used to indicate the time domain coefficients.

In another embodiment, the terminal device may determine the L component characteristics and their corresponding L groups of time domain coefficients based on the N groups of sample points corresponding to the K spatial-frequency vector pairs. Each group of time domain coefficients may include K time domain coefficients corresponding to the K spatial-frequency vector pairs. A weighted sum determined based on the L component characteristics and each group of time domain coefficients may be used to approximately represent a change of a spatial-frequency coefficient of one of the K spatial-frequency vector pairs with time.

In other words, the terminal device may determine the L component characteristics based on all of the K spatial-frequency vector pairs, and may determine the time domain coefficient of each component characteristic based on the spatial-frequency coefficient of each of the K spatial-frequency vector pairs.

In other words, for any two of the K spatial-frequency vector pairs, the corresponding L component characteristics may be the same, but the time domain coefficients corresponding to the spatial-frequency vector pairs are different from each other. Therefore, the spatial-frequency coefficients corresponding to at least two spatial-frequency vector pairs are different. When the network device constructs a precoding matrix based on the K spatial-frequency vector pairs and their corresponding spatial-frequency coefficients in the following operation 460, the spatial-frequency coefficients corresponding to at least two of the K spatial-frequency vector pairs are different.

Because the K spatial-frequency vector pairs and how the terminal device determines the L component characteristics based on all of the K spatial-frequency vector pairs have been described above in detail, details are not described herein again for brevity.

Because the terminal device determines the L component characteristics based on all of the K spatial-frequency vector pairs, it may be considered that each spatial-frequency vector pair corresponds to L component characteristics. In addition, if the terminal device determines L time domain coefficients based on each of the K spatial-frequency vector pairs, a total quantity of time domain coefficients determined by the terminal device based on the K spatial-frequency vector pairs is K×L. In this case, a quantity of time domain coefficients corresponding to each spatial-frequency vector pair is L, but time domain coefficients corresponding to at least two spatial-frequency vector pairs are different.

In this embodiment, the first indication information may be used to indicate the L component characteristics and the K×L time domain coefficients.

Because any two spatial-frequency vector pairs correspond to the same L component characteristics, the terminal device may indicate the L component characteristics by using the first indication information. Alternatively, the terminal device indicates the L component characteristics only once. Alternatively, the terminal device may indicate, by using a same field, the L component characteristics fed back for each of the K spatial-frequency vector pairs. In other words, an indication field used to indicate the L component characteristics is common to the K spatial-frequency vector pairs.

It should be understood that the same field herein means that the field indicating the component characteristics for the K spatial-frequency vector pairs does not repeat, and is not intended to limit a quantity of fields used to indicate the component characteristics.

In addition, when indicating the K×L time domain coefficients by using the first indication information, the terminal device may perform separate indication for each spatial-frequency vector. The time domain coefficients separately indicated for each spatial-frequency vector pair and the foregoing L component characteristics may be used to determine the spatial-frequency coefficient of the spatial-frequency vector pair.

Therefore, each weighted sum of the L component characteristics may be used to approximately represent a change of a spatial-frequency coefficient of one spatial-frequency vector pair with time.

In still another embodiment, the terminal device may determine component characteristics corresponding to each spatial-frequency vector pair and time domain coefficients corresponding to the component characteristics based on the N groups of sample points corresponding to the K spatial-frequency vector pairs. For a $k^{th}$ spatial-frequency vector pair of the K spatial-frequency vector pairs, a weighted sum of $L_k$ component characteristics corresponding to the $k^{th}$ spatial-frequency vector pair may be used to approximately represent a change of a spatial-frequency coefficient of the $k^{th}$ spatial-frequency vector pair with time.

In other words, the terminal device may determine one or more component characteristics based on each of the K spatial-frequency vector pairs, and may determine, based on each of the K spatial-frequency vector pairs, a time domain coefficient corresponding to each component characteristic.

In other words, component characteristics corresponding to at least two of the K spatial-frequency vector pairs are different. That component characteristics are different herein may include: Quantities of the component characteristics are different, and the component characteristics are also different; or quantities of the component characteristics are the same, but the component characteristics are different. Time domain coefficients corresponding to at least two of the K spatial-frequency vector pairs are also different. That time domain coefficients are different herein may alternatively include: Quantities of the time domain coefficients are different, and the time domain coefficients are different; or quantities of the time domain coefficients are the same, but the time domain coefficients are different. It may be understood that the time domain coefficients correspond to the time domain component characteristics, and a quantity of the time domain coefficients may be the same as a quantity of the component characteristics.

For example, component characteristics corresponding to each of the K spatial-frequency vector pairs are recorded as one group of component characteristics, and time domain coefficients corresponding to each spatial-frequency vector pair are recorded as one group of time domain coefficients. In this case, at least two groups of component characteristics are different, and at least two groups of time domain coefficients are different.

The terminal device determines one or more component characteristics and one or more time domain coefficients based on each spatial-frequency vector pair, and spatial-frequency coefficients corresponding to at least two spatial-frequency vector pairs are different. Therefore, when the network device constructs a precoding matrix based on the K spatial-frequency vector pairs and their spatial-frequency coefficients in the following operation 460, the spatial-frequency coefficients corresponding to at least two of the K spatial-frequency vector pairs are different.

In this embodiment, the first indication information may be used to indicate $$\sum_{k=0}^{K-1} L_k$$

component characteristics and $$\sum_{k=0}^{K-1} L_k$$

time domain coefficients.

When indicating the $$\sum_{k=0}^{K-1} L_k$$

component characteristics and the $$\sum_{k=0}^{K-1} L_k$$

time domain coefficients by using the first indication information, the terminal device may perform the indication separately for each spatial-frequency vector pair. The component characteristics and their corresponding time domain coefficients separately indicated for each spatial-frequency vector pair may be used to determine a change of a spatial-frequency coefficient of the spatial-frequency vector pair with time. For example, the $L_k$ component characteristics and their corresponding $L_k$ time domain coefficients indicated for the $k^{th}$ spatial-frequency vector pair may be used to determine the change of the spatial-frequency coefficient of the $k^{th}$ spatial-frequency vector pair with time.

The foregoing lists several possible forms of a correspondence between the component characteristics and time domain coefficients indicated by the first indication information. The following describes in detail a specific process in which the terminal device determines values of L and M, L component characteristics, and time domain coefficients corresponding to the L component characteristics based on the local time-varying characteristic.

It should be understood that a feedback manner may be pre-agreed on by the network device and the terminal device, or a feedback manner may be predefined in a protocol, so that both parties can generate and interpret the first indication information based on a same feedback manner. As an example rather than a limitation, the feedback manner may be as follows: The terminal device feeds back, based on the K spatial-frequency vector pairs, L component characteristics and L time domain coefficients that may be shared.

It should be further understood that merely for ease of understanding and description, a concept of group is introduced in the foregoing description, for example, the foregoing one group of component characteristics and one group of time domain coefficients. However, this shall not constitute any limitation on embodiments of this application. When generating the first indication information based on the determined component characteristics and time domain coefficients, the terminal device does not necessarily generate the first indication information in a unit of group. A specific manner in which the terminal device generates the first indication information to indicate component characteristics and time domain coefficients corresponding to each spatial-frequency vector pair is not limited in embodiments of this application.

The following describes in detail a specific process in which the terminal device determines component characteristics and time domain coefficients corresponding to each spatial-frequency vector pair.

For ease of understanding, one spatial-frequency vector pair is first used as an example to describe in detail a specific process in which the terminal device determines one or more component characteristics and their corresponding time domain coefficients.

It may be understood that the spatial-frequency vector pair may be one of K spatial-frequency vector pairs, and K may be equal to or greater than 1. If K=1, the terminal device may determine the local time-varying characteristic of the channel based on a spatial-frequency coefficient of one spatial-frequency vector pair. The terminal device may determine L time domain vectors and their corresponding L time domain coefficients based on N sample points of a spatial-frequency coefficient of one spatial-frequency vector pair. If K>1, the terminal device may determine the local time-varying characteristic of the channel based on spatial-frequency coefficients of a plurality of spatial-frequency vector pairs. The K spatial-frequency vector pairs may share L time domain vectors. The terminal device may determine the L time domain vectors and their corresponding L time domain coefficients based on N sample points of a spatial-frequency coefficient of one spatial-frequency vector pair. The spatial-frequency vector pair may be, for example, a strongest spatial-frequency vector pair of K' spatial-frequency vector pairs determined by the terminal device based on dual-domain compression feedback manner.

The strongest spatial-frequency vector pair may be a spatial-frequency vector pair corresponding to a spatial-frequency coefficient with a largest amplitude, where the spatial-frequency coefficient is one of K' spatial-frequency coefficients that respectively correspond to the K' spatial-frequency vector pairs determined by the terminal device based on the dual-domain compression feedback manner. The strongest spatial-frequency vector pair may be determined, for example, based on a reference signal received for the first time, or determined based on a reference signal received for any one of N times, or determined after a mean of reference signals received for N times is obtained. This is not limited in embodiments of this application.

It may be understood that the foregoing spatial-frequency vector pair may be, for example, one of the K' spatial-frequency vector pairs determined by the terminal device based on the dual-domain compression feedback manner, and the spatial-frequency vector pair may be denoted as, for example, $(u_i, v_j)$, where i ($0 \leq i \leq I-1$, and i is an integer) indicates that a spatial domain vector $u_i$ is an $i^{th}$ spatial domain vector of I (I is a positive integer) spatial domain vectors, and j ($0 \leq j \leq J-1$, and j is an integer) indicates that a frequency domain vector $v_j$ is a $j^{th}$ frequency domain vector of J (J is a positive integer) frequency domain vectors. The I spatial domain vectors and the J frequency domain vectors may be combined to obtain a plurality of spatial-frequency vector pairs (for example, the foregoing K' spatial-frequency vector pairs). The plurality of spatial-frequency vector pairs may be used to construct a precoding matrix.

In this embodiment of this application, N sample points corresponding to the spatial-frequency vector pair may be represented, for example, in a form of a vector. For ease of distinguishing and description, a vector used to represent the N sample points is referred to as a spatial-frequency coefficient vector below. One spatial-frequency coefficient vector may correspond to one spatial-frequency vector pair. A spatial-frequency coefficient vector may be used to represent a change of a spatial-frequency coefficient of a corresponding spatial-frequency vector pair with time. Alternatively, a spatial-frequency coefficient vector may be understood as a representation of the local time-varying characteristic of the channel.

The N sample points may be represented by, for example, an (N×1)-dimensional vector, and N elements in the vector are the N sample points. The N sample points may alternatively be represented by, for example, an (M×1)-dimensional vector, and the vector includes the N sample points and (M−N) zero elements. For distribution of the N sample points in the (M×1)-dimensional vector, refer to, for example, the foregoing related description provided with reference to FIG. 5(a) to FIG. 5(c). This is not limited in embodiments of this application. For ease of description, the N sample points are represented by the (N×1)-dimensional vector below.

N spatial-frequency coefficients that are determined based on reference signals received for N times and that correspond to the spatial-frequency vector pair $(u_i, v_j)$ may be denoted as, for example, $a_0^{i,j}$, $a_1^{i,j}$, ..., and $a_{N-1}^{i,j}$. An $n^{th}$ element in the N elements may be determined by performing channel measurement based on a reference signal received for the $n^{th}$ times. The N spatial-frequency coefficients may constitute a spatial-frequency coefficient vector $c^{i,j} \overset{\Delta}{=} [a_0^{i,j} \ a_1^{i,j} \ ... \ a_{N-1}^{i,j}]^T$. The spatial-frequency coefficient vector $c^{i,j}$ may be understood as an example of the vector c shown in FIG. 3(c).

The spatial-frequency coefficient vector may be understood as a form used to represent the local time-varying characteristic of the channel. However, it should be understood that the (N×1)-dimensional spatial-frequency coefficient vector shown above is merely a possible form, and shall not constitute any limitation on embodiments of this application. For example, the spatial-frequency coefficient vector may alternatively be a (1×N)-dimensional vector, for example, $c^{i,j} \boxtimes [a_0^{i,j} \ a_1^{i,j} \ ... \ a_{N-1}^{i,j}]$. For another example, the spatial-frequency coefficient vector may alternatively be an (M×1)-dimensional vector, for example, $c^{i,j} \boxtimes [a_0^{i,j} \ a_1^{i,j} \ ... \ a_{N-1}^{i,j} \ 0 \ ... \ 0]^T$, or may alternatively be a (1×M)-dimensional vector, for example, $c^{i,j} \boxtimes [a_0^{i,j} \ a_1^{i,j} \ ... \ a_{N-1}^{i,j} \ 0 \ ... \ 0]$. For brevity, examples are not listed one by one herein. A person skilled in the art may perform mathematical transformations or equivalent substitutions on the foregoing listed forms of the spatial-frequency coefficient vector based on a same concept, and all these mathematical transformations or equivalent substitutions shall fall within the protection scope of embodiments of this application.

The terminal device may determine L time domain vectors and their corresponding L time domain coefficients based on the spatial-frequency coefficient vector, to approximately represent the complete time-varying characteristic of the channel by using a weighted sum of the L time domain vectors. There is a correspondence between component characteristics whose weighted sum may be used to approximately represent the complete time-varying characteristic of the channel and component characteristics whose weighted sum may be used to approximately represent the local time-varying characteristic of the channel. This has been described above in detail with reference to the DFT vector. Therefore, the terminal device can determine, based on the local time-varying characteristic of the channel, L vectors whose weighted sum may be used to approximately represent the local time-varying characteristic of the channel. For example, when the local time-varying characteristic of the channel is represented by the foregoing (N×1)-dimensional spatial-frequency coefficient vector, the terminal device may determine L vectors from the (N×M)-dimensional non-orthogonal codebook corresponding to the M-dimensional orthogonal codebook, to approximately represent the local time-varying characteristic of the channel by using a weighted sum of the L vectors. That the terminal device determines the L vectors from the (N×M)-dimensional non-orthogonal codebook is equivalent to that the terminal device determines the L time domain vectors from the M-dimensional orthogonal codebook.

It should be understood that the (N×1)-dimensional spatial-frequency coefficient vector and the (1×N)-dimensional spatial-frequency coefficient vector are merely two possible representations of the local time-varying characteristic of the channel, and shall not constitute any limitation on embodiments of this application. As previously described, the local time-varying characteristic of the channel may alternatively be represented by the (M×1)-dimensional vector or the (1×M)-dimensional vector. In this case, the terminal device may directly determine the L time domain vectors from the M-dimensional orthogonal codebook.

It may be understood that the local time-varying characteristic of the channel is merely an intermediate quantity for the terminal device to perform channel measurement and provide a feedback, and may have different representations. Corresponding to different representations, the terminal device may alternatively determine the L component characteristics based on codebooks of different dimension. This is internal implementation of the terminal device. This is not limited in embodiments of this application.

However, the terminal device and the network device cannot learn of the value of M in advance. To be specific, it is unable to learn of a proportion of duration corresponding to the N sample points in a complete period in advance. The terminal device may attempt to use a plurality of optional values of M to determine the proportion of the sampling window in a complete period, that is, a ratio of N to M.

For example, the network device may notify the terminal device of a plurality of candidate values of M in advance by using signaling. The terminal device may select one value from the plurality of candidate values. The value of M selected by the terminal device can ensure that a weighted sum of L vectors determined based on a corresponding (N×M)-dimensional non-orthogonal codebook is closest to the foregoing spatial-frequency coefficient vector, for example, having a minimum MSE or being most correlated.

Optionally, the method 400 further includes: The terminal device receives second indication information. The second indication information is used to indicate a plurality of candidate values of M. Correspondingly, the network device sends the second indication information.

To be specific, the network device may preconfigure a plurality of candidate values of M. The terminal device may make a plurality of attempts based on the plurality of candidate values of M to determine the value of M, so that a weighted sum of L vectors determined based on an (N×M)-dimensional non-orthogonal codebook corresponding to the determined value of M is closest to the foregoing spatial-frequency coefficient vector, for example, having a minimum MSE or being most correlated.

Optionally, the method 400 further includes: The terminal device receives second indication information. The second indication information is used to indicate one or more optional groups of candidate values, and each group of candidate values includes one candidate value of M and one candidate value of L. Correspondingly, the network device sends the second indication information.

To be specific, the network device may preconfigure a plurality of groups of values of {M,L}. A combination of dimension and a quantity of component characteristics is configured by using each group of values of {M,L}. In other words, the dimension and quantity of component characteristics are bound together. The quantity of component characteristics may change with the dimension of component characteristics. For example, for a smaller value of M, a smaller value of L may be bound; and for a larger value of M, a larger value of L may be bound.

For example, the second indication information may be carried in higher layer signaling. For example, the higher layer signaling may be an RRC message. The network device may alternatively activate, by using a MAC-CE, one or more of a plurality of groups of values of {M,L} configured in the RRC message. The terminal device may determine the values of M and L based on the one or more groups of values of {M,L} activated by the MAC CE.

Further, the first indication information may be further used to indicate the values of M and L determined by the terminal device, that is, an example of first information described later. The terminal device may directly indicate the determined values of M and L, or may indicate indexes or identifiers corresponding to the determined values of M and L. This is not limited in embodiments of this application.

It should be understood that indications of the values of M and L may be used by the network device to determine dimension of the complete time-varying characteristic, and further determine L component characteristics that may be used to represent the complete time-varying characteristic. In other words, the network device may determine the dimension of the complete time-varying characteristic based on the value of M indicated by the terminal device, and further determine the L component characteristics. Therefore, it may be considered that the indication of the value of M may be used to indirectly determine the L component characteristics.

It should be noted that as previously described, the terminal device may determine corresponding component characteristics separately for each of the K spatial-frequency vector pairs. In this case, dimension of complete time-varying characteristics corresponding to at least two of the K spatial-frequency vector pairs may be different, and quantities of determined component characteristics are also not necessarily the same. The terminal device may separately indicate, by using the first indication information, dimension of a complete time-varying characteristic corresponding to each spatial-frequency vector pair and a quantity of component characteristics. For example, for the $k^{th}$ spatial-frequency vector pair, the first indication information may be used to indicate a value of $\{M_k, L_k\}$.

Optionally, the method 400 further includes: The terminal device receives third indication information. The third indication information is used to indicate a maximum value $M_{max}$ of M. Correspondingly, the network device sends the third indication information.

To be specific, the network device may indicate the maximum value $M_{max}$ of M to the terminal device by using signaling. The terminal device may determine an appropriate value of M based on the maximum value $M_{max}$ indicated by the network device, and construct an M-dimensional orthogonal codebook or search for an M-dimensional orthogonal codebook from a plurality of pre-stored codebooks based on the value of M, to select L component characteristics for reporting. In other words, the network device may preconfigure maximum dimension of an orthogonal codebook for the terminal device by using signaling. Dimension of component characteristics actually reported by the terminal device may be less than or equal to the maximum dimension preconfigured by the network device. For example, the terminal device may attempt to use a value less than $M_{max}$ from the plurality of predefined candidate values of M. The terminal device may determine the value of M by making a plurality of attempts, so that a weighted sum of L vectors determined based on a corresponding (N×M)-dimensional non-orthogonal codebook is closest to the foregoing spatial-frequency coefficient vector, for example, having a minimum MSE or being most correlated.

Further, the first indication information may be further used to indicate the value of M, that is, still another example of first information described later. For example, the terminal device may indicate, by using the first indication information, the value of M determined by the terminal device, or for example, information that may be used to uniquely determine the value of M, such as an index or identifier corresponding to the value of M. In addition, corresponding to the foregoing description, when the terminal device separately determines corresponding component characteristics based on each of the K spatial-frequency vector pairs, dimension of complete time-varying characteristics corresponding to at least two of the K spatial-frequency vector pairs may be different. The terminal device may separately indicate, by using the first indication information, dimension of a complete time-varying characteristic corresponding to each spatial-frequency vector pair. For example, for the $k^{th}$ spatial-frequency vector pair, the first indication information may be used to indicate a value of $M_k$.

In an implementation, the terminal device determines L time domain vectors based on the (N×1)-dimensional spatial-frequency coefficient vector. For example, the terminal device may generate (N×M)-dimensional non-orthogonal codebooks based on different values of M, or determine (N×M)-dimensional non-orthogonal codebooks corresponding to different values of M based on a plurality of pre-stored M-dimensional codebooks with M being different values. For example, for a determined value of M, an (M×M)-dimensional matrix may be constructed based on an M-dimensional orthogonal codebook. The (M×M)-dimensional matrix is denoted as, for example, $U_t$, where $U_t = [d_0 \ d_1 \ \ldots \ d_{M-1}]$, and $d_0, d_1, \ldots,$ and $d_{M-1}$ are (M×1)-dimensional vectors in the M-dimensional orthogonal codebook. The (N×M)-dimensional non-orthogonal codebook may be determined based on the M-dimensional orthogonal codebook. For example, an (N×M)-dimensional matrix may be constructed based on the (N×M)-dimensional non-orthogonal codebook. The (N×M)-dimensional matrix may be denoted as, for example, $U_t'$, where $U_t' = [d_0' \ d_1' \ \ldots \ d_{M-1}']$. An $m^{th}$ vector in the matrix $U_t'$ may be constituted by N elements in an $m^{th}$ vector $d_m$ that is of the foregoing vectors from $d_0$ to $d_{M-1}$, for example, constituted by first N rows of elements in the vector $d_m$; or positions of N rows of elements are agreed on in a protocol; or a base station configures positions of N rows of elements.

For each value of M, the terminal device may project the foregoing (N×1)-dimensional spatial-frequency coefficient vector $c^{i,j}$ to the (N×M)-dimensional matrix $U_t'$ constructed based on the (N×M)-dimensional non-orthogonal codebook, to determine L (N×1)-dimensional vectors and their corresponding coefficients. A weighted sum of the L (N×1)-dimensional vectors may be used to approximately represent the spatial-frequency coefficient vector $c^{i,j}$. For different values of M, M groups of vectors and weights can be obtained, where a weighted sum of each group of vectors may be used to approximately represent the spatial-frequency coefficient vector $c^{i,j}$. Each group of vectors and weights may include L vectors and their corresponding L weights. One group of vectors and weights is selected from the M groups of vectors and weights, and a weighted sum of the selected group of vectors is closest to the real spatial-frequency coefficient vector $c^{i,j}$, for example, having a minimum MSE or being most correlated.

For each value of M, the following describes a specific implementation of a process of determining L vectors and coefficients based on a result of projecting the spatial-frequency coefficient vector $c^{i,j}$ to the (N×M)-dimensional non-orthogonal codebook.

For example, the (N×1)-dimensional spatial-frequency coefficient vector $c^{i,j}$ is projected to the (N×M)-dimensional matrix $U_t'$, which may be expressed as, for example, $d^{i,j} = (U_t')^H c^{i,j}$. A result $d^{i,j}$ obtained from the projection is an (M×1)-dimensional vector, where $d^{i,j} = [b_0^{i,j} \ b_1^{i,j} \ \ldots \ b_{M-1}^{i,j}]^T$. M elements in the vector $d^{i,j}$ may represent weights of M vectors in the matrix $U_t'$. For example, an $m^{th}$ element $b_m^{i,j}$ in the vector $d^{i,j}$ represents a weight of an $m^{th}$ vector $d_m'$ in the matrix $U_t'$.

The terminal device may select L relatively strong elements from the vector $d^{i,j}$ obtained from the projection. For example, the terminal device may determine the L relatively strong elements based on squares of moduli of M elements in the vector $d^{i,j}$ obtained from the projection. A square of a modulus of any one of the selected L elements is greater than or equal to a square of a modulus of any one of the (M−L) unselected elements. The L relatively strong elements may be used as weights of L vectors. Based on positions of the L relatively strong elements in the vector $d^{i,j}$, positions of L (N×1)-dimensional vectors that may be used to calculate a weighted sum in the foregoing (N×M)-dimensional matrix constructed based on the non-orthogonal codebook can be determined. In this way, the L vectors and their weights can be determined.

By performing the foregoing operation separately for different values of M, the terminal device can determine L vectors and their weights, where a weighted sum of the L vectors is closest to the real spatial-frequency coefficient vector $c^{i,j}$.

Because M vectors in the (N×M)-dimensional non-orthogonal codebook correspond to M vectors in the M-dimensional orthogonal codebook, for example, referring to the correspondence between the (N×1)-dimensional vector and the (M×1)-dimensional vector in FIG. 3(c) and FIG. 3(d), L time domain vectors in the M-dimensional orthogonal codebook can be determined. The foregoing weights corresponding to the L vectors are time domain coefficients corresponding to the L time domain vectors.

The quantity L of the component characteristics may be configured by the network device or determined by the terminal device. This is not limited in embodiments of this application.

Optionally, the method 400 further includes: The terminal device receives fourth indication information. The fourth indication information is used to indicate a value of L. Correspondingly, the network device sends the fourth indication information.

That is, the value of L may be indicated by the network device to the terminal device by using signaling. The terminal device may select, based on the value of L indicated by the network device, L component characteristics for reporting. In other words, the network device may preconfigure, for the terminal device by using signaling, a quantity of component characteristics that need to be reported.

Optionally, the method 400 further includes: The terminal device receives fourth indication information. The fourth indication information is used to indicate a maximum value $L_{max}$ of L. Correspondingly, the network device sends the fourth indication information.

To be specific, the network device may also indicate the maximum value $L_{max}$ of L to the terminal device by using signaling. The terminal device may determine an appropriate value of L based on the maximum value $L_{max}$ indicated by the network device, and select L component characteristics for reporting. In other words, the network device may preconfigure, for the terminal device by using signaling, a maximum quantity of component characteristics that need to be reported. A quantity of component characteristics actually reported by the terminal device may be less than or equal to the maximum quantity that is of component characteristics that need to be reported and that is preconfigured by the network device.

For example, the fourth indication information may be carried in higher layer signaling. For example, the higher layer signaling may be an RRC message. Specific signaling used to carry the fourth indication information is not limited in embodiments of this application.

The terminal device may alternatively indicate a quantity of actually reported component characteristics to the network device by using signaling. For example, the network device does not configure, for the terminal device, the quantity of component characteristics that need to be reported, or the network device indicates, by using the fourth indication information, the maximum quantity of component characteristics that the terminal device needs to report. For example, the terminal device attempts to use a candidate value less than $L_{max}$ from a plurality of predefined candidate values of L, to determine the value of L.

Further, the first indication information may be further used to indicate the value of L. For example, the terminal device may indicate, by using the first indication information, the determined value of L or for example, information that may uniquely determine the value of L, such as an index or identifier corresponding to the value of L. In addition, corresponding to the foregoing description, when the terminal device separately determines corresponding component characteristics based on each of the K spatial-frequency vector pairs, dimension of complete time-varying characteristics corresponding to at least two of the K spatial-frequency vector pairs may be different. The terminal device may separately indicate, by using the first indication information, dimension of a complete time-varying characteristic corresponding to each spatial-frequency vector pair. For example, for the $k^{th}$ spatial-frequency vector pair, the first indication information may be used to indicate a value of $L_k$.

In addition, the plurality of candidate values of L may alternatively be carried in the second indication information described above, and bound to the plurality of candidate values of M. For brevity, details are not described herein again.

Based on configurations of the values of M and L described above, the terminal device may determine appropriate values of L and M by making a plurality of attempts, so that a weighted sum of L vectors selected from an (N×M)-dimensional non-orthogonal codebook corresponding to the value of M is closest to spatial-frequency coefficient vector obtained by the terminal device through measurement, for example, having a minimum MSE or being most correlated.

It should be understood that merely for ease of understanding, the foregoing uses one spatial-frequency vector pair as an example to describe in detail a specific process in which the terminal device determines L component characteristics and their corresponding time domain coefficients. However, this shall not constitute any limitation on embodiments of this application. When the terminal device determines the one or more component characteristics and their corresponding time domain coefficients by combining spatial-frequency coefficients respectively corresponding to a plurality of spatial-frequency vector pairs, the determining can still be implemented based on a same concept.

For example, when the terminal device determines, based on the spatial-frequency coefficients respectively corresponding to the K spatial-frequency vector pairs, a time domain vector corresponding to each spatial-frequency vector pair, the terminal device can still implement the determining according to the foregoing method. If the spatial-frequency coefficient corresponding to each spatial-frequency vector pair is represented by an (N×1)-dimensional vector, the K spatial-frequency vector pairs may be represented by, for example, an (N×K)-dimensional matrix or an [(N×K)×1]-dimensional vector.

For example, an (N×1)-dimensional vector constituted by a spatial-frequency coefficient corresponding to the $k^{th}$ spatial-frequency vector pair is represented by $c^k$, and $c^k$ and the foregoing $c^{i,j}$ may indicate a same meaning. (N×1)-dimensional vectors constituted by the spatial-frequency coefficients corresponding to the K spatial-frequency vector pairs may be represented by $c^0$, $c^1$, ..., and $c^{K-1}$, respectively. There are K vectors in total. The K vectors may construct the (N×K)-dimensional matrix or the [(N×K)×1]-dimensional vector, which is, for example, separately shown below:

(N×K)-dimensional matrix: $[c^0 c^1 \ldots c^{K-1}]$; and

[(N×K)×1]-dimensional vector: $[(c^0)^T (c^1)^T \ldots (c^{K-1})^T]^T$.

The terminal device may project the (N×K)-dimensional matrix to the (N×M)-dimensional matrix $U_t'$ constructed based on the foregoing (N×M)-dimensional non-orthogonal codebook. In this way, the terminal device can determine L time domain vectors corresponding to the K spatial-frequency vector pairs and a time domain coefficient corresponding to each time domain vector. The time domain coefficient corresponding to each time domain vector may be, for example, K time domain coefficients, which correspond to the K spatial-frequency vector pairs, or may be one time domain coefficient, which is used as a time domain coefficient shared by the K spatial-frequency vector pairs. Alternatively, the terminal device can determine $L_k$ time domain vectors corresponding to each of the K spatial-frequency vector pairs and $L_k$ time domain coefficients corresponding to the $L_k$ time domain vectors. This is not limited in embodiments of this application.

Alternatively, the terminal device may project the [(N×K)×1]-dimensional vector to an [(N×K)×(M×K)]-dimensional matrix determined based on the foregoing (N×M)-dimensional non-orthogonal codebook, to determine L time domain vectors corresponding to the K spatial-frequency vector pairs and a time domain coefficient corresponding to each time domain vector.

The [(N×K)×(M×K)]-dimensional matrix may be determined based on the (N×M)-dimensional matrix $U_t'$ that is constructed based on the foregoing (N×M)-dimensional non-orthogonal codebook. The [(N×K)×(M×K)]-dimensional matrix may be expressed as, for example, $$\begin{bmatrix} U_t' & & & \\ & U_t' & & \\ & & U_t' & \\ & & & U_t' \end{bmatrix},$$

where $U_t$'s on a diagonal may be the same or different. A spatial-frequency coefficient vector corresponding to each spatial-frequency vector pair may be projected to one (N×M)-dimensional matrix $U_t'$. In this way, the terminal device can determine the L time domain vectors corresponding to the K spatial-frequency vector pairs and the time domain coefficient corresponding to each time domain vector, or the terminal device can determine $L_k$ time domain vectors corresponding to each of the K spatial-frequency vector pairs and $L_k$ time domain coefficients corresponding to the $L_k$ time domain vectors. This is not limited in embodiments of this application.

It should be understood that the [(N×K)×(M×K)]-dimensional matrix described above is merely an example. As previously described, a time domain vector corresponding to each spatial-frequency vector pair may be determined based on orthogonal codebooks of different dimension. For example, for the k° a spatial-frequency vector pair, dimension of a used orthogonal codebook is Mk. Therefore, matrices used to determine time domain vectors corresponding to the K spatial-frequency vector pairs, and dimension of the matrices both change accordingly.

It should be further understood that when a time domain vector is determined based on each spatial-frequency vector pair, quantities of used sample points may be the same or different. For example, a sample point quantity of one spatial-frequency vector pair is 2N, and a sample point quantity of another spatial-frequency vector pair is N. It may be understood that a sample point quantity may correspond to dimension of an orthogonal codebook. In addition, when sample points of a plurality of spatial-frequency vector pairs are different, it is only necessary to ensure that absolute times of time segments corresponding to sample points of the spatial-frequency vector pairs are aligned.

If the terminal device separately determines, based on each spatial-frequency vector pair, a time domain vector corresponding to the spatial-frequency vector pair, the time domain vectors respectively corresponding to the K spatial-frequency vector pairs may be represented in a form of, for example, an (M×K)-dimensional matrix or an [(M×K)×1]-dimensional vector. Because the component characteristics in different forms have been described above by using examples, examples are not provided herein again for brevity.

Merely for ease of understanding, the foregoing shows examples of a process in which the terminal device determines L component characteristics and their corresponding time domain coefficients based on spatial-frequency coefficients of a plurality of spatial-frequency vector pairs. However, it should be understood that these examples shall not constitute any limitation on embodiments of this application. For example, alternatively, the terminal device may separately project the spatial-frequency coefficients corresponding to the K spatial-frequency vector pairs to the (N×M)-dimensional non-orthogonal codebook, to determine $L_k$ time domain vectors corresponding to each spatial-frequency vector pair and $L_k$ time domain coefficients. For another example, the terminal device may classify the K spatial-frequency vector pairs into a plurality of groups, and each group includes one or more spatial-frequency vector pairs. Each group may share one or more time domain vectors. Spatial-frequency vector pairs in a group correspond to same time domain vectors, and spatial-frequency vector pairs in different groups correspond to different time domain vectors. Time domain coefficients of a same time domain vector corresponding to spatial-frequency vector pairs in a group may be the same or different. This is not limited in embodiments of this application. When determining one or more same time domain vectors and one or more same time domain coefficients based on spatial-frequency vector pairs in a group, the terminal device may perform the determining based on a spatial-frequency vector pair in the group, for example, a strongest spatial-frequency vector pair in the group, or based on a weighted mean of the plurality of spatial-frequency vector pairs in the group. Specific implementations thereof are similar to the specific process described above. For brevity, details are not described herein again.

In addition, merely for ease of understanding, the foregoing shows a process of determining component characteristics by performing DFT on a spatial-frequency coefficient vector. However, this shall not constitute any limitation on embodiments of this application. For example, the terminal device may alternatively determine, by using an existing estimation algorithm, such as a multiple signal classification (multiple signal classification, MUSIC) algorithm, a Bartlett (Bartlett) algorithm, or an algorithm of estimation of signal parameters via rotational invariant techniques (estimation of signal parameters via rotational invariant techniques, ESPRIT), the time domain vectors and the time domain coefficients corresponding to the time domain vectors. For brevity, examples are not described herein.

As previously described, the process in which the terminal device determines L component characteristics and their corresponding time domain coefficients is internal implementation of the terminal device. A specific implementation process thereof is not limited in embodiments of this application.

After determining the L component characteristics and their corresponding time domain coefficients, the terminal device may generate the first indication information, to indicate the L component characteristics and their corresponding time domain coefficients to the network device.

Because the network device cannot learn of a relationship between a local channel characteristic and a complete channel characteristic in advance, or the network device cannot learn of a relationship between N and M in advance, or the network device cannot learn of, in advance, dimension M of component characteristics fed back by the terminal device, the terminal device needs to indicate not only the time domain vectors corresponding to the L component characteristics but also the dimension of the component characteristics when indicating the L component characteristics by using the first indication information. In other words, the first indication information may include the first information used to indicate the dimension of the component characteristics and second information used to indicate the L component characteristics.

Optionally, the first information is used to indicate the value of M.

For example, the first information may indicate the value of M directly, or indicate the value of M in a manner of using an identifier, an index, or the like corresponding to the value of M. As previously described, the network device may indicate a plurality of groups of candidate values of {M,L} by using the second indication information. The terminal device may indicate, in the first indication information, one group of values of {M,L} or an identifier or index corresponding to one group of values of {M,L}.

It should be understood that the terminal device may indicate the value of M in many manners. Merely for ease of understanding, the foregoing shows several possible manners in which the first information is used to indicate the value of M, and this shall not constitute any limitation on embodiments of this application. A specific manner in which the terminal device indicates the value of M is not limited in embodiments of this application.

Optionally, the first information is used to indicate a value of N/M or a value of M/N.

For example, the first information may indicate the value of N/M or the value of M/N directly, or indicate the value of N/M or the value of M/N in a manner of using an identifier, an index, or the like corresponding to the value of N/M or the value of M/N. In an implementation, the terminal device and the network device may pre-agree on whether the first information indicates the value of N/M or the value of M/N. For example, the first information indicates the value of N/M. In this case, the terminal device and the network device may pre-store correspondences between a plurality of quantized values of N/M and a plurality of indexes. After determining the value of N/M, the terminal device may select a closest quantized value from the plurality of quantized values and report an index of the quantized value to the network device.

It should be understood that the terminal device may indicate the value of N/M or the value of M/N in many manners. Merely for ease of understanding, the foregoing shows several possible manners in which the first information is used to indicate the value of N/M or the value of M/N, and this shall not constitute any limitation on embodiments of this application. A specific manner in which the terminal device indicates the value of N/M or the value of M/N is not limited in embodiments of this application.

Corresponding to embodiments described above, the first indication information may be used to indicate the L component characteristics and the L time domain coefficients that are shared by the K spatial-frequency vector pairs; or the first indication information may be used to indicate the L component characteristics shared by the K spatial-frequency vector pairs and L×K time domain coefficients corresponding to the K spatial-frequency vector pairs; or the first indication information may be used to indicate the $L_k$ component characteristics and the $L_k$ time domain coefficients that correspond to the $k^{th}$ spatial-frequency vector pair.

A relationship between a component characteristic and a time domain vector has been described above in detail. The component characteristic may be, for example, a time domain vector, or a matrix or vector determined based on a plurality of (for example, K) time domain vectors. Therefore, when indicating the L component characteristics by using the second information, the terminal device may indicate the L component characteristics by indicating time domain vectors.

In an implementation, the terminal device may indicate the L component characteristics by using indexes of time domain vectors corresponding to the L component characteristics.

If one component characteristic is one time domain vector, when indicating the L component characteristics by using the second information, the terminal device may separately indicate the L component characteristics, for example, by using indexes of L time domain vectors in the M-dimensional orthogonal codebook, or may indicate the L component characteristics by using indexes of combinations of L time domain vectors. This is not limited in embodiments of this application.

When a quantity K of spatial-frequency vector pairs is greater than 1, the second information may include sub-information corresponding to the K spatial-frequency vector pairs, to indicate K groups of time domain vectors corresponding to the K spatial-frequency vector pairs. Each group of time domain vectors may include one or more time domain vectors. For example, the terminal device may indicate the K groups of time domain vectors in a pre-agreed-on order. For example, one or more corresponding time domain vectors are sequentially indicated in an indication sequence of the K spatial-frequency vector pairs. For another example, one or more corresponding component characteristics are sequentially indicated in descending order by strengths of the K spatial-frequency vector pairs. For another example, the terminal device may indicate a spatial-frequency vector pair corresponding to each group of time domain vectors as a piece of sub-information. With the $k^{th}$ spatial-frequency vector pair as an example, the second information may indicate the following information: {$k^{th}$ spatial-frequency vector pair, $L_k$ time domain vectors corresponding to the $k^{th}$ spatial-frequency vector pair}. A specific sequence and method in which the terminal device indicates the L time domain vectors are not limited in embodiments of this application.

In addition, when indicating the L time domain vectors, the terminal device may separately indicate an index of each time domain vector, or may indicate an index of a combination of one or more time domain vectors corresponding to each spatial-frequency vector pair. This is not limited in embodiments of this application.

In another implementation, the terminal device may indicate the L component characteristics by using Doppler shifts respectively corresponding to time domain vectors of the L component characteristics.

As previously described, each time domain vector may correspond to one Doppler shift. In other words, the L component characteristics described above may be determined based on a plurality of Doppler shifts. When the time domain vectors corresponding to the L component characteristics are vectors selected from the M-dimensional orthogonal codebook, a largest Doppler shift may be divided into M equal parts. M time domain vectors in the M-dimensional codebook may correspond to the M Doppler shifts. Therefore, a ratio of a Doppler shift corresponding to an $m^{th}$ time domain vector to the largest Doppler shift is m/M.

The maximum Doppler shift may be determined by the network device, for example, determined based on uplink-downlink reciprocity, or determined based on a moving speed of the terminal device and/or a position of the terminal device relative to the base station, and the terminal device is indicated to perform channel measurement and provide a feedback by using a codebook corresponding to the maximum Doppler shift. Alternatively, the maximum Doppler shift may be determined by the terminal device and reported to the network device. Alternatively, the maximum Doppler shift may be predefined, for example, defined in a protocol, or bound to a reference signal configuration or the like.

Therefore, when the terminal device indicates a plurality of Doppler shifts by using the first indication information, it is also considered that the terminal device indicates, by using the first indication information, the plurality of time domain vectors corresponding to the L component characteristics. In other words, the two indication manners are equivalent.

It should be understood that merely to provide an example, the foregoing shows several possible implementations in which the terminal device indicates the L component characteristics. However, this shall not constitute any limitation on embodiments of this application.

In addition, the terminal device may alternatively indicate, by using the first indication information, the time domain coefficients corresponding to the L component characteristics.

When indicating, by using the first indication information, the time domain coefficients corresponding to the L component characteristics, the terminal device may indicate the time domain coefficients by using quantized values of the time domain coefficients, or may indicate the time domain coefficients by using indexes of the quantized values, or may indicate the time domain coefficients in another manner. A manner in which the time domain coefficients are indicated is not limited in embodiments of this application, provided that the network device can determine, according to the first indication information, the time domain coefficients corresponding to the L component characteristics. In this embodiment of this application, for ease of description, information used to indicate the time domain coefficient is referred to as quantization information of the time domain coefficient. The quantization information may be, for example, a quantized value, an index, or any other information that may be used to indicate the time domain coefficient.

In an implementation, the terminal device may normalize the time domain coefficients, and send, to the network device, quantization information obtained after the normalization is performed.

For ease of understanding and description, it is assumed that the L component characteristics determined by the terminal device are time domain vectors shared by the K spatial-frequency vector pairs, and the time domain coefficients corresponding to the L component characteristics are time domain coefficients shared by the K spatial-frequency vector pairs. In this case, the L component characteristics correspond to L time domain coefficients. The terminal device may normalize a time domain coefficient with a largest amplitude (for example, denoted as a largest time domain coefficient) of the L time domain coefficients, and report, to the network device, a position of a time domain vector corresponding to the largest time domain coefficient in the L time domain vectors. The terminal device may indicate, by using indexes of quantized values, ratios of amplitudes of the remaining (L−1) time domain coefficients to the amplitude of the largest time domain coefficient. For example, the network device and the terminal device may predefine one-to-one correspondences between a plurality of quantized values and a plurality of indexes. Based on the one-to-one correspondences, the terminal device may report, to the network device by using a corresponding index, a quantized value closest to a ratio of an amplitude of each time domain coefficient to the amplitude of the largest time domain coefficient. In addition, the terminal device may report a position of the largest time domain coefficient to the network device.

It should be understood that normalization processing is merely a possible implementation used by the terminal device to reduce overheads in a process of reporting the time domain coefficients, and shall not constitute any limitation on embodiments of this application. A specific manner in which the terminal device indicates the time domain coefficient is not limited in embodiments of this application.

It should be further understood that, when the first indication information is used to indicate the L time domain coefficients, a direct or indirect manner may be used for indication. For example, for the maximum time domain coefficient, the position of the maximum time domain coefficient in the L time domain coefficients may be indicated. For another example, for a time domain coefficient whose quantized value is zero, a position of the time domain coefficient in the L time domain coefficients may also be indicated. In other words, the first indication information does not necessarily indicate each of the L time domain coefficients, provided that the network device can restore the L time domain coefficients according to the first indication information.

It should be further understood that merely for ease of understanding, the foregoing uses an example in which the K spatial-frequency vector pairs share the L component characteristics and the L time domain coefficients, to describe in detail possible manners in which the terminal device indicates the time domain coefficients. However, this shall not constitute any limitation on embodiments of this application. The foregoing has described in detail a specific process in which the terminal device determines one or more component characteristics and their corresponding time domain coefficients for each spatial-frequency vector pair. Therefore, for a manner in which the terminal device separately indicates the component characteristics and the time domain coefficients for each spatial-frequency vector pair, refer to the manner provided in the foregoing for operation. For brevity, examples are not described herein one by one.

In operation 440, the terminal device sends the first indication information. Correspondingly, the network device receives the first indication information.

For example, the terminal device may send the first indication information to the network device by using a physical uplink resource, for example, a physical uplink shared channel (PUSCH) or a physical uplink control channel (PUCCH). The first indication information may be carried in, for example, a CSI report (which may also be referred to as CSI for short), or may be carried in other signaling. This is not limited in embodiments of this application.

A specific method for sending, by the terminal device, the first indication information to the network device by using the physical uplink resource may be the same as that in the conventional technology. For brevity, detailed descriptions of a specific process are omitted herein.

As previously described, the L component characteristics and their corresponding time domain coefficients are used by the network device to restore a downlink channel. When the terminal device determines, based on the feedback manner for dual-domain compression, a change rule of the spatial-frequency coefficient corresponding to the spatial-frequency vector pair with time, the terminal device may further report, to the network device, the spatial-frequency vector pair used to determine the time domain vector and the time domain coefficient corresponding to the time domain vector.

The spatial-frequency vector pair indicated by the terminal device to the network device may be the K spatial-frequency vector pairs, or may include the K spatial-frequency vector pairs. This is not limited in embodiments of this application.

If the spatial-frequency vector pair indicated by the terminal device to the network device based on the feedback manner for dual-domain compression includes one or more spatial-frequency vector pairs other than the K spatial-frequency vector pairs, for example, the terminal device feeds back K' spatial-frequency vector pairs based on the feedback manner for dual-domain compression, where K'>K, and K' is an integer, the network device and the terminal device may preset a rule for selecting K spatial-frequency vector pairs from the K' spatial-frequency vector pairs to determine the L component characteristics and their corresponding time domain coefficients. For example, a value of K may be determined by the network device. The K spatial-frequency vector pairs may be K stronger spatial-frequency vector pairs in the K' spatial-frequency vector pairs, and an amplitude of a spatial-frequency coefficient corresponding to any one of K'-K unselected spatial-frequency vector pairs in the K' spatial-frequency vector pairs is less than or equal to an amplitude of a spatial-frequency coefficient corresponding to any one of the K spatial-frequency vector pairs. For another example, a value of K may be determined by the terminal device. The K spatial-frequency vector pairs may be spatial-frequency vector pairs whose amplitudes are greater than or equal to a preset threshold in the K' spatial-frequency vector pairs.

It should be understood that, the foregoing listed preset rule used to determine the K spatial-frequency vector pairs is merely an example, and this shall not constitute any limitation on embodiments of this application. A specific relationship between the K spatial-frequency vector pairs and the K' spatial-frequency vector pairs is not limited in embodiments of this application.

Certainly, the terminal device may alternatively report the K spatial-frequency vector pairs to the network device. Optionally, the method further includes: The terminal device sends sixth indication information, where the sixth indication information is used to indicate the K spatial-frequency vector pairs. Correspondingly, the network device receives the sixth indication information, where the sixth indication information is used to indicate the K spatial-frequency vector pairs. It should be understood that the K spatial-frequency vector pairs are spatial-frequency vector pairs used for determining the L component characteristics and their corresponding time domain coefficients.

It should be further understood that, the sixth indication information and the foregoing first indication information may be carried in same signaling, for example, a CSI report, or may be carried in different signaling, for example, existing or newly added signaling. This is not limited in embodiments of this application.

When the sixth indication information and the first indication information are carried in the same signaling, the operation of sending the sixth indication information and operation 440 may be combined into a same operation. In other words, the terminal device may send the first indication information and the sixth indication information to the network device by sending the same signaling. When the sixth indication information and the first indication information are carried in different signaling, the operation of sending the sixth indication information and operation 440 may be different operations.

As described above, the reference signal sent by the network device may be a non-precoded reference signal, or may be a precoded reference signal. Based on different reference signals sent by the network device, processing manners of the terminal device are also slightly different.

Optionally, the sixth indication information indicates the K spatial-frequency vector pairs.

If the reference signal sent by the network device is a non-precoded reference signal, the terminal device may first determine the K' spatial-frequency vector pairs based on the received reference signal, where a weighted sum of the K' spatial-frequency vector pairs may be used to construct a spatial-frequency domain matrix. The terminal device may select the K spatial-frequency vector pairs from the K' spatial-frequency vector pairs, where the K spatial-frequency vector pairs may be some or all of the K' spatial-frequency vector pairs determined by the terminal device. The terminal device may measure, at a plurality of measurement moments, spatial-frequency coefficients corresponding to the selected K spatial-frequency vector pairs, and record the spatial-frequency coefficients, to obtain the K spatial-frequency coefficient vectors and further determine the L component characteristics and their corresponding time domain coefficients.

For example, indication of the K spatial-frequency vector pairs by the sixth indication information may include indexes of spatial domain vectors used for combination to obtain the K spatial-frequency vector pairs in a spatial domain vector set and indexes of frequency domain vectors used for combination to obtain the K spatial-frequency vector pairs in a frequency domain vector set. For example, indication of the K spatial-frequency vector pairs by the sixth indication information may alternatively include an index of a combination of a plurality of spatial domain vectors used for combination to obtain the K spatial-frequency vector pairs in a spatial domain vector set and an index of a combination of a plurality of frequency domain vectors used for combination to obtain the K spatial-frequency vector pairs in a frequency domain vector set.

It should be understood that, for a specific method for indicating the K spatial-frequency vector pairs by the terminal device, refer to a method for indicating a spatial-frequency vector pair in the feedback manner for dual-domain compression in the conventional technology. The specific method for indicating the K spatial-frequency vector pairs by the terminal device is not limited in embodiments of this application.

Optionally, the sixth indication information indicates ports corresponding to the K spatial-frequency vector pairs.

If the reference signal sent by the network device is a precoded reference signal, for example, the precoded reference signal may be obtained by precoding a reference signal based on a spatial domain vector and a frequency domain vector, or may be obtained by precoding a reference signal based on an angle domain vector and a delay domain vector, the precoded reference signal may correspond to K' ports, and the K' ports may be in a one-to-one correspondence with the K' spatial-frequency vector pairs, or may be in a one-to-one correspondence with K' angle-delay pairs. The terminal device may determine, based on received precoded reference signals of the K' ports, a spatial-frequency coefficient corresponding to each port, and select K ports from the K' ports based on the spatial-frequency coefficient corresponding to each port. The terminal device may measure, at a plurality of measurement moments, spatial-frequency coefficients corresponding to the selected K ports, and record the spatial-frequency coefficients, to obtain the K spatial-frequency coefficient vectors and further determine the L component characteristics and their corresponding time domain coefficients.

It should be understood that, for example, indication of the K ports by the sixth indication information may include port numbers of the K ports. A specific method for indicating the K ports by the terminal device is not limited in embodiments of this application.

In operation 450, the network device determines the one or more component characteristics and the time domain coefficient of each component characteristic according to the first indication information.

As previously described, the first indication information includes the first information used to indicate the dimension of the component characteristics, the second information used to indicate the one or more component characteristics, and the quantization information used to indicate the time domain coefficients. After receiving the first indication information, the network device may determine the dimension of the component characteristics based on the first information, and generate an M-dimensional orthogonal codebook or search for an M-dimensional orthogonal codebook from pre-stored codebooks based on the dimension of the component characteristics. Then, the network device may determine the one or more component characteristics from the M-dimensional orthogonal codebook based on the second information. In addition, the network device may further determine, based on the quantization information, the time domain coefficient corresponding to each component characteristic.

A process in which the network device interprets the first indication information corresponds to a process in which the terminal device generates the first indication information. The terminal device may generate the first indication information in a manner that may be pre-agreed on by the two parties or in a predefined manner; and the network device may interpret the first indication information in a same manner.

A specific process in which the terminal device generates the first indication information has been described above in detail in operation 410. A specific process in which the network device determines the L component characteristics and their corresponding time domain coefficients according to the first indication information corresponds to the foregoing specific process. Therefore, for brevity, details are not described herein again.

Based on the foregoing solution, the terminal device may feed back the complete time-varying characteristic of the channel based on the local time-varying characteristic of the channel. The terminal device uses the weighted sum of the one or more component characteristics to approximately represent the complete time-varying characteristic, and feeds back the one or more component characteristics and the quantization information of the time domain coefficient of each component characteristic to the network device. Therefore, the network device can determine a change of the channel in time domain. In addition, a time-varying characteristic of the channel obtained by the network device is a complete time-varying characteristic, that is, a time-varying characteristic of the channel in one or more complete periods. If the network device predicts a future channel based on the complete time-varying characteristic, the predicted future channel does not encounter the truncation shown in FIG. 2 above. Therefore, the predicted future channel is more accurate, which is more favorable to making of a proper decision for subsequent downlink scheduling. For example, a precoding matrix matching the channel may be determined for subsequent downlink data transmission.

In a possible example, the network device may determine, based on the complete time-varying characteristic fed back by the terminal device, a precoding matrix used for downlink transmission.

Optionally, the method 400 further includes operation 460. In operation 460, the network device determines a precoding matrix based on the one or more component characteristics and the time domain coefficient of each component characteristic.

After determining the L component characteristics and the time domain coefficient of each component characteristic, the network device may determine a change of the channel with time in a complete period based on the weighted sum of the L component characteristics. As shown in FIG. 3(c), for one spatial-frequency vector pair, the network device may determine an (M×1)-dimensional spatial-frequency coefficient vector based on the weighted sum of the L component characteristics.

For example, for the spatial-frequency vector pair $(u_i, v_j)$, the (M×1)-dimensional spatial-frequency coefficient vector $c^{i,j} \triangleq [\tilde{a}_0^{i,j} \tilde{a}_1^{i,j} \ldots \tilde{a}_{N-1}^{i,j} \tilde{a}_N^{i,j} \ldots \tilde{a}_{M-1}^{i,j}]^T$ can be obtained based on the weighted sum of the L component characteristics.

First N elements $\tilde{a}_0^{i,j}$ to $\tilde{a}_{N-1}^{i,j}$ may be estimated values of N spatial-frequency coefficients $a_0^{i,j}$ to $a_{N-1}^{i,j}$ corresponding to the spatial-frequency vector pair $(u_i, v_j)$ at the foregoing N groups of sample points. Last (M–N) elements are estimated values of spatial-frequency coefficients of the spatial-frequency vector pair $(u_i, v_j)$ at future (M–N) time points. For example, $\tilde{a}_N^{i,j}$ may represent a spatial-frequency coefficient of the spatial-frequency vector pair $(u_i, v_j)$ at an $N^{th}$ time point, and $\tilde{a}_{M-1}^{i,j}$ may represent a spatial-frequency coefficient of the spatial-frequency vector pair $(u_i, v_j)$ at an $(M-1)^{th}$ time point.

The network device may predict a future channel based on last (M–N) elements in an (M×1)-dimensional spatial-frequency coefficient vector corresponding to each of the K spatial-frequency vector pairs. In this way, it can be learned that a spatial-frequency coefficient of the $k^{th}$ spatial-frequency vector pair $(u_i, v_j)$ at an $m^{th}$ time point is $\tilde{a}_m^{i,j}$. When m takes any value in a range from (M–N) to (M–1), a spatial-frequency domain matrix $$\tilde{H}_m = \sum_{J=1}^{J-1} \sum_{i=0}^{l-1} \tilde{a}_m^{i,j} u_i v_j^H$$

at any timepoint within the period of time can be predicted.

The network device may further determine, based on the spatial-frequency domain matrix, a precoding matrix used for downlink data transmission. A specific method for determining the precoding matrix by the network device based on the spatial-frequency domain matrix has been briefly described above. For details, refer to the conventional technology. For brevity, details are not described herein again.

It should be understood that merely for ease of understanding, the foregoing shows a possible implementation in which the network device predicts a future channel. However, this shall not constitute any limitation on embodiments of this application. Based on a same concept, a person skilled in the art may predict the channel based on different algorithms. A specific implementation in which the network device predicts the channel is not limited in embodiments of this application.

After predicting a spatial-frequency domain matrix at a future time point, the network device may determine a precoding matrix that is at the time point and that is used for downlink transmission. A time-varying characteristic of the channel is considered for the determined precoding matrix, so that the precoding matrix can well adapt to a downlink channel.

Actually, based on the L component characteristics and the time domain coefficient of each component characteristic, the network device is not limited to determining spatial-frequency matrices or precoding matrices that are at the M time points. Because the channel is periodic, the network device may further predict, based on the foregoing determined L component characteristics and the time domain coefficient of each component characteristic, a spatial-frequency domain matrix or precoding matrix that is at any future time point.

It should be understood that although the future channel predicted by the network device is a channel at one or more future time points, it does not mean that the channel is applicable only to the one or more time points. For example, a precoding matrix used for downlink data transmission is determined based on the channel that is at the time point. For example, the network device may separately predict a channel that is at a time point 1 and a channel that is at a time point 2, and the channel that is at the time point 1 may be used for determining a precoding matrix that is at any moment in a time segment from the time point 1 to the time point 2. In other words, the precoding matrix that is at any moment between the time point 1 and the time point 2 can still be determined based on the channel that is at the time point 1. The channel at a time point is a channel at a time point of the complete time-varying characteristic of the channel predicted according to the method provided above, and shall not constitute a limitation on a time range to which the channel at a time point is applicable.

Correspondingly, if the terminal device determines, based on the feedback manner for dual-domain compression, the precoding matrix used for downlink transmission, the terminal device may be confronted with a problem of CSI expiration. For ease of understanding, a process of providing a CSI feedback based on an existing CSI feedback procedure and the confronting problem of CSI expiration are described herein in detail with reference to FIG. 6.

Figure 6:
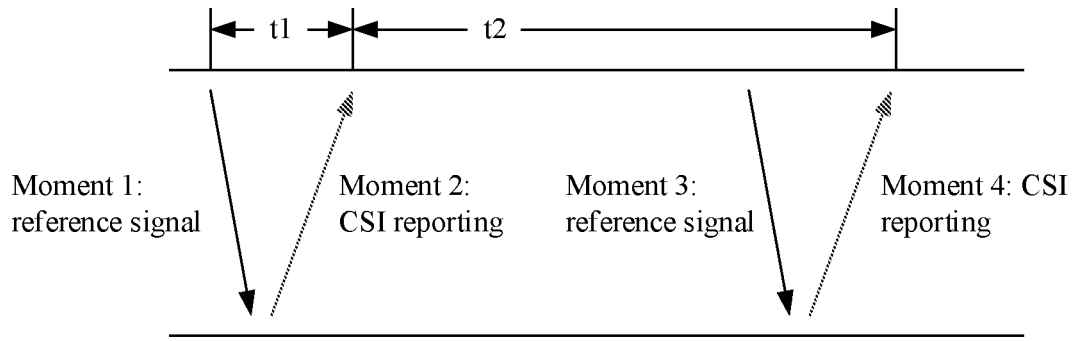
FIG. 6 is a schematic flowchart of providing a CSI feedback based on an existing channel state information (CSI) feedback procedure.

FIG. 6 is a schematic flowchart of providing a CSI feedback based on the feedback manner for dual-domain compression according to an embodiment of this application. As shown in FIG. 6, the network device sends a reference signal at a moment 1. After receiving the reference signal, the terminal device may perform channel measurement and provide a feedback at a moment 2. Because the network device may send reference signals periodically, aperiodically, or semi-persistently, there may be a period of time between a moment at which a reference signal is sent the last time by the network device and a moment at which a reference signal is sent next time. As shown in FIG. 6, the network device sends a reference signal next time at a moment 3, and the terminal device performs channel measurement and provides a feedback at a moment 4 based on the reference signal sent next time. It can be learned that there is a time interval t1 between the moment 1 and the moment 2, and there is a time interval t2 between the moment 2 and the moment 4. During the time interval t2, all precoding matrices used by the network device to perform downlink transmission are determined based on a feedback received at the moment 2. However, the channel may have changed during the time interval t2, and if the precoding matrix determined based on the feedback at the moment 2 is directly used to perform precoding for subsequent downlink transmission, the precoding matrix may fail to well adapt to a downlink channel. Consequently, transmission performance may be degraded. This case in which a precoding matrix determined based on a feedback cannot match an actual channel because a channel changes with time is referred to as CSI expiration. In other words, when the channel changes rapidly with time, CSI expiration may cause significant degradation in the transmission performance.

Correspondingly, in embodiments of this application, the terminal device performs channel measurement based on reference signals sent by the network device at a plurality of different moments, and feeds back a change of a channel with time to the network device by using a quantized weighted sum of time domain vectors. The network device may predict a channel at a future moment based on the change of the channel with time, and further determine a precoding matrix that adapts to the channel. Therefore, a problem of transmission performance degradation caused by CSI expiration is alleviated, helping improve transmission performance of a system.

It should be understood that merely for ease of understanding, the foregoing embodiments use dual-domain compression as an example to describe a specific process in which the terminal device determines the L component characteristics of the complete time-varying characteristic and the time domain coefficient of each component characteristic and a specific process in which the network device determines the L component characteristics and the weighting coefficient of each component characteristic based on a feedback. However, this shall not constitute any limitation on embodiments of this application. For example, the terminal device may alternatively determine the one or more component characteristics of the complete time-varying characteristic and the weighting coefficient of each component characteristic based on a type II codebook feedback manner. In this case, the terminal device may assume that a beam vector used for restoring a precoding matrix does not change, and determine the L component characteristics of the complete time-varying characteristic of the channel and the weighting coefficient of each component characteristic based on a change of a wideband amplitude coefficient or subband coefficient of the beam vector with time. Based on the L component characteristics and the weighting coefficient of each component characteristic that are determined by the terminal device, the network device may approximately restore the precoding matrix. For brevity, examples are not described one by one in embodiments of this application.

It should be further understood that merely to provide an example, the foregoing merely shows a specific process in which the terminal device determines the L component characteristics and the weighting coefficient of each component characteristic based on one polarization direction and one transport layer. However, this shall not constitute any limitation on embodiments of this application. When a transmit antenna has a plurality of polarization directions, or when there are more than one transport layer, or when there are more than one receive antenna, the terminal device may determine one or more component characteristics and a weighting coefficient of each component characteristic according to the foregoing same method. Correspondingly, the network device may also restore and predict a channel according to the foregoing same method, to determine a precoding matrix.

The foregoing describes in detail the methods provided in embodiments of this application with reference to FIG. 3(*a*) to FIG. 3(*f*) and FIG. 6. The following describes in detail apparatuses provided in embodiments of this application with reference to FIG. 7 to FIG. 9.

Figure 7:
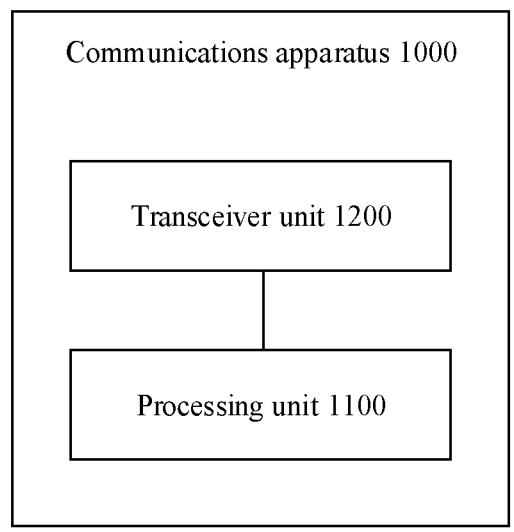
FIG. 7 is a schematic block diagram of a communications apparatus according to an embodiment of this application.

FIG. 7 is a schematic block diagram of a communications apparatus according to an embodiment of this application.

As shown in FIG. 7, the communications apparatus 1000 may include a processing unit 1100 and a transceiver unit 1200.

In a possible design, the communications apparatus 1000 may correspond to the terminal device in the foregoing method embodiment, for example, may be a terminal device, or a component (for example, a chip or a chip system) configured in the terminal device.

It should be understood that the communications apparatus 1000 may correspond to the terminal device in the method 400 according to the embodiments of this application. The communications apparatus 1000 may include units configured to perform the method performed by the terminal device in the method 400 in FIG. 4. In addition, the units in the communications apparatus 1000 and the foregoing other operations and/or functions are separately used to implement corresponding procedures of the method 400 in FIG. 4.

When the communications apparatus 1000 is configured to perform the method 400 in FIG. 4, the processing unit 1100 may be configured to perform operation 410 and operation 420 in the method 400, and the transceiver unit 1200 may be configured to perform operation 430 and operation 440 in the method 400. It should be understood that, a specific process in which each unit performs the foregoing corresponding operation has been described in detail in the foregoing method embodiments. For brevity, details are not described herein again.

Figure 8:
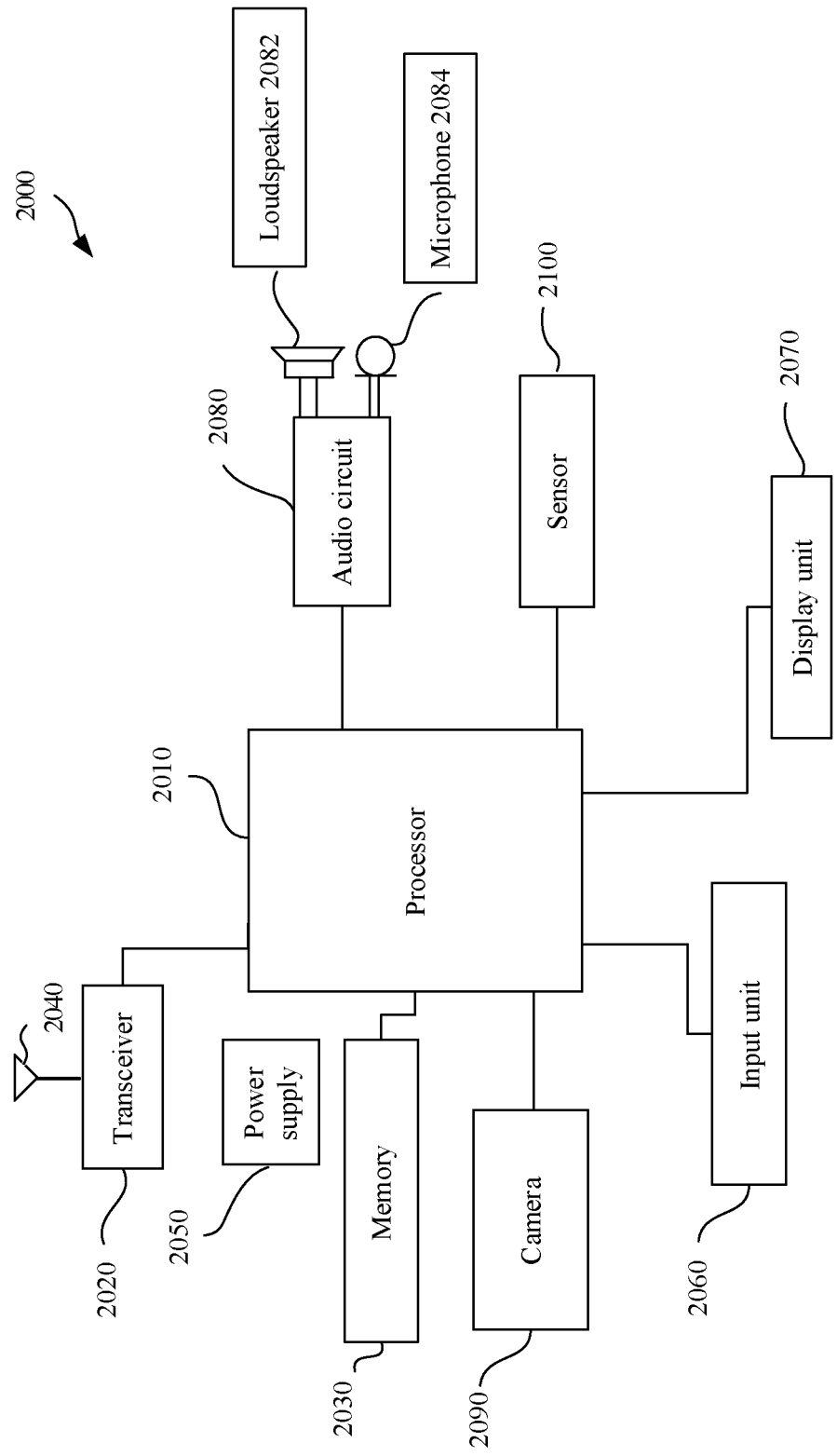
FIG. 8 is a schematic diagram of a structure of a terminal device according to an embodiment of this application.

It should be further understood that when the communications apparatus 1000 is a terminal device, the transceiver unit 1200 in the communications apparatus 1000 may be implemented via a transceiver, for example, may correspond to a transceiver 2020 in a terminal device 2000 shown in FIG. 8. The processing unit 1100 in the communications apparatus 1000 may be implemented via at least one processor, for example, may correspond to a processor 2010 in the terminal device 2000 shown in FIG. 8.

It should be further understood that when the communications apparatus 1000 is a chip or a chip system configured in the terminal device, the transceiver unit 1200 in the communications apparatus 1000 may be implemented by an input/output interface, and the processing unit 1100 in the communications apparatus 1000 may be implemented by a processor, a microprocessor, an integrated circuit, or the like integrated in the chip or the chip system.

In another possible design, the communications apparatus 1000 may correspond to the network device in the foregoing method embodiment, for example, may be a network device, or a component (for example, a chip or a chip system) configured in the network device.

It should be understood that the communications apparatus 1000 may correspond to the network device in the method 400 according to the embodiments of this application, and the communications apparatus 1000 may include a unit configured to perform the method performed by the network device in the method 400 in FIG. 4. In addition, the units in the communications apparatus 1000 and the foregoing other operations and/or functions are separately used to implement corresponding procedures of the method 400 in FIG. 4.

When the communications apparatus 1000 is configured to perform the method 400 in FIG. 4, the processing unit 1100 may be configured to perform operation 450 and operation 460 in the method 400, and the transceiver unit 1200 may be configured to perform operation 430 and operation 440 in the method 400. It should be understood that, a specific process in which each unit performs the foregoing corresponding operation has been described in detail in the foregoing method embodiments. For brevity, details are not described herein again.

Figure 9:
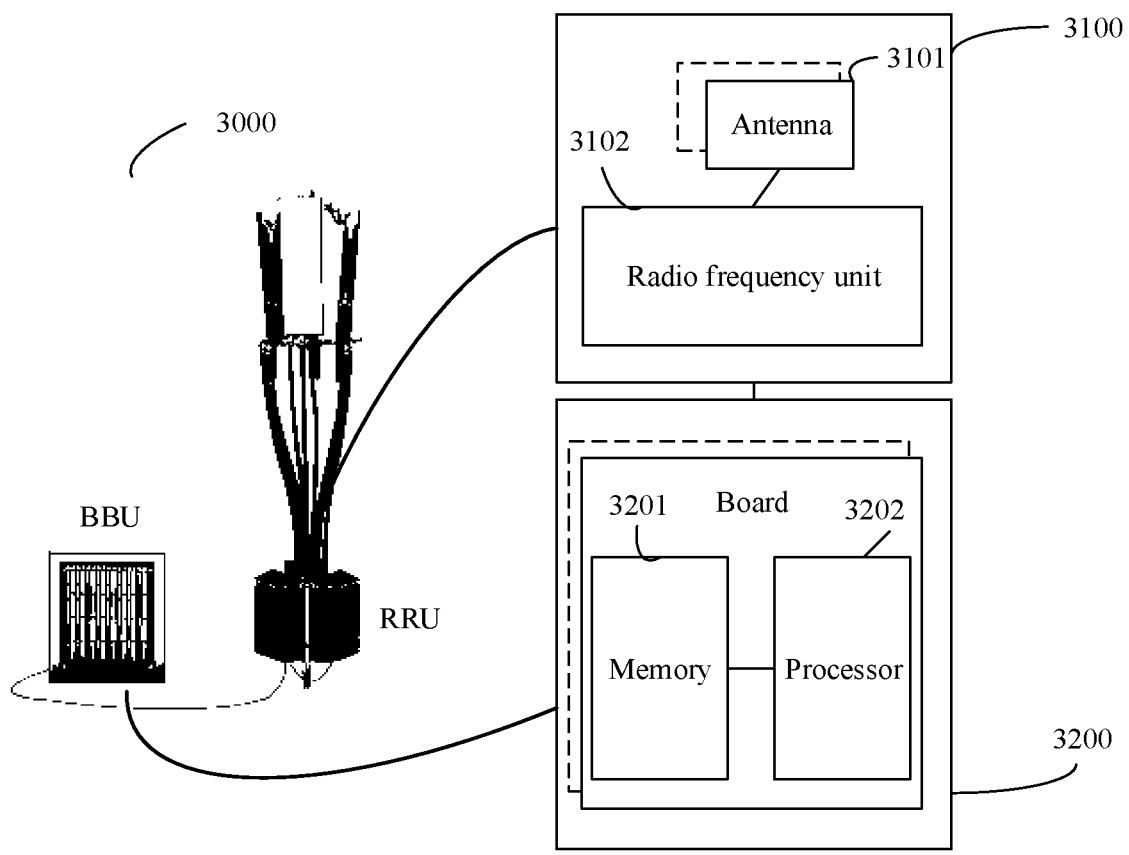
FIG. 9 is a schematic diagram of a structure of a network device according to an embodiment of this application.

It should be further understood that when the communications apparatus 1000 is a network device, the transceiver unit 1200 in the communications apparatus 1000 may be implemented by a transceiver, for example, may correspond to a transceiver 3100 in a network device 3000 shown in FIG. 9; and the processing unit 1100 in the communications apparatus 1000 may be implemented by at least one processor, for example, may correspond to a processor 3200 in the network device 3000 shown in FIG. 9.

It should be further understood that when the communications apparatus 1000 is a chip or a chip system configured in the network device, the transceiver unit 1200 in the communications apparatus 1000 may be implemented by an input/output interface, and the processing unit 1100 in the communications apparatus 1000 may be implemented by a processor, a microprocessor, an integrated circuit, or the like integrated in the chip or the chip system.

FIG. 8 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit 1100 in FIG. 7.

The transceiver 2020 may correspond to the transceiver unit 1200 in FIG. 7, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 8 can implement processes related to a terminal device in the method embodiment shown in FIG. 4. Operations and/or functions of the modules in the terminal device 2000 are intended to implement the corresponding procedures in the foregoing method embodiments. For details, refer to the descriptions in the foregoing method embodiments. To avoid repetition, detailed descriptions are properly omitted herein.

The processor 2010 may be configured to perform actions that are implemented inside a terminal device and that are described in the foregoing method embodiment, for example, generating first indication information and sixth indication information. The transceiver 2020 may be configured to perform actions that a terminal device sends information to or receives information from a network device and that are described in the foregoing method embodiment, for example, sending first indication information and sixth indication information, and receiving a reference signal, second indication information, third indication information, fourth indication information, fifth indication information, and seventh indication information. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 9 is a schematic diagram of a structure of a network device according to an embodiment of this application, for example, may be a schematic diagram of a structure of a base station. The base station 3000 may be used in the system shown in FIG. 1, to perform functions of the network device in the foregoing method embodiments. As shown in the figure, the base station 3000 may include one or more radio frequency units, for example, one or more remote radio units (RRUs) 3100, and one or more baseband units (BBUs) (which may also be referred to as distributed units (DUs)) 3200. The RRU 3100 may be referred to as a transceiver unit, and correspond to the transceiver unit 1200 in FIG. 7. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 part is mainly configured to transmit and receive radio frequency signals and perform conversion between a radio frequency signal and a baseband signal, for example, configured to send a reference signal, second indication information, third indication information, fourth indication information, fifth indication information, and seventh indication information to a terminal device, and receive first indication information and sixth indication information. For details, refer to the descriptions in the foregoing method embodiments. Details are not described herein again.

The BBU 3200 part is mainly configured to: perform baseband processing, control the base station, and the like. The RRU 3100 and the BBU 3200 may be physically disposed together, or may be physically disposed separately, namely, a distributed base station.

The BBU 3200 is a control center of the base station, or may be referred to as a processing unit. The BBU 3200 may correspond to the processing unit 1100 in FIG. 9, and is mainly configured to implement a baseband processing function, for example, channel coding, multiplexing, modulation, or spreading. For example, the BBU (processing unit) may be configured to control the base station to perform operation procedures related to a network device in the foregoing method embodiment, for example, generating the second indication information, the third indication information, the fourth indication information, the fifth indication information, and the seventh indication information. For details, refer to the descriptions in the foregoing method embodiments. Details are not described herein again.

In an example, the BBU 3200 may include one or more boards, and a plurality of boards may jointly support a radio access network (such as an LTE network) having a single access standard, or may separately support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may be further disposed on each board.

It should be understood that the base station 3000 shown in FIG. 9 can implement processes related to the network device in the method embodiment shown in FIG. 4. The operations and/or the functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

It should be understood that the base station 3000 shown in FIG. 9 is merely a possible form of the network device, and shall not constitute any limitation on embodiments of this application. The method provided in embodiments of this application is applicable to network devices that are in other forms, for example, including an AAU, further including a CU and/or a DU, or including a BBU and an adaptive radio unit (ARU), or a BBU; or may be customer premises equipment (CPE), or may be a network device in another form. A specific form of the network device is not limited in embodiments of this application.

The CU and/or DU may be configured to perform an action that is implemented inside the network device and that is described in the foregoing method embodiments, and the AAU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor is configured to perform the method in any one of the foregoing method embodiments.

It should be understood that, the processing apparatus may be one or more chips. For example, the processing apparatus may be a field-programmable gate array (FPGA), an application-specific integrated circuit (ASIC), a system on chip (SoC), a central processing unit (CPU), a network processor (NP), a digital signal processor (DSP), a micro controller unit (MCU), or a programmable logic device (PLD) or another integrated chip.

In an implementation process, the operations in the foregoing methods may be implemented by using a hardware integrated logic circuit in the processor, or by using instructions in a form of software. The operations of the methods disclosed with reference to embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that the processor in embodiments of this application may be an integrated circuit chip, and has a signal processing capability. In an implementation process, the operations in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the operations, and logical block diagrams that are disclosed in embodiments of this application. The general-purpose processor may be a microprocessor, or the processor may be any conventional processor, or the like. The operations of the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory in the system and method described in this specification includes but is not limited to these memories and any memory of another proper type.

According to the method provided in embodiments of this application, this application further provides a computer program product. The computer program product includes computer program code. When the computer program code is run on a computer, the computer is enabled to perform the methods separately performed by the terminal device and the network device in the embodiment shown in FIG. 4.

According to the method provided in embodiments of this application, this application further provides a computer-readable medium. The computer-readable medium stores program code. When the program code is run on a computer, the computer is enabled to perform the methods separately performed by the terminal device and the network device in the embodiment shown in FIG. 4.

According to the method provided in embodiments of this application, this application further provides a system. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding operation. For example, the communications unit (transceiver) performs a receiving or sending operation in the method embodiments, and an operation other than the sending operation and the receiving operation may be performed by the processing unit (processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that is run on the computing device may be components. One or more components may reside within a process and/or an execution thread, and a component may be located on one computer and/or distributed between two or more computers. In addition, these components may be executed from various computer-readable media that store various data structures. The components may communicate with each other by using a local and/or remote process and based on, for example, a signal having one or more data packets (for example, data from two components interacting with another component in a local system or a distributed system and/or across a network such as the internet interacting with other systems by using a signal).

A person of ordinary skill in the art may be aware that, various illustrative logical blocks (illustrative logical block) and operations (operation) that are described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

It may be clearly understood by a person skilled in the art that for convenient and brief description, for a specific working process of the described systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

In the foregoing embodiments, all or some of the functions of the function units may be implemented by software, hardware, firmware, or any combination thereof. When software is used to implement embodiments, all or some of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

When the functions are implemented in the form of a software function unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A channel measurement method, comprising:
generating, by a terminal device, first indication information, wherein the first indication information indicates one or more component characteristics of a complete time-varying characteristic of a channel between the terminal device and a network device and a weighting coefficient of each of the one or more component characteristics, wherein the complete time- varying characteristic is determined based on the one or more component characteristics and the weighting coefficient of each of the one or more component characteristics, and the complete time- varying characteristic of the channel corresponds to a local time-varying characteristic of the channel; and
sending, by the terminal device, the first indication information to the network device.

2. The method according to claim 1, wherein dimension of the complete time-varying characteristic is M, dimension of the local time-varying characteristic is N, M≥N>1, and M and N are both integers.

3. The method according to claim 2, wherein an indication of the one or more component characteristics by the first indication information comprises first information that indicates dimension of the one or more component characteristics and second information that indicates the one or more component characteristics.

4. The method according to claim 3, wherein the first information indicates one of the following: a value of M, a value of N/M or a value of M/N.

5. The method according to claim 2, wherein the method further comprises:
receiving second indication information, wherein the second indication information indicates one or more optional groups of candidate values, each group of candidate values comprises one or more candidate values of M and one or more candidate values of L, L represents a quantity of the one or more component characteristics, and L is a positive integer.

6. The method according to claim 2, wherein the method further comprises:
receiving third indication information, wherein the third indication information indicates a value of N.

7. The method according to claim 1, wherein the method further comprises:
determining the local time-varying characteristic of the channel based on reference signals received for a plurality of times; and
determining the one or more component characteristics and the weighting coefficient of each of the one or more component characteristics based on the local time-varying characteristic of the channel.

8. A communication apparatus, comprising
at least one transceiver;
at least one processor; and
one or more memories coupled to the at least one processor and storing programming instructions for execution by the at least one processor to cause the apparatus to:
generate first indication information, wherein the first indication information indicates one or more component characteristics of a complete time-varying characteristic of a channel between the communication apparatus and a network device and a weighting coefficient of each of the one or more component characteristics, wherein the complete time-varying characteristic is determined based on the one or more component characteristics and the weighting coefficient of each of the one or more component characteristics, and the complete time-varying characteristic of the channel corresponds to a local time-varying characteristic of the channel; and
send the first indication information to the network device.

9. The communication apparatus according to claim 8, wherein dimension of the complete time-varying characteristic is M, dimension of the local time-varying characteristic is N, M≥N>1, and M and N are both integers.

10. The communication apparatus according to claim 9, wherein an indication of the one or more component characteristics by the first indication information comprises first information that indicates dimension of the one or more component characteristics and second information that indicates the one or more component characteristics.

11. The communication apparatus according to claim 10, wherein the first information indicates one of the following: a value of M, a value of N/M or a value of M/N.

12. The communication apparatus according to claim 9, wherein the programming instructions further cause the apparatus to:
receive third indication information, wherein the third indication information indicates a value of N.

13. The communication apparatus according to claim 8, wherein the programming instructions further cause the apparatus to:
receive second indication information, wherein the second indication information indicates one or more optional groups of candidate values, each group of candidate values comprises one or more candidate values of M and one or more candidate values of L, L represents a quantity of the one or more component characteristics, and L is a positive integer.

14. The communication apparatus according to claim 8, wherein the programming instructions further cause the apparatus to:
determine the local time-varying characteristic of the channel based on reference signals received for a plurality of times; and
determine the one or more component characteristics and the weighting coefficient of each of the one or more component characteristics based on the local time-varying characteristic of the channel.

15. A non-transitory computer-readable storage medium storing one or more programming instructions executable by at least one processor of a terminal device to perform operations comprising:
   generating first indication information, wherein the first indication information indicates one or more component characteristics of a complete time-varying characteristic of a channel between the terminal device and a network device and a weighting coefficient of each of the one or more component characteristics, wherein the complete time-varying characteristic is determined based on the one or more component characteristics and the weighting coefficient of each of the one or more component characteristics, and the complete time-varying characteristic of the channel corresponds to a local time-varying characteristic of the channel; and
   sending the first indication information to the network device.

16. The non-transitory computer-readable storage medium according to claim 15, wherein dimension of the complete time-varying characteristic is M, dimension of the local time-varying characteristic is N, M≥N>1, and M and N are both integers.

17. The non-transitory computer-readable storage medium according to claim 16, wherein an indication of the one or more component characteristics by the first indication information comprises first information that indicates dimension of the one or more component characteristics and second information that indicates the one or more component characteristics.

18. The non-transitory computer-readable storage medium according to claim 17, wherein the first information indicates one of the following: a value of M, a value of N/M or a value of M/N.

19. The non-transitory computer-readable storage medium according to claim 16, wherein the at least one processor performs the operations further comprising:
   receiving third indication information, wherein the third indication information indicates a value of N.

20. The non-transitory computer-readable storage medium according to claim 15, wherein the at least one processor performs the operations further comprising:
   receiving second indication information, wherein the second indication information indicates one or more optional groups of candidate values, each group of candidate values comprises one or more candidate values of M and one or more candidate values of L, L represents a quantity of the one or more component characteristics, and L is a positive integer.

* * * * *

UNITED STATES PATENT AND TRADEMARK OFFICE
CERTIFICATE OF CORRECTION

PATENT NO. : 12,348,997 B2  
APPLICATION NO. : 17/706385  
DATED : July 1, 2025  
INVENTOR(S) : Xiang Ren et al.

Page 1 of 1

It is certified that error appears in the above-identified patent and that said Letters Patent is hereby corrected as shown below:

In the Specification

In Column 1, In Line 12 (Approx.), After "entireties" insert -- . --.

In the Claims

Column 75, In Line 31, In Claim 1, delete "time- varying" and insert -- time-varying --.

Column 75, In Line 35, In Claim 1, delete "time- varying" and insert -- time-varying --.

Column 76, In Line 8, In Claim 8, after "comprising" insert -- . --.

Signed and Sealed this  
Twenty-third Day of December, 2025

John A. Squires  
*Director of the United States Patent and Trademark Office*